United States Patent
Shang et al.

(10) Patent No.: US 12,539,502 B2
(45) Date of Patent: Feb. 3, 2026

(54) ADSORBENT, ITS PREPARATION AND USE

(71) Applicant: City University of Hong Kong, Kowloon (HK)

(72) Inventors: Jin Shang, Kowloon (HK); Zeyu Tao, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 18/534,934

(22) Filed: Dec. 11, 2023

(65) Prior Publication Data

US 2025/0186968 A1    Jun. 12, 2025

(51) Int. Cl.

| | |
|---|---|
| *B01J 20/18* | (2006.01) |
| *B01D 53/94* | (2006.01) |
| *B01J 20/30* | (2006.01) |
| *B01J 29/04* | (2006.01) |
| *B01J 29/06* | (2006.01) |
| *B01J 29/70* | (2006.01) |
| *B01J 29/72* | (2006.01) |

(Continued)

(52) U.S. Cl.
CPC ........ *B01J 20/186* (2013.01); *B01D 53/9481* (2013.01); *B01J 20/3085* (2013.01); *F01N 3/021* (2013.01); *F01N 3/101* (2013.01); *F01N 3/2066* (2013.01); *F01N 3/2803* (2013.01); *B01D 2257/404* (2013.01); *B01D 2258/012* (2013.01); *B01J 29/048* (2013.01); *B01J 29/06* (2013.01); *B01J 29/7015* (2013.01); *B01J 29/7065* (2013.01); *B01J 29/723* (2013.01); *B01J 29/763* (2013.01); *B01J 31/0278* (2013.01); *B01J 37/24* (2013.01); *B01J 37/30* (2013.01); *B01J 39/14* (2013.01); *B01J 49/06* (2017.01); *F01N 3/0807* (2013.01); *F01N 3/0828* (2013.01); *F01N 2240/18* (2013.01); *F01N 2250/12* (2013.01); *F01N 2370/04* (2013.01)

(58) Field of Classification Search
CPC combination set(s) only.
See application file for complete search history.

(56) References Cited

U.S. PATENT DOCUMENTS

| | | | |
|---|---|---|---|
| 2015/0158019 A1* | 6/2015 | Rajaram | ................ B01J 29/83 |
| | | | 422/171 |
| 2016/0250594 A1* | 9/2016 | Casci | ................... B01J 20/186 |
| | | | 423/239.1 |

(Continued)

FOREIGN PATENT DOCUMENTS

WO    2016151296    9/2016

OTHER PUBLICATIONS

Gupta, A.; Kang, S. B.; Harold, M. P., NOx uptake and release on Pd/SSZ-13: Impact Of Feed composition and temperature. Catalysis Today 2021, 360, 411-425.

(Continued)

*Primary Examiner* — Binh Q Tran
(74) *Attorney, Agent, or Firm* — Renner, Kenner, Greive, Bobak, Taylor & Weber

(57) ABSTRACT

An adsorbent for passive $NO_x$ adsorption includes a small pore zeolite having an eight-ring framework structure and a non-noble metal ion doped in the framework structure. An exhaustion system comprising the adsorbent and a method for preparing the adsorbent are also addressed.

30 Claims, 50 Drawing Sheets

(51) Int. Cl.
| | |
|---|---|
| B01J 29/76 | (2006.01) |
| B01J 31/02 | (2006.01) |
| B01J 37/24 | (2006.01) |
| B01J 37/30 | (2006.01) |
| B01J 39/14 | (2006.01) |
| B01J 49/06 | (2017.01) |
| F01N 3/021 | (2006.01) |
| F01N 3/08 | (2006.01) |
| F01N 3/10 | (2006.01) |
| F01N 3/20 | (2006.01) |
| F01N 3/28 | (2006.01) |

(56) References Cited

U.S. PATENT DOCUMENTS

| | | | | |
|---|---|---|---|---|
| 2017/0096922 | A1* | 4/2017 | Bergeal | F01N 3/2807 |
| 2017/0096923 | A1* | 4/2017 | Chiffey | B01J 35/56 |
| 2017/0341022 | A1* | 11/2017 | Andersen | B01J 21/04 |
| 2018/0171850 | A1* | 6/2018 | Aydin | F01N 13/0097 |
| 2022/0339613 | A1* | 10/2022 | Collier | B01D 53/9422 |

OTHER PUBLICATIONS

Chen, H.-Y.; Collier, J. E.; Liu, D.; Mantarosie, L.; Duran-Martin, D.; Novák, V.; Rajaram, R. R.; Thompsett, D., Low Temperature NO Storage of Zeolite Supported Pd for Low Temperature Diesel Engine Emission Control. Catalysis Letters 2016, 146 (9), 1706-1711.

Lee, J.; Kim, Y.; Hwang, S.; Lee, .; Lee, H.; Kim, C. H.; Kim, D. H., Deactivation of Pd/Zeolites passive NOx adsorber induced by NO and H2O: Comparative study of Pd/ZSM-5 and Pd/SSZ-13. Catalysis Today 2021, 360, 350-355.

Lee, J.; Chen, J.; Giewont, K.; Mon, T.; Liu, C.-H.; Walker, E. A.; Kyriakidou, E. A., Effect of cobalt incorporation on the stability of ionic Pd in the presence of carbon monoxide over Pd/BEA passive NOx adsorbers. Chemical Engineering Journal 2022, 440, 135834.

Wang, A.; Lindgren, K.; Di, M.; Bernin, D.; Carlsson, P.-A.; Thuvander, M.; Olsson, L., Insight into hydrothermal aging effect on Pd sites over Pd/LTA and Pd/SSZ-13 as PNA and CO oxidation monolith catalysts. Applied Catalysis B: Environmental 2020, 278, 119315.

Khivantsev, K.; Wei, X.; Kovarik, L.; Jaegers, N. R.; Walter, E. D.; Tran, P.; Wang, Y.; Szanyi, J., Palladium/Ferrierite versus Palladium/SSZ-13 Passive NOx Adsorbers: Adsorbate-Controlled Location of Atomically Dispersed Palladium (II) in Ferrierite Determines High Activity and Stability**. Angewandte Chemie International Edition 2022, 61 (3), e202107554.

Amen, T. W. M.; Washiyama, S.; Oda, A.; Ohtsu, T.; Satsuma, A.; Tsunoji, N., Exploring the framework of small pore zeolites for passive NOx adsorption. Microporous and Mesoporous Materials 2023, 361, 112746.

Khivantsev, K.; Jaegers, N. R.; Kovarik, L.; Hanson, J. C.; Tao, F.; Tang, Y.; Zhang, X.; Koleva, I. Z.; Aleksandrov, H. A.; Vayssilov, G. N.; Wang, Y.; Gao, F.; Szanyi, J., Achieving Atomic Dispersion of Highly Loaded Transition Metals in Small-Pore Zeolite SSZ-13: High-Capacity and High-Efficiency Low-Temperature CO and Passive NOx Adsorbers. Angewandte Chemie International Edition 2018, 57 (51), 16672-16677.

Lee, J.; Ryou, Y.; Cho, S. J.; Lee, H.; Kim, C. H.; Kim, D. H., Investigation of the active sites and optimum Pd/Al of Pd/ZSM-5 passive NO adsorbers for the cold-start application: Evidence of isolated-Pd species obtained after a high-temperature thermal treatment. Applied catalysis. B, Environmental 2018, 226, 71-82.

Khivantsev, K.; Gao, F.; Kovarik, .; Wang, Y.; Szanyi, J., Molecular Level Understanding of How Oxygen and Carbon Monoxide Improve NOx Storage in Palladium/SSZ-13 Passive NOx Adsorbers: The Role of NO+ and Pd(II)(CO)(NO) Species. The Journal of Physical Chemistry C 2018, 122 (20), 10820-10827.

Zhao, H.; Chen, X.; Bhat, A.; Li, Y.; Schwank, J. W., Insight into hydrothermal aging effect on deactivation of Pd/SSZ-13 as low-temperature NO adsorption catalyst: Effect of dealumination and Pd mobility. Applied Catalysis B: Environmental 2021, 286, 119874.

Kunal, P.; Toops, T. J.; Kidder, M. K.; Lance, M. J., Deactivation trends of Pd/SSZ-13 under the simultaneous presence of NO, CO, hydrocarbons and water for passive NOx adsorption. Applied Catalysis B: Environmental 2021, 299, 120591.

Ryou, Y.; Lee, J.; Kim, Y.; Hwang, S.; Lee, H.; Kim, C. H.; Kim, D. H., Effect of reduction treatments (H2 vs. CO) on the NO adsorption ability and the physicochemical properties of Pd/SSZ-13 passive NOx adsorber for cold start application. Applied Catalysis A: General 2019, 569, 28-34.

Ryou, Y.; Lee, J.; Cho, S. J.; Lee, H.; Kim, C. H.; Kim, D. H., Activation of Pd/SSZ-13 catalyst by hydrothermal aging treatment in passive NO adsorption performance at low temperature for cold start application. Applied Catalysis B: Environmental 2017, 212, 140-149.

Mihai, O.; Trandafilović, L.; Wentworth, T.; Torres, F. F.; Olsson, L., The Effect of Si/Al Ratio for Pd/BEA and Pd/SSZ-13 Used as Passive NOx Adsorbers. Topics in Catalysis 2018, 61 (18), 2007-2020.

Ryou, Y.; Lee, J.; Lee, H.; Kim, C. H.; Kim, D. H., Effect of various activation conditions on the low temperature NO adsorption performance of Pd/SSZ-13 passive NOx adsorber. Catalysis Today 2019, 320, 175-180.

Lee, J.; Ryou, Y.; Hwang, S.; Kim, Y.; Cho, S. J.; Lee, H.; Kim, C. H.; Kim, D. H., Comparative study of the mobility of Pd species in SSZ-13 and ZSM-5, and its implication for their activity as passive NOx adsorbers (PNAs) after hydro-thermal aging. Catalysis Science & Technology 2019, 9 (1), 163-173.

Lee, J.; Kim, J.; Kim, Y.; Hwang, S.; Lee, H.; Kim, C. H.; Kim, D. H., Improving NOx storage and CO oxidation abilities of Pd/SSZ-13 by increasing its hydrophobicity. Applied Catalysis B: Environmental 2020, 277, 119190.

Vu, A.; Luo, J.; Li, J.; Epling, W. S., Effects of CO on Pd/BEA Passive NOx Adsorbers. Catalysis Letters 2017, 147 (3), 745-750.

Malamis, S. A.; Harold, M. P.; Epling, W. S., Coupled NO and C3H6 Trapping, Release and Conversion on Pd/BEA: Evaluation of the Lean Hydrocarbon NOx Trap. Industrial & Engineering Chemistry Research 2019, 58 (51), 22912-22923.

Gu, Y.; Zelinsky, R. P.; Chen, Y.-R.; Epling, W. S., Investigation of an irreversible NOx storage degradation Mode on a Pd/BEA passive NOx adsorber. Applied Catalysis B: Environmental 2019, 258, 118032.

Khivantsev, K.; Jaegers, N. R.; Kovarik, L.; Prodinger, S.; Derewinski, M. A.; Wang, Y.; Gao, F.; Szanyi, J., Palladium/Beta zeolite passive NOx adsorbers (PNA): Clarification of PNA chemistry and the effects of CO and zeolite crystallite size on PNA performance. Applied Catalysis A: General 2019, 569, 141-148.

Ilmasani, R. F.; Woo, J.; Creaser, D.; Olsson, L., Influencing the NOx Stability by Metal Oxide Addition to Pd/BEA for Passive NOx Adsorbers. Industrial & Engineering Chemistry Research 2020, 59 (21), 9830-9840.

Bello, E.; Margarit, V. J.; Gallego, E. M.; Schuetze, F.; Hengst, C.; Corma, A.; Moliner, M., Deactivation and regeneration studies on Pd-containing medium pore zeolites as passive NOx adsorbers (PNAs) in cold-start applications. Microporous and Mesoporous Materials 2020, 302, 110222.

* cited by examiner

| | H-LTA-6 | Na-LTA-6 | K-LTA-6 | Mg-LTA-6 | Ca-LTA-6 |
|---|---|---|---|---|---|
| Ion exchange degree (%) | - | 98 | 62 | 75 | 65 |
| | Mn-LTA-6 | Co-LTA-6 | Ni-LTA-6 | Cu-LTA-6 | Zn-LTA-6 |
| Ion exchange degree (%) | 79 | 78 | 77 | 104 | 73 |
| | Y-LTA-6 | La-LTA-6 | Ce-LTA-6 | Eu-LTA-6 | Tb-LTA-6 |
| Ion exchange degree (%) | 37 | 20 | 37 | 35 | 24 |

Fig. 3

| Adsorbents | BET Surface Area (m²/g) | Micropore Area (m²/g) | External surface Area (m²/g) | Total pore volume (cm³/g) |
|---|---|---|---|---|
| H-LTA-6 | 829.22 | 791.90 | 37.32 | 0.46 |
| Na-LTA-6 | 790.33 | 754.08 | 36.25 | 0.42 |
| K-LTA-6 | 151.19 | 124.64 | 26.55 | 0.16 |
| Mg-LTA-6 | 807.80 | 772.50 | 35.30 | 0.43 |
| Ca-LTA-6 | 854.20 | 822.46 | 31.74 | 0.43 |
| Mn-LTA-6 | 732.02 | 697.21 | 34.82 | 0.39 |
| Co-LTA-6 | 758.33 | 721.77 | 36.56 | 0.41 |
| Ni-LTA-6 | 730.35 | 695.70 | 34.65 | 0.39 |
| Cu-LTA-6 | 742.35 | 706.28 | 36.07 | 0.39 |
| Zn-LTA-6 | 722.58 | 687.34 | 35.24 | 0.39 |
| Y-LTA-6 | 731.01 | 701.44 | 29.57 | 0.37 |
| La-LTA-6 | 739.36 | 707.43 | 31.94 | 0.40 |
| Ce-LTA-6 | 718.44 | 685.13 | 33.31 | 0.39 |
| Eu-LTA-6 | 678.96 | 650.15 | 28.81 | 0.38 |
| Tb-LTA-6 | 720.65 | 688.81 | 31.84 | 0.36 |
| Yb-LTA-6 | 715.95 | 684.88 | 31.07 | 0.39 |

Fig. 5

|  | NO adsorption at 25 °C | | NO adsorption at 80 °C | |
| --- | --- | --- | --- | --- |
|  | NO capacity (mmol/g) | NO capacity (No. of NO/unit cell) | NO capacity (mmol/g) | NO capacity (No. of NO/unit cell) |
| H-LTA-6 | 0.02 | 0.03 | - | - |
| Na-LTA-6 | 0.03 | 0.05 | 0.01 | 0.01 |
| K-LTA-6 | 0.01 | 0.02 | - | - |
| Mg-LTA-6 | 0.16 | 0.23 | 0.07 | 0.10 |
| Ca-LTA-6 | 0.59 | 0.88 | 0.06 | 0.09 |
| Mn-LTA-6 | 0.44 | 0.68 | - | - |
| Co-LTA-6 | 0.37 | 0.56 | 0.22 | 0.32 |
| Ni-LTA-6 | 0.46 | 0.71 | 0.35 | 0.50 |
| Cu-LTA-6 | 0.17 | 0.27 | - | - |
| Zn-LTA-6 | 0.22 | 0.34 | - | - |
| Y-LTA-6 | 0.22 | 0.33 | - | - |
| La-LTA-6 | 0.27 | 0.40 | - | - |
| Ce-LTA-6 | 0.26 | 0.39 | - | - |
| Eu-LTA-6 | 0.21 | 0.31 | - | - |
| Tb-LTA-6 | 0.19 | 0.29 | - | - |
| Yb-LTA-6 | 0.17 | 0.26 | - | - |

Fig. 7

| PNA adsorbents | NO capacity (μmol/g) | NO/metal ratios, metal = Pd, Ni, Co |
|---|---|---|
| Pd-SSZ-13 | 9-250 | 0.16-1 |
| Pd-BEA | 20-287 | 0.21-0.68 |
| Pd-ZSM-5 | 28-195 | 0.13-0.71 |
| Pd-MCM-22 | 9-57 | 0.1-0.55 |
| Pd-ITQ-2 | 9-55 | 0.09-0.56 |
| Co-LTA-6 | 683 | 0.78 |
| Ni-LTA-6 | 773 | 0.89 |

Fig. 8G

ADSORBENT, ITS PREPARATION AND USE

TECHNICAL FIELD

The present invention relates to an adsorbent for example particularly, but not exclusively, an adsorbent comprising a small pore zeolite having an eight-ring framework structure and a non-noble metal ion doped in the framework structure; and a method for preparing the adsorbent. Also pertaining to the present invention is use of the adsorbent in an exhaustion system.

BACKGROUND OF THE INVENTION

Nitric oxides ($NO_x$) is one of the most common air pollutants in the world. $NO_x$ gases are usually generated upon the reaction between nitrogen and oxygen during combustion of fuels. Whilst there are techniques, such as selective catalytic reduction (SCR) and selective non-catalytic reduction for reducing post combustion $NO_x$, it is appreciated that those techniques would have limited efficiency under low operation temperature such as below 200° C. In particular, such a "low temperature range" is unavoidable upon engine operation, which is typically known as the cold-start period of the engine. Accordingly, it is appreciated cold-start $NO_x$ emission, which predominantly comprises nitrogen monoxide (NO), arises from the low-temperature diesel exhaust during the cold-start period of engines would contribute significantly to $NO_x$ pollution.

Passive $NO_x$ adsorption (PNA) has been considered as one of the approaches for addressing such issue. Typically, PNA involves placing an adsorbent upstream of the SCR process to capture the emitted NO during the cold-start period. Subsequently, the captured NO can be released at elevated temperatures during engine warming-up, at which the downstream SCR process can efficiently carry out the $NO_x$ reduction.

Among the developed passive $NO_x$ adsorber, molecular sieves incorporated with noble metals such as Pd, Pt, or compounds derived therefrom (e.g. $Pt/Pd/Al_2O_3$, $Pt/Pd/CeO_2$, etc.) have been attracted much attention since it is believed that Pt or Pd cations are effective NO adsorption sites of PNA. However, it is noted that these adsorbents still demonstrate insufficient NO adsorption ability, where the complete $NO_x$ removal from engine exhaust gases at temperatures below 200° C. have never been accomplished. This deficiency can be attributed to the limited loading of $Pd^{2+}$ (typically below 2 wt % for the formation of isolated Pd cations). While it is possible to enhance the NO adsorption ability of Pd-zeolites by further increasing the loading of Pd, this approach would also lead to the aggregation of Pd, resulting in a substantially lower NO/Pd ratios and higher cost of adsorbents. In addition, the reusability of Pd-zeolites have not been proved by cyclic NO adsorption/desorption results within simulated engine exhaust gas. This is particularly concerning due to previously reported insufficient hydrothermal stability of Pd species.

The present invention thus seeks to eliminate or at least mitigate such shortcomings by providing a new or otherwise improved adsorbent for PNA, particularly an adsorbent comprising a non-noble metal cation as NO adsorption sites.

SUMMARY OF THE INVENTION

In a first aspect of the present invention, there is provided an adsorbent for passive $NO_x$ adsorption comprising a small pore zeolite having an eight-ring framework structure and a non-noble metal ion doped in the framework structure.

Optionally, the non-noble metal ion comprises any one of $Na^+$, $K^+$, $Mg^{2+}$, $Ca^{2+}$, $Mn^{2+}$, $Co^{2+}$, $Ni^{2+}$, $Cu^{2+}$, $Zn^{2+}$, $Y^{3+}$, $La^{3+}$, $Ce^{3+}$, $Eu^{3+}$, $Tb^{3+}$, or $Yb^{3+}$.

In an optional embodiment, the non-noble metal ion is selected from the group consisting of $Na^+$, $Mg^{2+}$, $Ca^{2+}$, $Co^{2+}$, $Ni^{2+}$ and a combination thereof.

It is optional that the eight-ring framework structure of small pore zeolite is selected from any one of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SIV, THO, TSC, UEI, UFI, VNI, YUG, ZON.

In an optional embodiment, the small pore zeolite comprises a framework structure being any one of CHA and LTA.

Optionally, the framework structure of LTA includes a Si/Al ratio of 5.5 to 6.

It is optional that the small pore zeolite comprises a framework structure of LTA-6.

Optionally, the small pore zeolite has an ion-exchange degree of 20% to 104% with the non-noble metal ion.

Optionally, the small pore zeolite comprises a plurality of exchangeable sites including any one of $H^+$ and $NH_4^+$, and the plurality of exchangeable sites undergo ion-exchange with the non-noble metal ion.

It is optional that the adsorbent has a particle size of about 0.5 mm.

Optionally, the non-noble metal ion is any one of $Co^{2+}$ and $Ni^{2+}$ and the small pore zeolite has a framework structure of LTA-6.

It is optional that the small pore zeolite is doped with about 5 wt % to about 6 wt % of $Ni^{2+}$.

Optionally, the small pore zeolite is doped with about 2 at % to about 3 at % of $Ni^{2+}$.

In an optional embodiment, the small pore zeolite is doped with about 5 wt % to about 6 wt of $Co^{2+}$.

Optionally, the small pore zeolite is doped with about 2 at % to about 3 at % of $Co^{2+}$.

Optionally, the adsorbent has an NO adsorption capacity of about 0.22 mmol/g to about 0.35 mmol/g at about 80° C.

It is optional that the adsorbent is capable of capturing an effective amount of NO at or below a first temperature and releasing a substantially the same amount of captured NO at a second temperature that is higher than the first temperature.

It is optional that the first temperature is about 183° C. to about 255° C.

Optionally, the second temperature is about 195° C. to about 460° C.

It is optional that the effective amount of NO is about 200 ppm.

In a second aspect of the present invention, there is provided an exhaust system for internal combustion engines comprising a passive $NO_x$ adsorber including the adsorbent in accordance with the first aspect and an exhaust treatment component that is configured downstream with respect to and in fluidic communication with the adsorber.

In an optional embodiment, the adsorber is loaded with about 0.2 g to about 1.2 g of the adsorbent.

Optionally, the adsorber loaded with the adsorbent has a bed porosity of about 70% to about 80%.

It is optional that the adsorbent is thermally pre-treated at about 300° C. or above. Optionally, the exhaust treatment component comprises any one of a selective catalytic reduction (SCR) catalyst, a particulate filter, a SCR filter, a $NO_x$ adsorber catalyst, a three-way catalyst, an oxidation catalyst.

In a third aspect of the present invention, there is provided a method for preparing the adsorbent in accordance with the first aspect, comprising the steps of: providing a small pore zeolite containing $NH_4^+$ or $Na^+$; and adding the small pore zeolite into a first solution comprising a non-noble metal nitrate or non-noble metal acetate for conducting an ion-exchange reaction such that the $NH_4^+$ ion or the $Na^+$ ion is replaced with the non-noble metal.

Optionally, the small pore zeolite comprises $NH_4^+$ form of LTA-6 or $Na^+$ form of LTA-6.

It is optional that the $NH_4^+$ form of LTA-6 has a solid/liquid ratio with the first solution of about 1 g/50 mL.

Optionally, the $Na^+$ form of LTA-6 has a solid/liquid ratio with the first solution of about 1 g/100 mL.

In an optional embodiment, the non-noble metal comprises any one of Na, K, Mg, Ca, Mn, Co, Ni, Cu, Zn, Y, La, Ce, Eu, Tb, or Yb.

BRIEF DESCRIPTION OF DRAWINGS

The invention will now be more particularly described, by way of example only, with reference to the accompanying drawings, in which:

FIG. 3 is a table summarizing the ion-exchange degree of the LTA-6 zeolites;

FIG. 5 is a table summarizing the porous properties of the LTA-6 zeolites;

FIG. 7 is a table summarizing the NO adsorption capacity of LTA-6 zeolites in $NO/N_2$ (200 ppm NO balanced by $N_2$) at 100 kPa;

FIG. 8G is a table comparing the NO capacity and NO/metal (cation) ratios between reported Pd-zeolites and Co-LTA-6 and Ni-LTA-6;

DETAILED DESCRIPTION OF OPTIONAL EMBODIMENT

Figure 1:
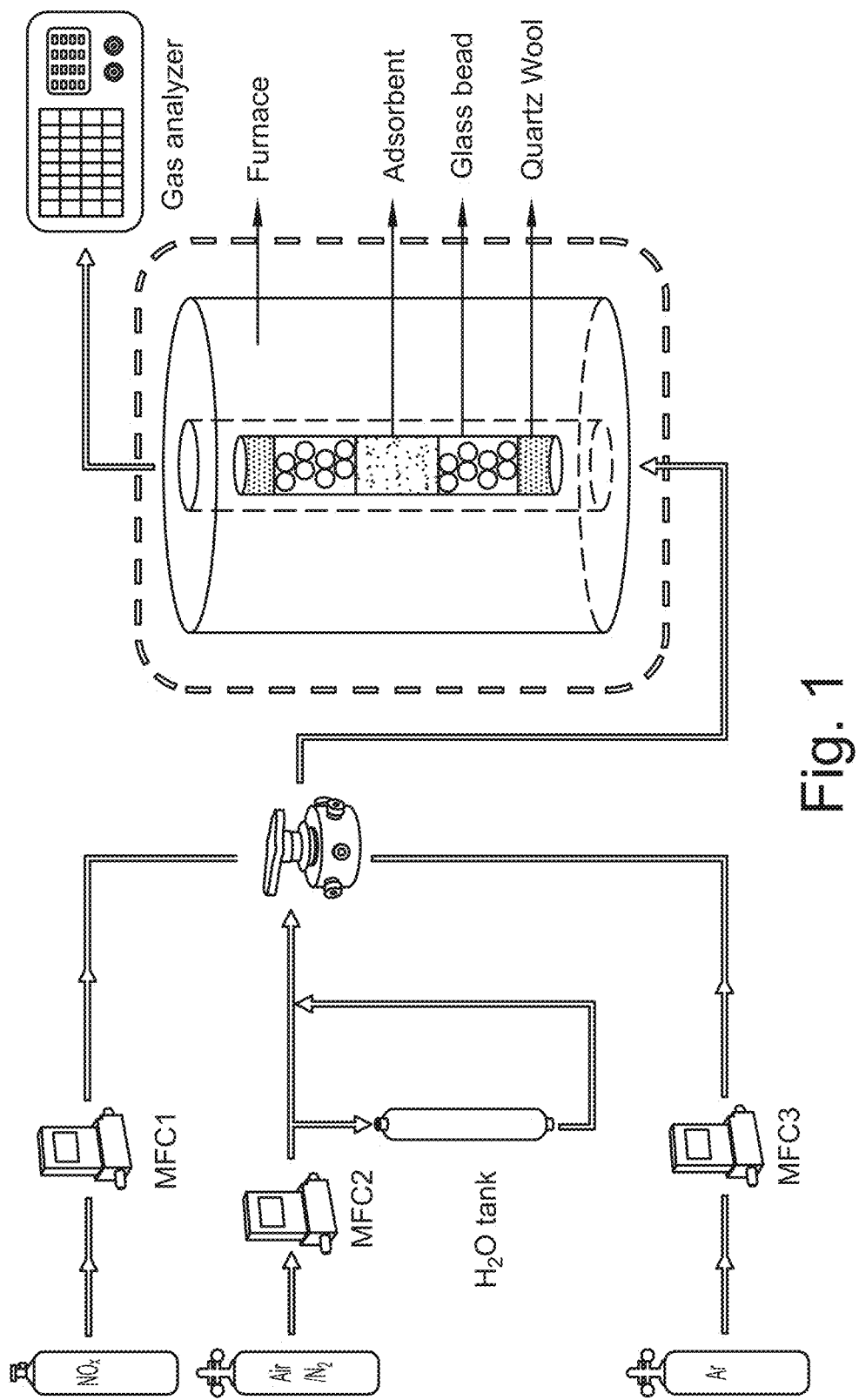
FIG. 1 shows s schematic diagram of an experimental setup for column breakthrough dynamic adsorption test.
Figure 2A:
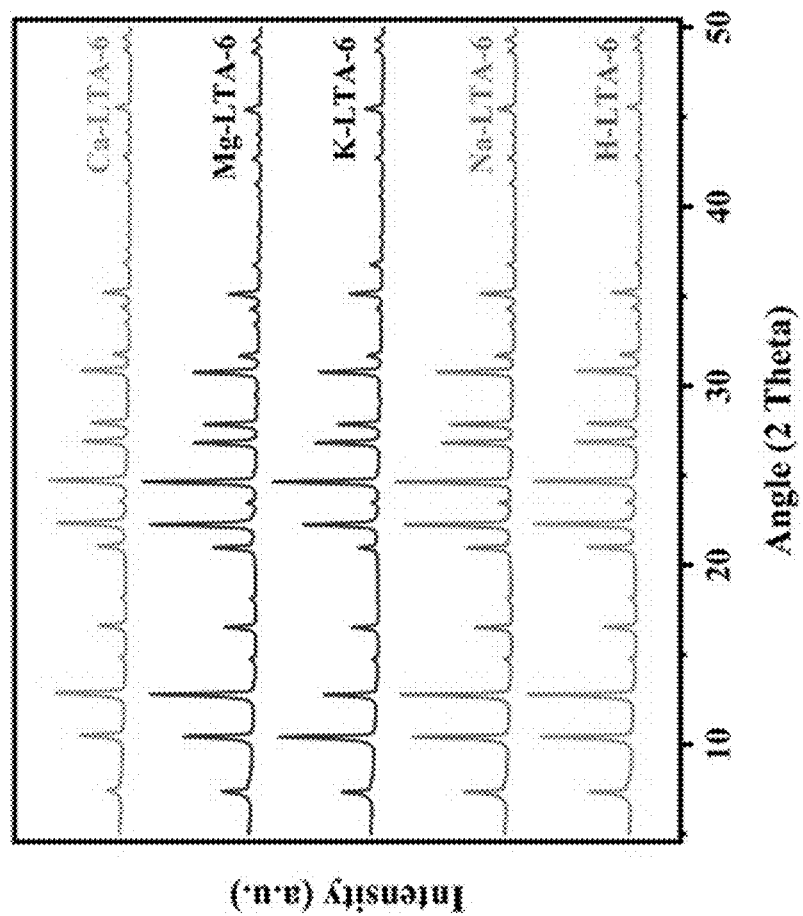
FIG. 2A shows the XRD patterns of H-, Na-, K, Mg-, and Ca-LTA-6 zeolites.
Figure 2B:
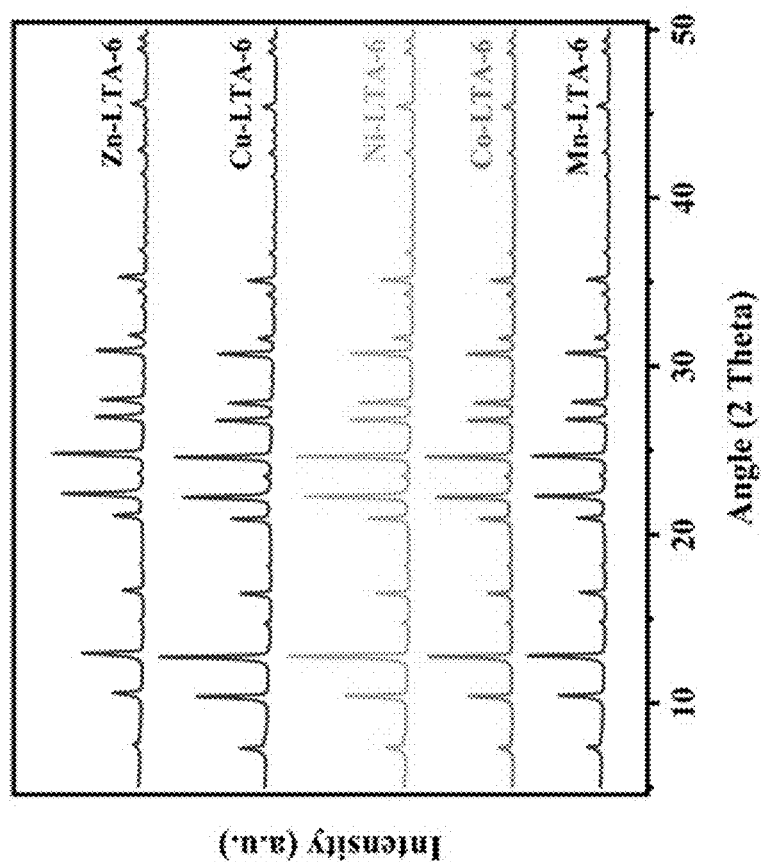
FIG. 2B shows the XRD patterns of Mn-, Co-, Ni-, Cu-, and Zn-LTA-6 zeolites.
Figure 2C:
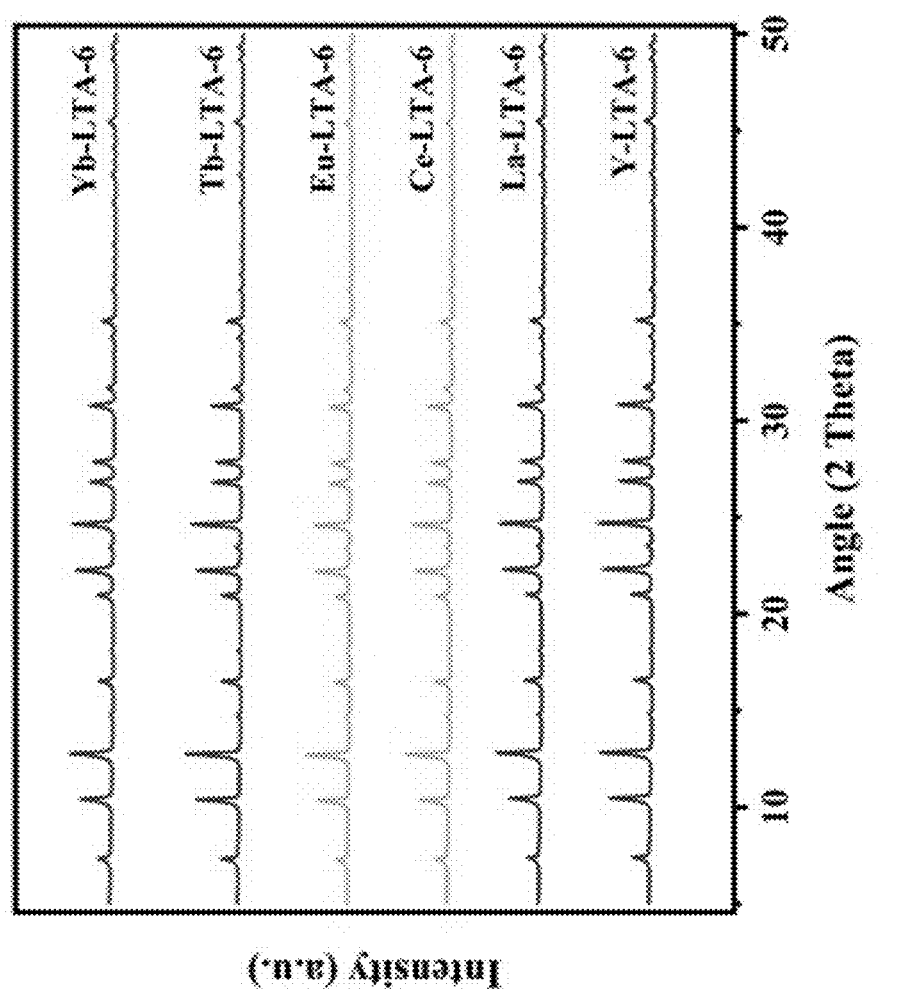
FIG. 2C shows the XRD patterns of Y-, La-, Ce-, Eu-, Tb-, and Yb-LTA-6 zeolites.
Figure 2D:
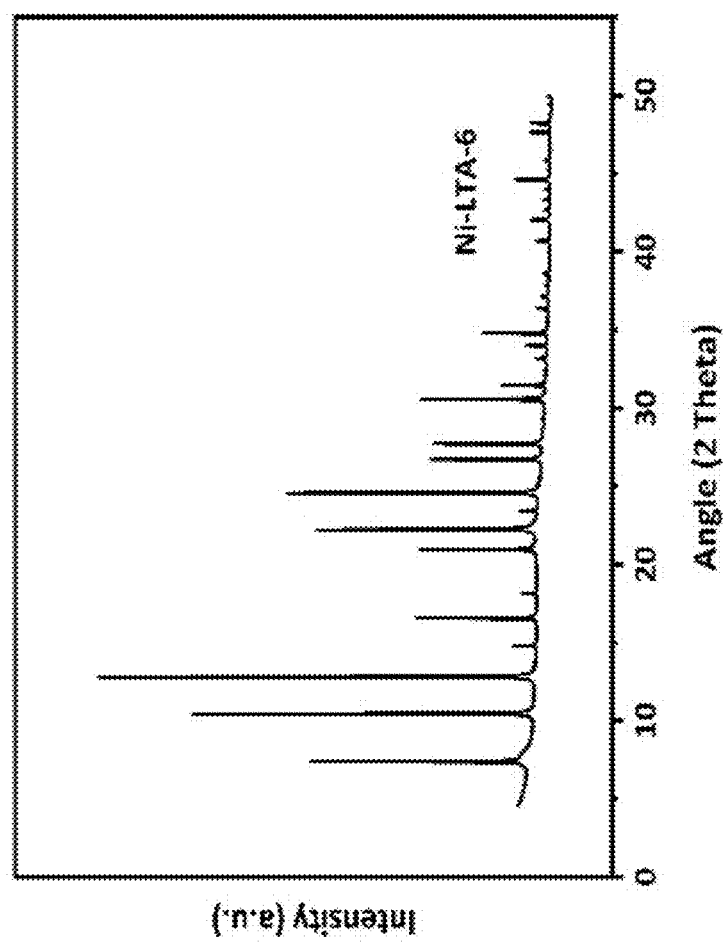
FIG. 2D shows the synchrotron XRD of NiLTA-6.

As used herein, the forms "a", "an", and "the" are intended to include the singular and plural forms unless the context clearly indicates otherwise.

The words "example" or "exemplary" used in this invention are intended to serve as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

As used herein, the phrase "about" is intended to refer to a value that is slightly deviated from the value stated herein. For example, "about 0.5 mm" may be meant that any values from 0.45 . . . 0.48 . . . 0.5 . . . 0.51 . . . 0.55 mm; "about 2 wt %" may be meant that any values from 1.8 . . . 1.85 . . . 1.9 . . . 2 . . . 2.05 . . . 2.1 . . . 2.2 wt %; "about 0.22 mmol/g" may be meant that any values from 0.20 . . . 0.205 . . . 0.21 . . . 0.22 . . . 0.222 . . . 0.225 wt %; "about 80° C." may be meant that any values from 78 . . . 78.5 . . . 79.5 . . . 80 . . . 80.2 . . . 81.2 . . . 82° C.; "about 255° C." may be meant that any values from 253 . . . 254.5 . . . 255 . . . 255.2 . . . 256 . . . 256.8 . . . 257° C.

Molecular sieves, in particular, small pore molecular sieves such as small pore zeolites may be an attractive candidate for passive $NO_x$ adsorption (PNA), since it is believed that the negatively charged Si—O—Al frameworks of zeolites, as well as the confined pore space and good structural hydrothermal stability thereof, may allow distribution of abundant charge-balancing cations as effective adsorption sites. Whilst the above properties of zeolites may be optimal for hosting Pd cations for PNA, it is believed that the use of noble metal ion would prompt various PNA deficiency as mentioned herein.

Without intending to be limited by theory, the inventors have, through their own research, trials, and experiments, devised an adsorbent for PNA, in particular an adsorbent comprising a non-noble metal ion hosted by a zeolite framework. In the embodiments of the present invention, it is found that the non-noble metal PNA adsorbent has outstanding NO adsorption/desorption ability and reusability in the scenarios simulating engine cold-start, warm-up, and shutdown, suggesting its significant potential for practical use and industrialization.

According to the invention, there is provided an adsorbent for passive $NO_x$ adsorption. The adsorbent may comprise molecular sieve, particularly a small pore zeolite having an eight-ring framework structure and a non-noble metal ion doped in the framework structure. In particular, the doped non-noble metal ion may act as the NO adsorption sites.

The term "small pore zeolite" generally refers the zeolites having a framework structure with pore entrance size of an eight-ring window, which has a maximum free aperture of about 0.41 nm to about 0.43 nm. It is appreciated that the aperture may be calculated by subtracting the diameter of an oxygen ion in silicate structures (0.27 nm) from the interatomic distance of two opposing oxygen atoms across the ring. In embodiments of the present invention, the eight-ring framework structure of small pore zeolite may be selected from any one of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SIV, THO, TSC, UEI, UFI, VNI, YUG, ZON.

In a particular embodiment, the small pore zeolite may comprise a framework structure being any one of CHA and LTA. In a more particular embodiment, the small pore zeolite may comprise a framework structure of LTA. Preferably, the framework structure of LTA may have a Si/Al ratio of 5.5 to 6. That said, in that embodiment, the small pore zeolite comprises a framework structure of LTA-6. It is believed that by having a LTA zeolite with such Si/Al ratio, it would provide the adsorbent of the present invention a good structural stability as well as promising ability for low-concentration NO gas capture as discussed in the later part of the present disclosure.

It is appreciated that zeolite or the framework structure of zeolite is typically anionic, which are counterbalanced by charge compensating cations, such as $H^+$, $NH_4^+$, etc. In particular, these charge compensating cations may be present in the zeolite or its framework structure as a plurality of exchangeable sites that undergo ion-exchange with the non-noble metal ions. That is, the plurality of exchangeable sites including $H^+$ and $NH_4^+$ are replaced with/doped with/ion-exchanged with the non-noble metal ions. By such an ion-exchange process, the small pore zeolite thus hosting the non-noble metal ions as the NO adsorption sites.

It is appreciated that different non-noble metal ions may have different ion-exchange degree. In embodiments of the present invention, the ion-exchange degree of the adsorbent may be from 20% to 104%.

The "non-noble metal ion" as referred herein generally includes monovalent, divalent or trivalent cations of alkali metals, alkaline earth metals, transition metals, or rare-earth metals that are selected from any one of the followings: $Na^+$, $K^+$, $Mg^{2+}$, $Ca^{2+}$, $Mn^{2+}$, $Co^{2+}$, $Ni^{2+}$, $Cu^{2+}$, $Zn^{2+}$, $Y^{3+}$, $La^{3+}$, $Ce^{3+}$, $Eu^{3+}$, $Tb^{3+}$, or $Yb^{3+}$. In a particular embodiment, the non-noble metal ion may be selected from the group consisting of $Na^+$, $Mg^{2+}$, $Ca^{2+}$, $Co^{2+}$, $Ni^{2+}$ and a combination thereof.

The adsorbent may be of various physical forms that according to actual needs. In an embodiment, the adsorbent may be configured as particles, which may have a particle size of, for example, about 0.5 mm.

As specific embodiments, the adsorbent may comprise a small pore zeolite having a framework structure of LTA-6 (also known as LTA-6 zeolite) doped with any one of $Co^{2+}$ and $Ni^{2+}$. The adsorbent may have an NO adsorption capacity of about 0.22 mmol/g to about 0.35 mmol/g at about 80° C. In addition, the adsorbent may be capable of capturing an effective amount of NO, such as 200 ppm of NO, at or below a first temperature, such as about 183° C. to about 255° C. and releasing a substantially the same amount of captured NO at a second temperature that is higher than the first temperature, such as at a second temperature of about 195° C. to about 460° C.

In an embodiment where the non-noble metal ion is $Co^{2+}$, the LTA-6 zeolite may be doped with about 5 wt % to about 6 wt % of $Co^{2+}$. In an embodiment, the LTA-6 zeolite may be doped with about 2 at % to about 3 at % of $Co^{2+}$. In another embodiment where the non-noble metal ion is $Ni^{2+}$, the LTA-6 zeolite may be doped with about 5 wt % to about 6 wt % of $Ni^{2+}$. In another embodiment, the LTA-6 zeolite may be doped with about 2 at % to about 3 at % of $Ni^{2+}$. Advantageously, it is believed that with such non-noble metal ion loading, it would allow the adsorbent to have a faster adsorption kinetics, and to prevent NO breakthrough below 200° C. within wet engine exhaust gas. In an example embodiment, the LTA-6 may be doped with about 5 wt % to about 6 wt % of $Ni^{2+}$, and it is found that the absorbent is capable of thoroughly capturing (200 pm) NO from wet engine exhaust gas with a temperature range of 80-255° C., followed by desorption of the captured NO in the temperature range of 260-420° C. Details of the performance will be discussed in the later part of the present disclosure.

The method for preparing the adsorbent will now be described. The method may comprise the steps of: providing a small pore zeolite containing $NH_4^+$ or $Na^+$; and adding the small pore zeolite into a first solution comprising a non-noble metal nitrate or non-noble metal acetate for conducting an ion-exchange reaction such that the $NH_4^+$ ion or the $Na^+$ ion is replaced with the non-noble metal.

In an embodiment, the small pore zeolite may comprise $NH_4^+$ form of LTA-6 or $Na^+$ form of LTA-6. In particular, the $NH_4^+$ form of LTA-6 or $Na^+$ form of LTA-6 may be prepared by hydrothermal synthesis of LTA-6, followed by conducting ion-exchange reaction with ammonium nitrate and/or sodium nitrate.

In an example embodiment, the LTA-6 may be prepared by stirring a mixture comprising aluminum sec-butoxide, Ludox HS-40 colloidal silica, tetraethylammonium hydroxide (TEAOH) 25% solution, diethyldimethylammonium hydroxide (DEDMAOH) 20% solution, sodium chloride (NaCl), and tetramethylammonium chloride (TMACl) in a Teflon liner of stainless-steel autoclave at room temperature for 24 hours, followed by sealing the mixture into a stainless-steel autoclave and aged in an air convection oven at 98° C. for a duration of 13 days and then at 125° C. for a duration of 7 days. After that, the LTA zeolites may be separated from liquid supernatant by centrifuge and then washed with deionized water for several, such as 5 times. Afterward, the as-synthesized LTA zeolites may be dried in a vacuum oven at 60° C. for at least 8 hours. Finally, LTA-6 may be calcined at 600° C. for 10 hours at a heating rate of 2° C./min to remove the OSDAs. The LTA-6 zeolite may then be ion-exchanged in 1 M ammonium nitrate solution to obtain $NH_4^+$ form of LTA-6.

In particular, the ion exchange of $NH_4^+$ may be conducted at a solid/liquid ratio of 1 g/50 mL and magnetically stirred at 60° C. for a duration of 24 hours. Optionally or additionally, the LTA zeolites may be separated by filtration and washed several times by deionized water. The washed LTA zeolites may finally be dried in an air convection oven at 60° C. These procedures may be repeated four times to complete the $NH_4^+$ exchange process.

In an embodiment, the $Na^+$ form of LTA-6 may be obtained by ion-exchanged with the $NH_4^+$ form of LTA-6 in 1 M sodium nitrate solution. In particular, the ion exchange of Na$^+$ may be conducted by utilizing the NH$_4^+$ form LTA in 1 M sodium nitrate solution at a solid/liquid ratio of 1 g/50 mL and magnetically stirred at 60° C. for a duration of 24 hours. Optionally or additionally, the Na$^+$ form of LTA zeolites may be separated by filtration and washed several times by deionized water. The washed LTA zeolites may finally be dried in an air convection oven at 60° C. These procedures may be repeated four times to complete the Na$^+$ exchange process.

The non-noble metal in the first solution may comprise any one of Na, K, Mg, Ca, Mn, Co, Ni, Cu, Zn, Y, La, Ce, Eu, Tb, or Yb. In embodiments where the ion exchange reaction of Na$^+$, K$^+$, Mg$^{2+}$, and Ca$^{2+}$, respectively is involved, the NH$_4^+$ form LTA-6 may be added to the first solution containing 1 M metal nitrate (Na/K/Mg/Ca nitrate) at a solid/liquid ratio of 1 g/50 mL, and magnetically stirred at room temperature (about 25° C.) for a duration of 24 hours. In another embodiment where the ion exchange of transition metal cations (Mn$^{2+}$, Co$^{2+}$, Ni$^{2+}$, Cu$^{2+}$, Zn$^{2+}$, Y$^{3+}$, La$^{3+}$, Ce$^{3+}$, Eu$^{3+}$, Tb$^{3+}$, or Yb$^{3+}$), respectively is involved, the Na$^+$ form of LTA-6 may be added to the first solution containing 1 M metal nitrate or metal acetate (Mn/Co/Ni/Cu/Zn/Y$^{3+}$/La/Ce/Eu/Tb/Yb nitrate or acetate) at a solid/liquid ratio of 1 g/100 mL, and magnetically stirred at room temperature (about 25° C.) for a duration of 24 hours.

Optionally or additionally, the non-noble metal ion-exchanged form of LTA zeolites may be separated by filtration and washed several times by deionized water. The washed LTA zeolites may finally be dried in an air convection oven at 60° C. These procedures may be repeated four times to complete the exchange process.

A further aspect of the present invention pertains to an exhaust system for internal combustion engines comprising a passive NO$_x$ adsorber including the adsorbent as described herein and an exhaust treatment component that is configured downstream with respect to and in fluidic communication with the adsorber.

In an embodiment, the exhaust treatment component may comprise any one of a selective catalytic reduction (SCR) catalyst, a particulate filter, a SCR filter, a NO$_x$ adsorber catalyst, a three-way catalyst, an oxidation catalyst. It is appreciated that these components are generally known in the art and one may select the suitable treatment component according to actual needs.

The exhaust system may be configured so that the passive NO$_x$ adsorber is located close to the engine and the exhaust treatment component that is located downstream with respect to and in fluidic communication with the adsorber. It is appreciated that by configuring the exhaust system as such, it would ensure that the engine exhaust gas first flows through the adsorber for conducting PNA prior to contacting the exhaust treatment component, thereby minimizing the low-temperature exhaust during the cold-start period of engines.

The passive NO$_x$ adsorber may be of any shapes and/or dimensions that would fit the actual needs. In an embodiment, the passive NO$_x$ adsorber may be a column loaded with the adsorbent, particularly the adsorbent that is thermally pre-treated at about 300° C. or above such as up to about 600° C. It is believed that by thermally pre-treating the adsorbent at different temperature, it may allow the NO adsorption/desorption window of the adsorbent to be manipulated, which may enable more effective NO capture during the cold-start period.

The adsorber may be loaded to with about 0.2 g to about 1.2 g of adsorbent, and with a bed porosity of about 70% to about 80%. In a particular embodiment where the adsorbent is loaded with about 1.3 g adsorbent, it is unexpectedly found that with such loading amount may facilitate the adsorption of water from wet engine exhaust while without affecting the PNA performance of the adsorbent/adsorber. Details of the effect of pre-treating temperature as well as the loading amount of adsorbent will be disclosed in the later part of the present disclosure.

Hereinafter, the present invention is described more specifically by way of examples, but the present invention is not limited thereto.

EXAMPLES

Preparation of LTA Zeolites

LTA zeolite with the Si/Al ratio of 6, referred to LTA-6, was synthesized by the following steps: 11.78 g of Tetraethylammonium Hydroxide (TEAOH) 25% solution, 7.95 g of Diethyldimethylammonium Hydroxide (DEDMAOH) 20% solution, 1.64 g of Aluminum Sec-Butoxide, and 10 g of Ludox HS-40 Colloidal Silica was mixed within a Teflon liner of stainless-steel autoclave in sequence. Vigorous stirring is required after the addition of each substance. Afterward, 5 g of H$_2$O was evaporated from the mixture. The obtained mixture was sealed into a stainless-steel autoclave and aged in an air convention oven at 95° C. for 1 day. After the mixture cooled to room temperature, a solution contains 0.2 g of Sodium Chloride (NaCl), and 0.37 g of Tetramethylammonium Chloride (TMACl), and 5 g of H$_2$O was added dropwise with vigorous stirring. The mixture was then magnetically stirred at room temperature for a duration of 24 hours. Finally, the mixture was sealed into a stainless-steel autoclave and aged in an air convection oven at 98° C. for a duration of 13 days and then at 125° C. for a duration of 7 days. After hydrothermal synthesis, LTA zeolites were separated from liquid supernatant and then washed by deionized water for 5 times by centrifuge. Afterward, the as-synthesized LTA zeolites were dried in a vacuum oven at 60° C. overnight. Finally, LTA-6 was calcined at 600° C. using a heating rate of 2° C./min to remove the OSDAs. The calcination was conducted in continuous airflow (compressed air, Linde plc. HK) at a flow rate of 50 mL/min for a duration of 10 hours.

As-synthesized LTA-6 were first ion-exchanged in 1 M Ammonium Nitrate (NH$_4$NO$_3$) solution to obtain NH$_4^+$ form LTA. The ion exchange of NH$_4^+$ was executed at a solid/liquid ratio of 1 g/50 mL and magnetically stirred at 60° C. for a duration of 24 hours. Afterward, the LTA zeolites were separated by filtration and washed several times by deionized water. The washed LTA zeolites were finally dried in an air convection oven at 60° C. These procedures were repeated four times to complete the NH$_4^+$ exchange process. Proton form LTA zeolites were prepared by the calcination of NH$_4$ form LTA at 550° C. using a heating rate of 2° C./min. The calcination was conducted in continuous airflow (compressed air, Linde plc. HK) at a flow rate of 50 mL/min for a duration of 10 hours. Ion exchanges of Na$^+$, K$^+$, Mg$^{2+}$, and Ca$^{2+}$, respectively, were conducted by utilizing the NH$_4^+$ form LTA in 1 M Metal Nitrate solution at a solid/liquid ratio of 1 g/50 mL following the aforementioned procedures. Ion exchanges of all the transition metal cations (including Mn$^{2+}$, Co$^{2+}$, Ni$^{2+}$, Cu$^{2+}$, Zn$^{2+}$, Y$^{3+}$, La$^{3+}$, Ce$^{3+}$, Eu$^{3+}$, Tb$^{3+}$, and Yb$^{3+}$), respectively, were conducted by utilizing the Na$^+$ form LTA in 0.05 M Metal Acetate/Nitrate solution at a solid/liquid ratio of 1 g/100 mL following the aforementioned procedures at room temperature. Metal cation-exchanged LTA zeolites and proton (H⁺) form LTA zeolite were named M-LTA-6, where M denotes the type of charge-balancing cation.

Methods and Characterization

Structural Characterization

X-ray powder diffraction (XRD) was conducted using X'Pert3 Powder, PANalytical, equipped with Cu anode (λ=0.15406 nm) and operated at 40 V voltage and 40 mA current within 2θ from 5° to 50° at 0.026° per step to evaluate the crystallinity and phase purity of the zeolite adsorbents. X-ray energy dispersive spectroscopy (EDS) was measured using Oxford Aztec Energy X-MAX 50 attached to a scanning electron microscope (FEI Quanta 450FEG) to determine the elementary composition of the zeolite adsorbents. To increasing the accuracy, the elementary composition was calculated by the average of multiple spots from multiple coatings. Inductively coupled plasma optical emission spectroscopy (ICP-OES) was conducted on an Agilent 720ES with a concentric pneumatic nebulizer to reaffirm the ion exchange degree of zeolite adsorbents. Nitrogen ($N_2$) adsorption isotherms at −196.15° C. were measured using a Micromeritics 3Flex to obtain the porous properties of adsorbents. Specifically, the Brunauer-Emmett-Teller (BET) surface area was calculated by the BET theory. Micropore surface area, external surface area, and micropore volume were calculated by the t-plot method. Before the adsorption measurement, the adsorbents were activated under high vacuum ($10^{-6}$ pa) at 300° C. for 10 hours to remove the pre-adsorbed impurities. Synchrotron XRD data were collected at the PD beamline at the Australian Synchrotron, ANSTO, using a Mythen-II detector with the wavelength at 0.68887 Å. Synchrotron X-ray absorption spectroscopy (XAS) at the XAS beamline at the Australian Synchrotron, ANSTO. XAS spectra were recorded at the nickel K-absorption edge in transmission mode. The X-ray photoelectron spectroscopy (XPS) spectra were recorded with an XPS spectrometer (Thermo Scientific K-Alpha+, USA). In-situ DRIFTS spectra during the $NO_2$ adsorption process were collected using a Thermo Nicolet i550 spectrometer, with a scanning rate of 64 times and a resolution of 4 cm⁻¹ in 200 ppm NO balanced by $N_2$ (referred to as $NO/N_2$), with a scanning rate of 64 times and a resolution of 4 cm⁻¹. Before the adsorption measurement, the adsorbents were activated at 400° C. in 40 mL/min Ar flow for 3 hours to remove the pre-adsorbed impurities.

NO Adsorption/Desorption Experiments

NO adsorption/desorption was measured by using our in-house built column breakthrough dynamic adsorption apparatus (FIG. 1). In this experimental setup, a stainless-steel column with an inner diameter of 0.4 cm and a length of 10 cm was utilized to contain the adsorbents. The column was properly arranged into a furnace (Carbolite) and interconnected with the inlet and outlet tubing system. The flow rate of feed gas was accurately controlled by digital mass flow controllers (Alicat Scientific, USA). The concentration of $NO_x$ and accompanying gas components at the outlet was detected by a gas analyzer. Prior to the NO adsorption/desorption test, the column was loaded with 0.2 or 1.2 g of the adsorbent, respectively. The size of the adsorbent particles was around 0.5 mm, and the bed porosity was estimated to be within the range of 70% to 80%. The remaining part of the column was filled with glass beads. Subsequently, the adsorbent underwent activation in a continuous He flow at a flow rate of 40 mL/min. The activation process was carried out at either 300° C. or 600° C., respectively, with a heating rate of 2° C./min, and lasted for a duration of 10 hours.

NO adsorption tests at room temperature were conducted subsequent to the activation of adsorbents. The feed gas, referred to as $NO/N_2$, was prepared by mixing 1000 ppm NO (balanced by helium) at a flow rate of 40 ml/min and $N_2$ at a flow rate of 160 mL/min, with the total flow rate of 200 mL/min and the NO concentration of 200 ppm. The concentration of NO in the outlet was detected by a FTIR gas analyzer (MKS MultiGas 6030).

The capacity of NO adsorption was calculated by the following equation.

$$N_{NO} = \frac{Q}{22.4 \cdot w} \left( \int_0^{T_s} (C - C_d) dt \right)$$

where $N_{NO}$ denotes the NO adsorption capacity in mmol/g, Q denotes the total flow rate of the feed gas equivalent to 200 ml/min, w is the sample weight after activation in g, C denotes the NO concentration (200 ppm) in the feed gas, $C_d$ is the detected NO concentration in the outlet at time t, and Ts is the saturation time (The time between $C_d$ from 0 to 200 ppm) in minutes.

NO adsorption/desorption tests using $NO/N_2$ during programming heating were conducted subsequent to the activation of adsorbents at 300° C. or 600° C., respectively. After the activation of adsorbents, the temperature of the adsorption column was initially maintained at 80° C. Following the introduction of the $NO/N_2$ feed, the temperature of the adsorption column was progressively increased to 600° C., with a heating rate of 15° C./min. The adsorption or desorption of NO was defined by contrasting the concentration of NO in the outlet with the initial 200 ppm concentration in the feed gas.

NO adsorption/desorption test using the simulated engine exhaust gas (400 ppm NO, 400 ppm CO, 100 ppm $C_3H_8$, and 10% $CO_2$ (balanced by $N_2$)) were conducted after adsorbents activation at 600° C. Following the introduction of the simulated engine exhaust gas, the temperature of the adsorption column was elevated from 80° C. to 600° C., with a heating rate of 15° C./min. The feed gas was prepared by mixing the simulated engine exhaust gas at a flow rate of 100 ml/min and a balance gas (Air or $N_2$, respectively) at a flow rate of 100 mL/min, with the total flow rate of 200 mL/min. Simulated engine exhaust gas without $O_2$ was named NO/Mix without $O_2$, while the case with $O_2$ was named NO/Mix.

For the tests using wet tail gas, the balance gas (Air) of NO/Mix was bubbled through a water tank at room temperature (around 25° C.) or 40° C., generating feed gases with 1% and 2% $H_2O$, respectively. For the tests after $SO_2$ pre-treatment, the 600° C. activated adsorbent was exposed into wet $SO_2$ feed gas for 10 hours. The feed gas was prepared by mixing 200 ppm $SO_2$ (balanced by nitrogen) at a flow rate of 100 mL/min and wet Air at a flow rate of 100 mL/min, with the total flow rate of 200 mL/min. The concentration of $SO_2$ and $H_2O$ was 100 ppm and 2%, respectively. After $SO_2$ pre-treatment, the adsorbent was re-activated at 600° C. for NO adsorption/desorption tests.

Cyclic NO adsorption/desorption using NO/Mix was conducted by regenerating adsorbents at 600° C. for 1 hour in a continuous Ar flow at a flow rate of 40 ml/min. Subsequently, the adsorbent was allowed to cool down to 80° C. in Ar flow before commencing the next cycle. To further illustrate the reusability of our adsorbents under practical conditions, we simulated a scenario resembling the cold-start and shutdown of automobiles. Specifically, after the initial cycle of NO adsorption/desorption in the simulated wet tail gas with 2% $H_2O$, the supply of the feed gas was halted. Concurrently, the adsorbent underwent natural cooling to 80° C. without undergoing dry Ar swaps, with the adsorption column exposed to ambient air. The subsequent cycle was initiated once the adsorbent had been cooled down to 80° C.

Example 1

Characterization of Adsorbents

The LTA-6 zeolites were characterized by XRD, EDS, ICP-OES, and $N_2$ adsorption at 77 K for their LTA structure, Si/Al ratio, degree of ion exchange, and porous properties.

The XRD patterns of LTA-6 zeolites were consistent with the reported characteristics of LTA zeolites (FIGS. 2A to 2D), confirming their high crystallinity and phase purity. The Si/Al ratio and degree of ion exchange were determined by EDS and ICP-OES analysis to provide the elemental composition (FIG. 3). The actual Si/Al ratios LTA-6 were determined to be 5.5.

The degree of ion exchange is illustrated in FIG. 3, demonstrating a relatively high degree of ion exchange (over 60%) for alkali metal cations ($Na^+$ and $K^+$), alkaline earth metal cations ($Mg^{2+}$ and $Ca^{2+}$), and divalent transition metal cations ($Mn^{2+}$, $Co^{2+}$, $Ni^{2+}$, $Cu^{2+}$, and $Zn^{2+}$). However, trivalent transition metals ($Y^{3+}$, $La^{3+}$, $Eu^{3+}$, $Ce^{3+}$, $Tb^{3+}$, and $Yb^{3+}$), classified as rare-earth metals, exhibited a relatively low degree of ion exchange (below 40%) due to the steric restriction and limited diffusion kinetics caused by the large size of the hydrated rare-earth metal cations. In these rare-earth metal cation-exchanged LTA-6 zeolites, it appears that monovalent $Na^+$ remained to be the dominant cation. Notably, $Cu^{2+}$ exhibited an over-exchange with a degree of ion exchange above 100% in LTA-6, which is attributed to the overestimation of $Cu^{2+}$ resulting from the presence of both $Cu^{2+}$ and $(Cu-O-Cu)^+$ in Cu-LTA.

Figure 4A:
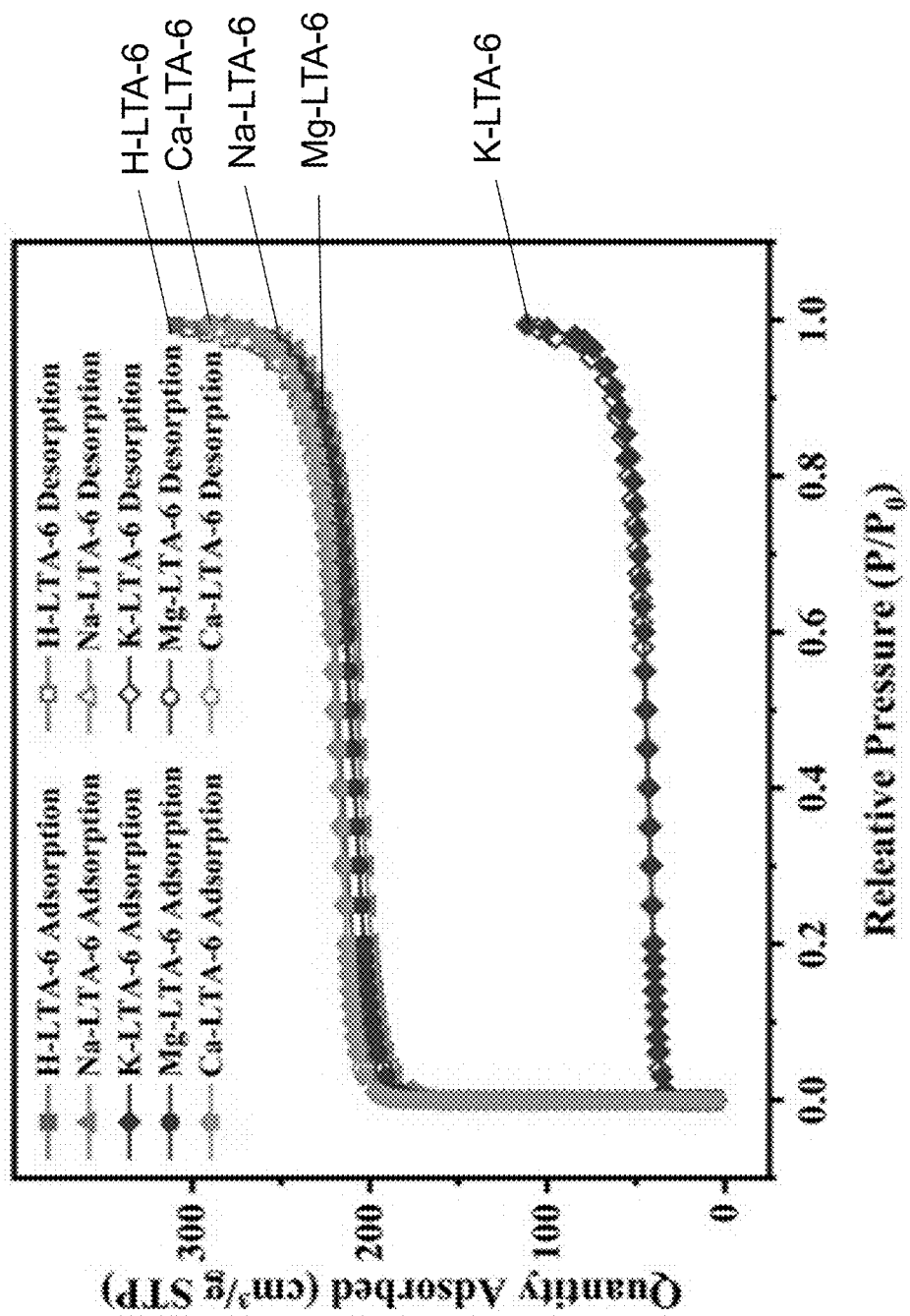
FIG. 4A shows the $N_2$ adsorption isotherms of H-, Na-, K, Mg-, and Ca-LTA-6 zeolites.
Figure 4B:
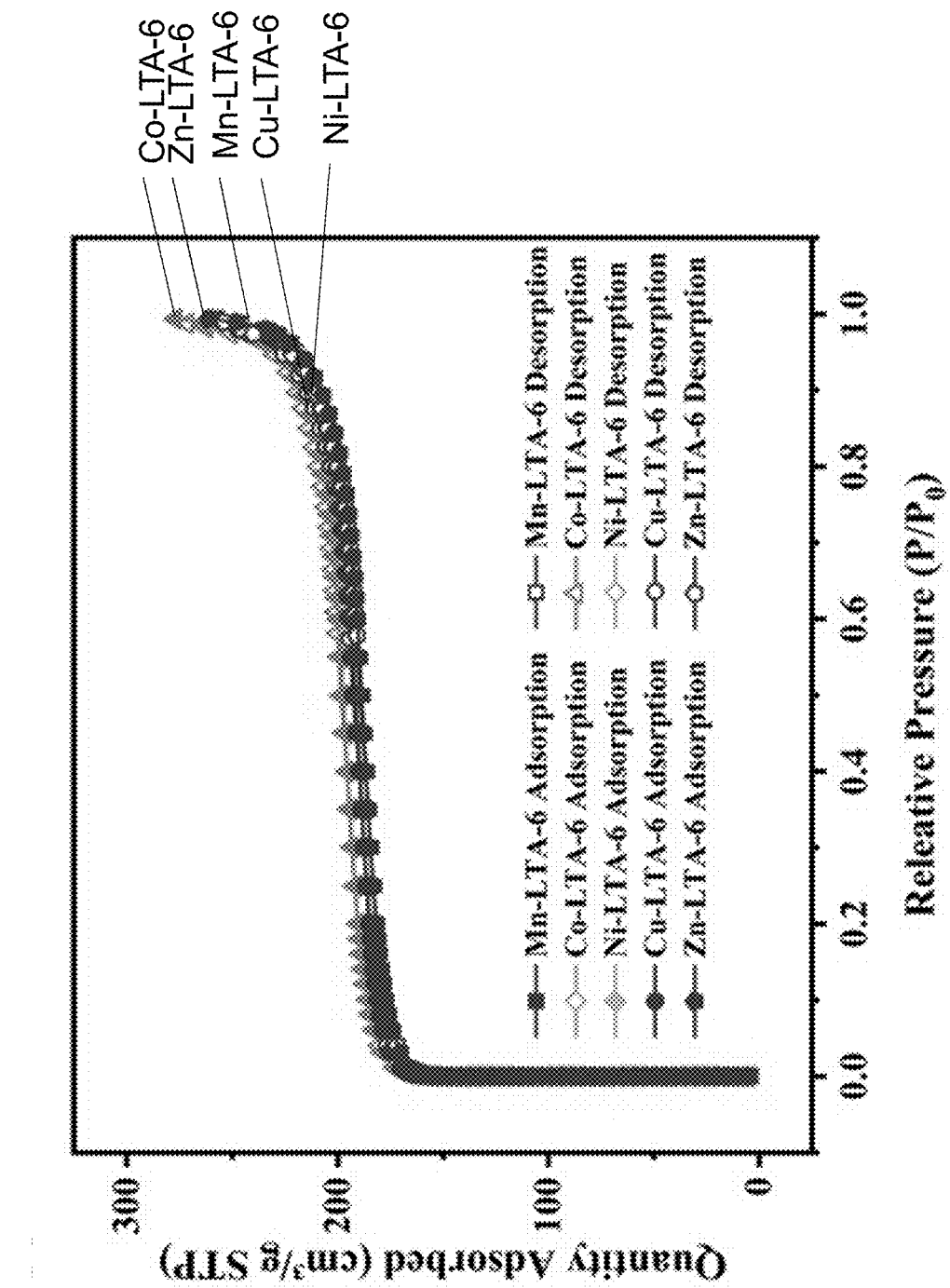
FIG. 4B shows the $N_2$ adsorption isotherms of Mn-, Co-, Ni-, Cu-, and Zn-LTA-6 zeolites.
Figure 4C:
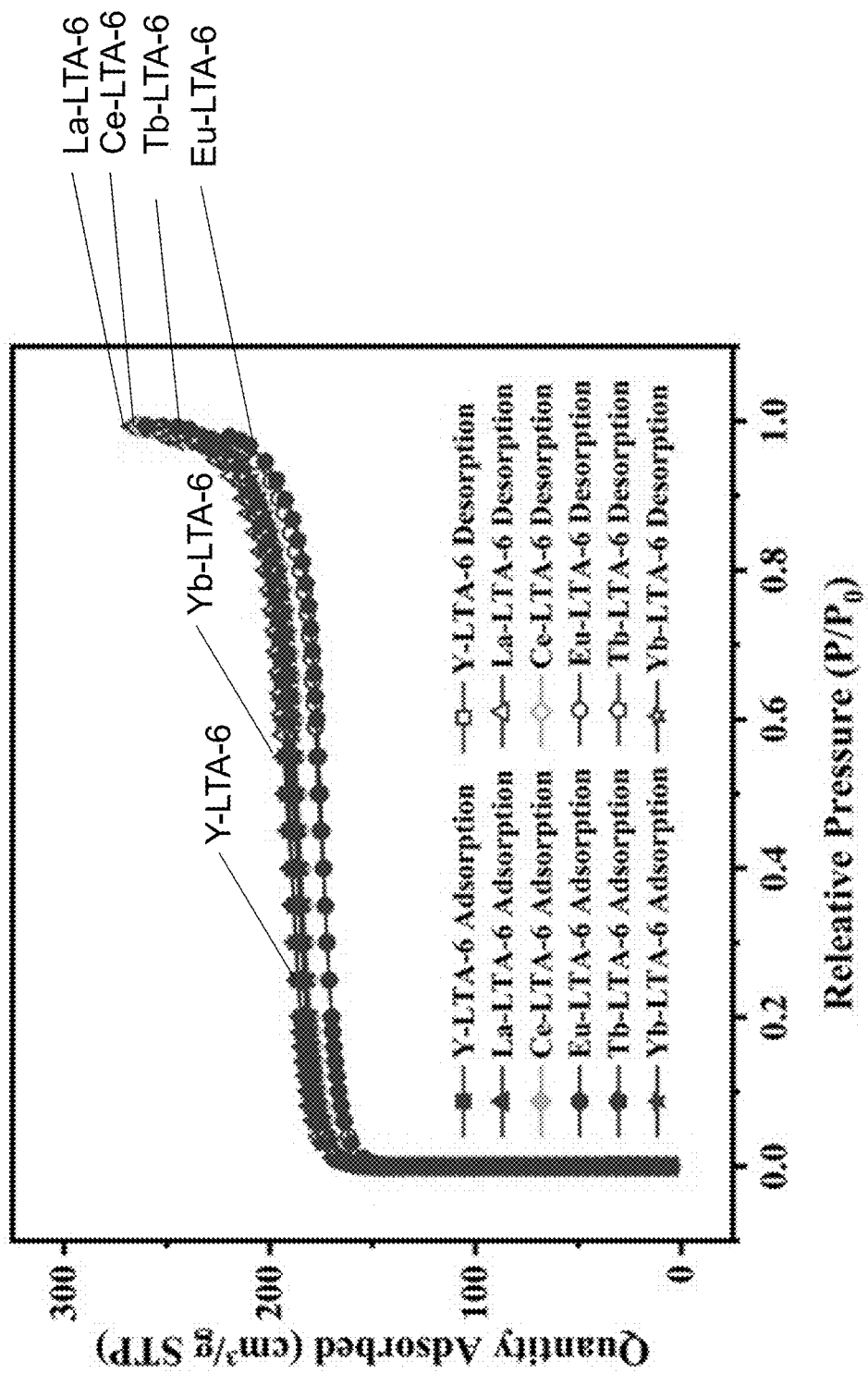
FIG. 4C shows the $N_2$ adsorption isotherms of Y-, La-, Ce-, Eu-, Tb-, and Yb-LTA-6 zeolites.
Figure 6A:
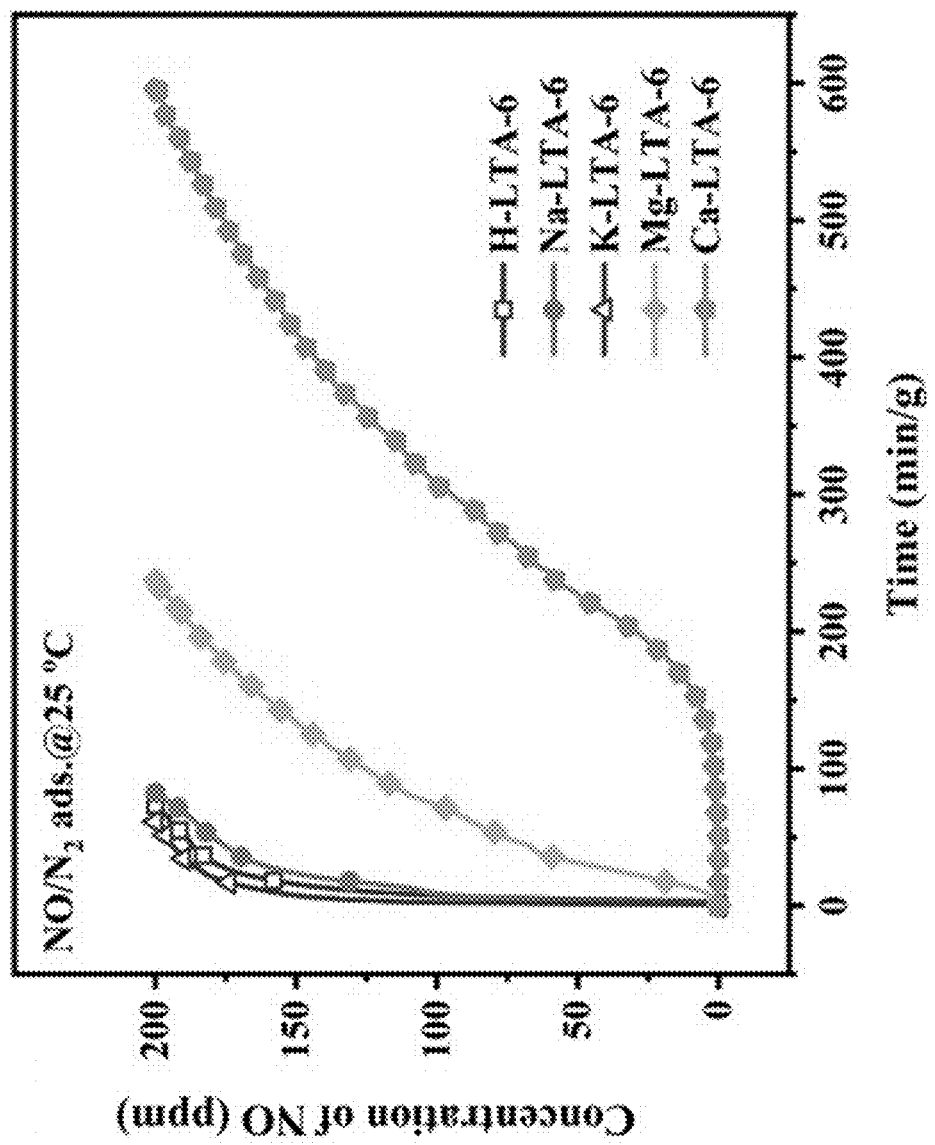
FIG. 6A shows the NO breakthrough curves of H-, Na-, K-, Mg-, and Ca-LTA-6 zeolites (activated at 300° C.) during NO adsorption using $NO/N_2$ (200 ppm NO balanced by $N_2$) at room temperature (about 25° C.)
Figure 6B:
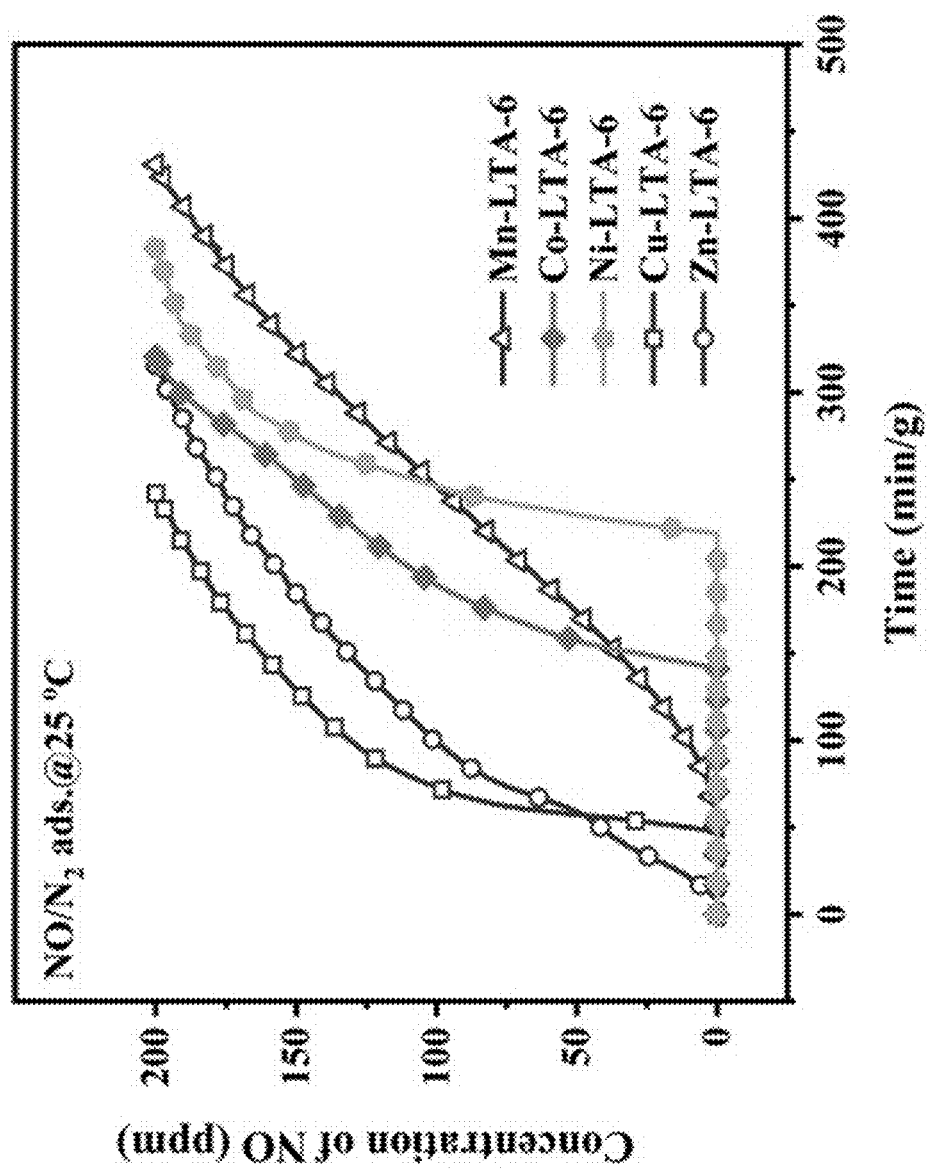
FIG. 6B shows the NO breakthrough curves of Mn-, Co-, Ni-, Cu-, and Zn-LTA-6 zeolites (activated at 300° C.) during NO adsorption using $NO/N_2$ (200 ppm NO balanced by $N_2$) at room temperature (about 25° C.)
Figure 6C:
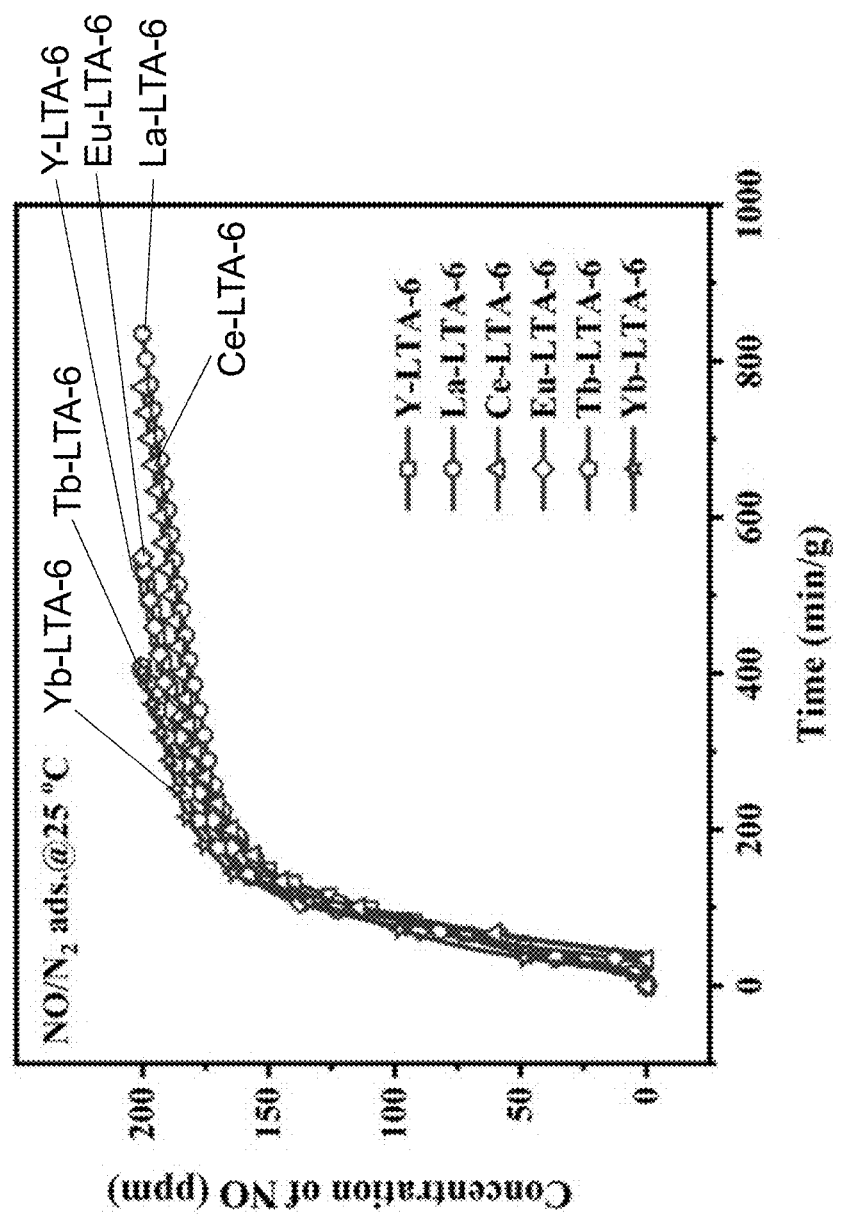
FIG. 6C shows the NO breakthrough curves of Y-, La-, Ce-, Eu-, Tb-, and Yb-LTA-6 zeolites (activated at 300° C.) during NO adsorption using $NO/N_2$ (200 ppm NO balanced by $N_2$) at room temperature (about 25° C.)
Figure 6D:
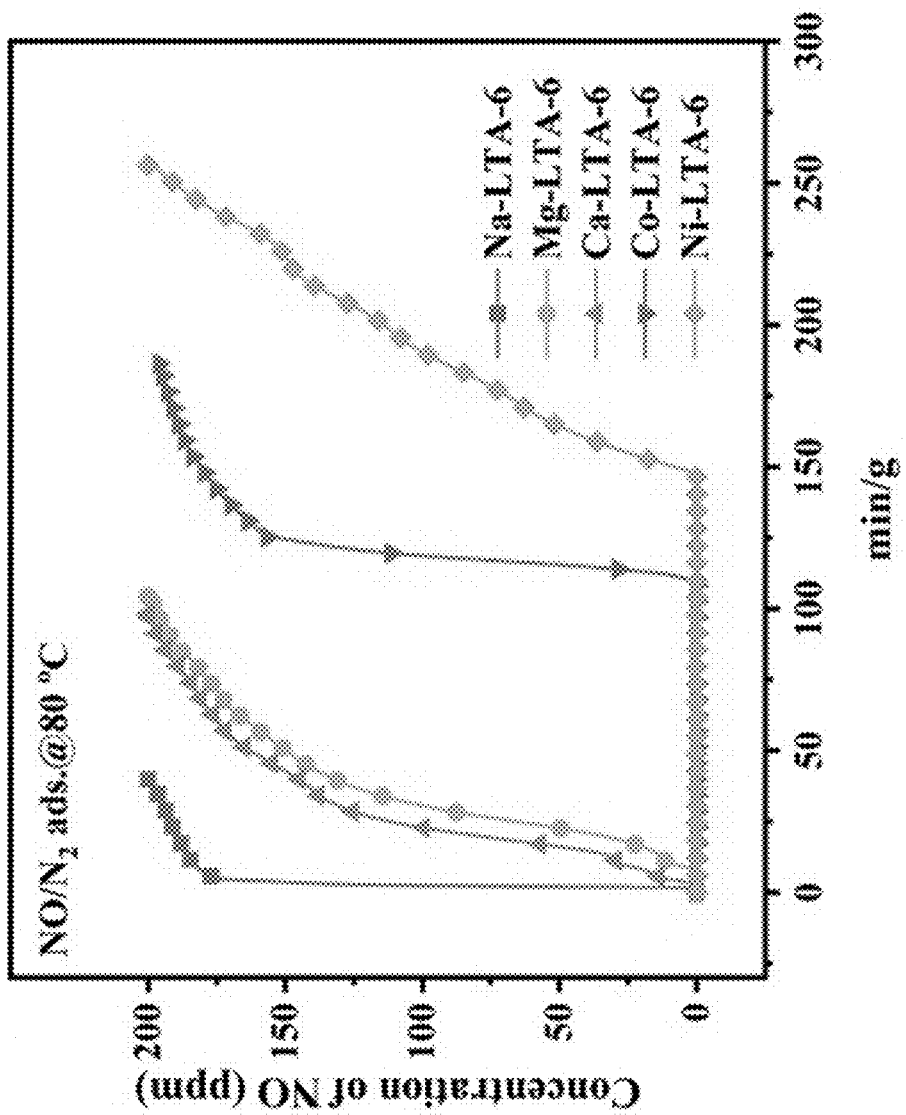
FIG. 6D shows the NO breakthrough curves of Na-, Mg-, Ca-, Co-, and Ni-LTA-6 zeolites during NO adsorption using $NO/N_2$ (200 ppm NO balanced by $N_2$) at 80° C.

The microporous feature of LTA-6 zeolites was determined by $N_2$ adsorption isotherms at 77 K, reflected by their Type I isotherms (FIGS. 4A to 4C). The surface area and pore volume were calculated based on the $N_2$ adsorption results at 77 K, with LTA-6 zeolites exhibiting similar values (FIG. 5). An exception is K-LTA, which exhibited negligibly small surface area and pore volume attributed to the blockage of the probe molecule $N_2$ by the large $K^+$ cation. Additionally, slightly smaller surface area and pore volume were observed in LTA zeolites exchanged with divalent and trivalent transition metal cations, primarily due to the higher molecular weight associated with heavier transition metals than alkali and alkaline earth metals.

Example 2

NO Adsorption Capacity of Metal Cation-Exchanged LTA Zeolites

To evaluate the potential of the non-noble metal cation-exchanged LTA-6 for PNA, NO adsorption tests at two distinct temperatures: 25° C. (room temperature) and 80° C. (the initial temperature of the cold-start period) were conducted, where column breakthrough adsorption configurations were employed, utilizing a gas mixture of 200 ppm NO balanced with $N_2$ (denoted as $NO/N_2$) and 0.2 g loading of the non-noble metal cation-exchanged LTA-6. Among the studied cations, $Na^+$, $Ca^{2+}$, $Mg^{2+}$ $Co^{2+}$, and $Ni^{2+}$, were selected as representatives for monovalent and divalent cations for further discussion. Upon evaluating the calculated NO adsorption capacity at room temperature, the benchmark adsorbent, H-LTA-6, showed negligible NO adsorption capacity (FIGS. 6A to 6D and FIG. 7). Similarly, monovalent $Na^+$-exchanged LTA-6 also exhibited negligible NO capacity. In contrast, divalent and trivalent metal cations-exchanged LTA-6 exhibited pronounced NO adsorption. This observation suggests that divalent metal cations as effective NO adsorption sites, which is further demonstrated by the DFT binding energy which will be discussed later on.

Figure 8A:
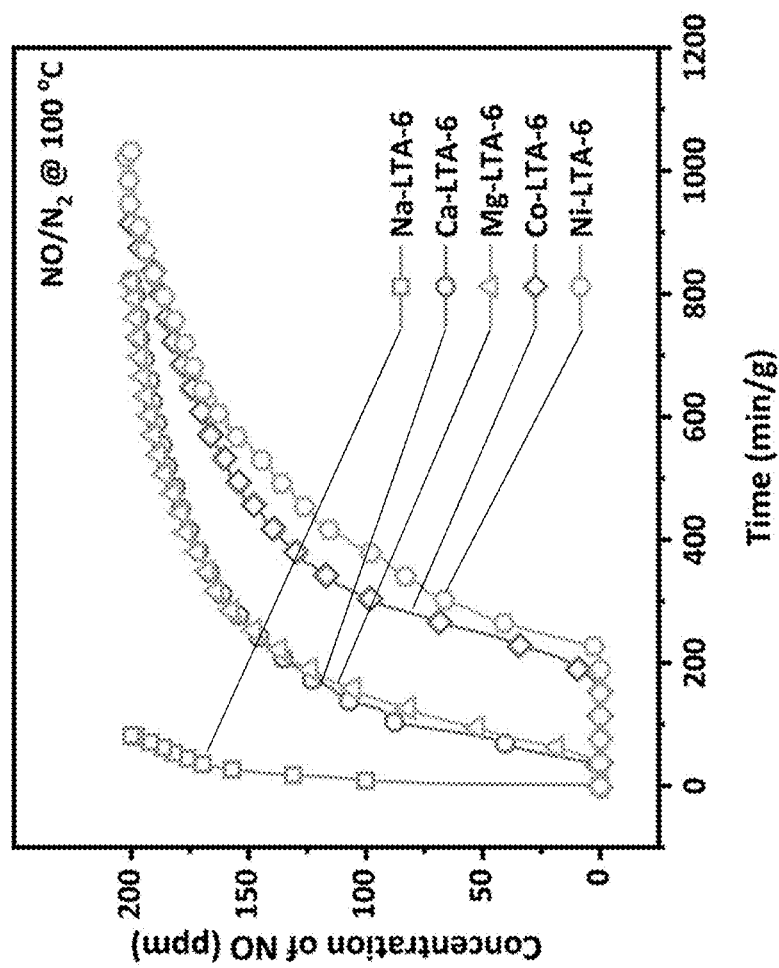
FIG. 8A shows the NO breakthrough curves of Na-, Mg-, Ca-, Co-, and Ni-LTA-6 zeolites of during NO adsorption using $NO/N_2$ (200 ppm NO balanced by $N_2$) at 100° C.
Figure 8B:
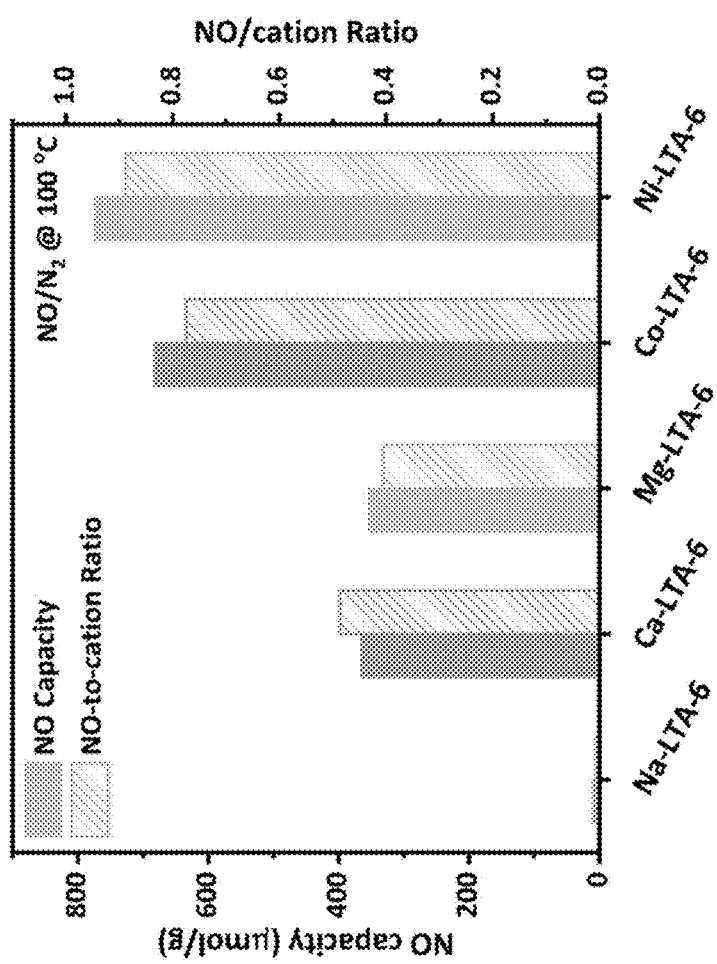
FIG. 8B shows the NO storage capacity at and NO/cation ratio of Na-, Mg-, Ca-, Co-, and Ni-LTA-6 zeolites in $NO/N_2$ (200 ppm NO balanced by $N_2$) at 100 kPa at 100° C.

As mentioned, it is appreciated that the cold-start period of engine would last at least until the engine temperature reaches 200° C. That said, it would be expected that an effective adsorbent for PNA would be at least capable of adsorbing NO at any temperature below 200° C. As such, NO adsorption tests at 100° C. were further conducted on LTA-6 with the monovalent and divalent cations representatives (i.e., $Na^+$, $Ca^{2+}$, $Mg^{2+}$ $Co^{2+}$, and $Ni^{2+}$). As shown in FIGS. 8A and 8B, similarly, the divalent $Ca^{2+}$, $Mg^{2+}$, $Co^{2+}$, and $Ni^{2+}$-exchanged LTA-6 exhibited pronounced NO adsorption. Furthermore, Ni-LTA-6 exhibited the highest NO capacity and NO/cation ratio among the studied zeolites, signifying Ni as the most effective NO adsorption site.

Figure 8C:
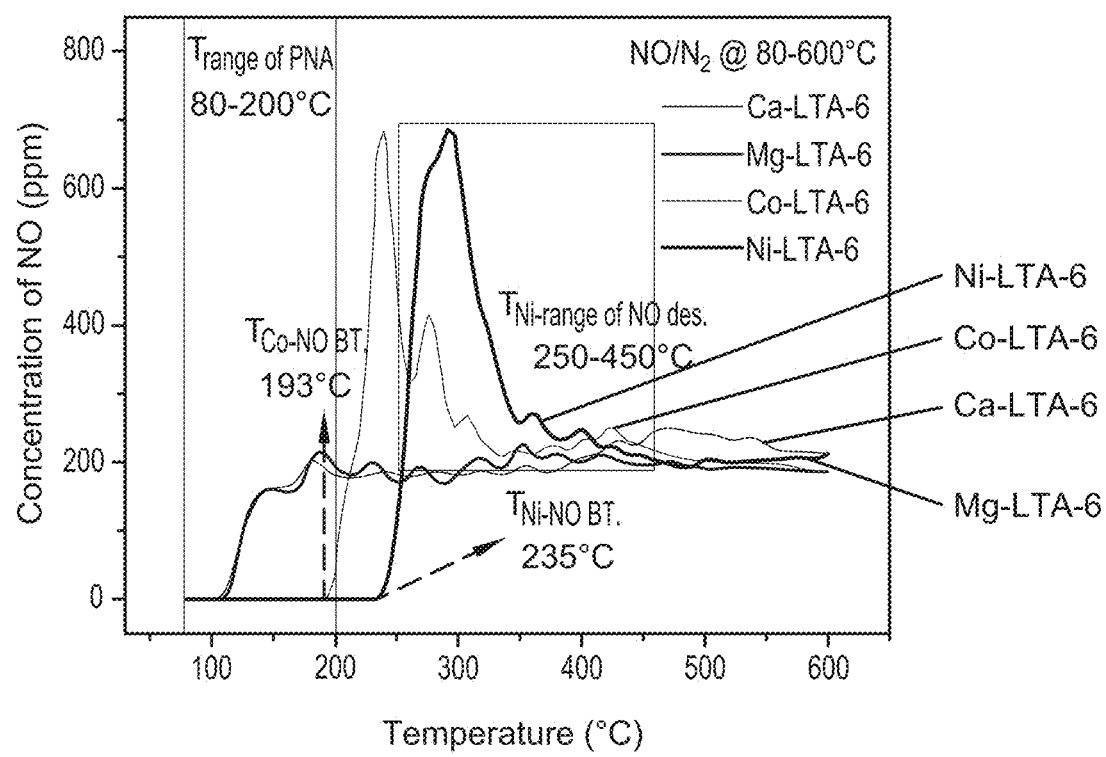
FIG. 8C shows the NO breakthrough curves of Na-, Mg-, Ca-, Co-, and Ni-LTA-6 zeolites (activated at 300° C.) during NO adsorption/desorption with programming heating from 80 to 600° C. at a heating rate of 15° C./min.

Given that PNA requires adsorbents to be capable of NO adsorption between 80-200° C. and subsequent desorption within 250-450° C. under rapid heating, the temperature range of NO adsorption and desorption for divalent non-noble metal cations-exchanged LTA-6 in this work was investigated. As shown in FIG. 8C, Ni-LTA-6 outperformed the other zeolites by exhibiting the highest breakthrough temperature for NO adsorption. This finding solidifies the superior NO adsorption ability of Ni sites than other divalent metal cations. Notably, Ni-LTA-6 not only achieves complete NO adsorption between 80-235° C. but also facilitates thorough NO desorption within 250-450° C. This outcome highlights the appropriate adsorption strength of NO by Ni sites, aligning with the prerequisite of PNA.

Figure 8D:
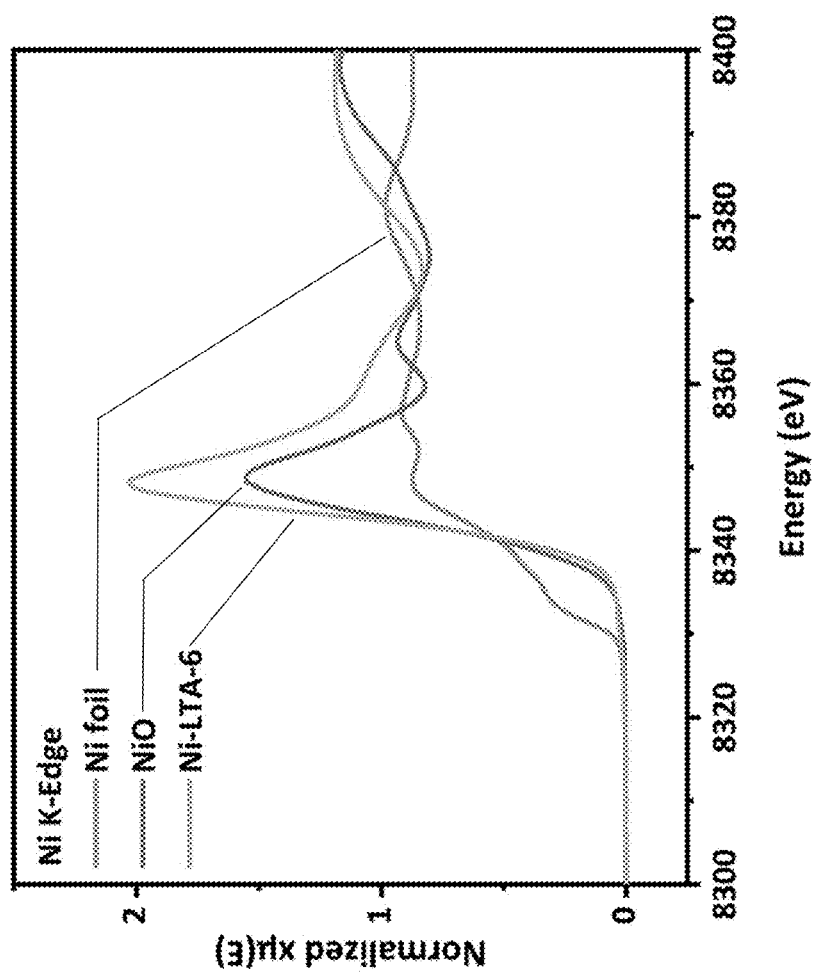
FIG. 8D shows the Ni K0edge XANES spectra of Ni-LTA-6, Ni foil, and NiO.
Figure 8E:
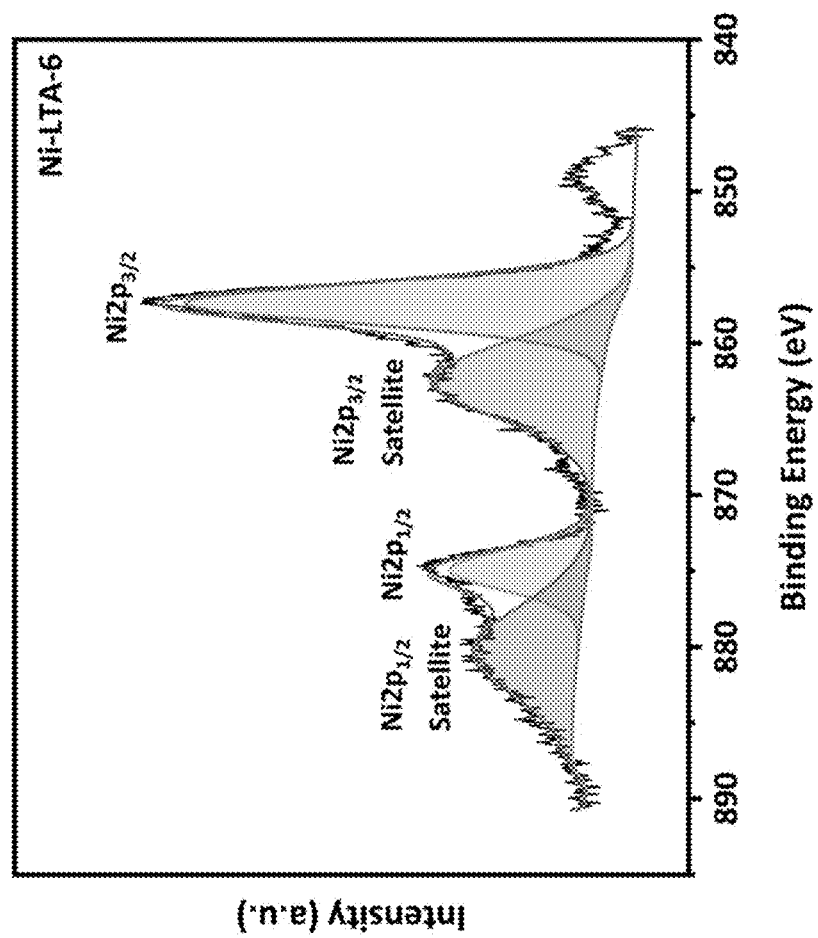
FIG. 8E shows the XPS spectra of Ni $2p$ in LTA-6.
Figure 8F:
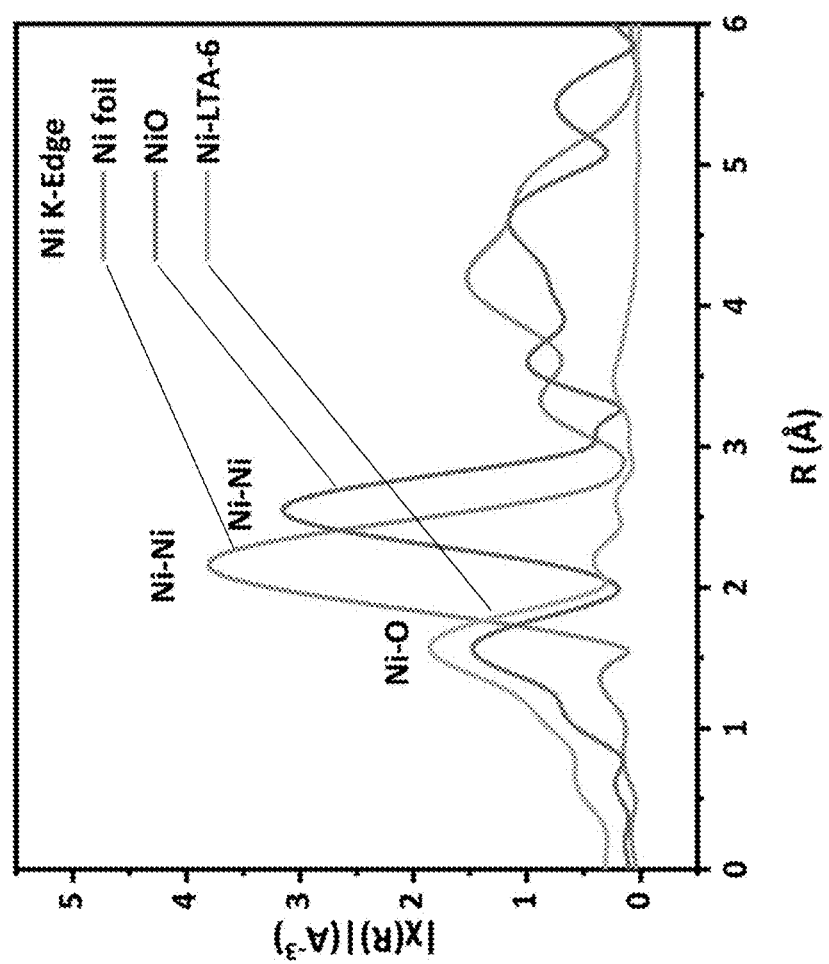
FIG. 8F shows the Fourier transform of $k^2$-weighted EXAFS spectra in the R-space for Ni-LTA-6, Ni foil, and NiO.

The divalent cationic nature of well-dispersed Ni within Ni-LTA-6 was reaffirmed by the following characterizations. Specifically, the X-ray absorption near-edge structure (XANES) analysis of Ni K-edge exhibited a coincident absorption edge between Ni-LTA-6 and NiO (FIG. 8D), indicating the +2 oxidation state of Ni within Ni-LTA-6. An analogous result was also confirmed through the analysis of Ni2p using X-ray photoelectron spectroscopy (XPS) (FIG. 8E). Furthermore, the results derived from extended X-ray absorption fine structure (EXAFS) analysis in R-space reveal the well-dispersion of isolated $Ni^{2+}$ within the Ni-LTA-6 framework (FIG. 8F), as evidenced by the absence of pronounced Ni—Ni bond and the dominating presence of Ni—O (zeolite framework O) bond.

The efficiency of $Ni^{2+}$ as NO adsorption site was compared with Pd sites, using NO/metal (cation) ratios as the normalized criterion. Notably, Ni-LTA-6 demonstrated the NO/Ni ratio of 0.89 at 100° C. (FIG. 8B), surpassing most reported Pd-zeolites (NO/Pd ratios below 0.7) and comparably approaching the highest reported NO/Pd ratios (between 0.09-1) at the same temperature (FIG. 8G). This result demonstrates $Ni^{2+}$ as the efficient NO adsorption site within LTA-6. More importantly, Ni-LTA-6 showed a remarkable NO capacity of 773 μmol/g at 100° C. (FIG. 8B), which is more than two times higher than the reported NO capacity of Pd-zeolites (typically below 200 μmol/g) at the same temperature. Such a superior NO capacity of Ni-LTA-6 is attributed to the higher achievable loading of well-dispersed isolated $Ni^{2+}$ (around 5 wt %, 2 at % of Ni-LTA-6) than that of Pd species (typically below 2 wt %, 0.4 at % of Pd-zeolites to ensure the formation of isolated Pd species without aggregation) as efficient NO adsorption sites. As a result, $Ni^{2+}$ can be recognized as superior NO adsorption sites in comparison to Pd species due to the comparable NO adsorption ability, ease of incorporation, and significantly lower cost.

Example 3

Mechanism of NO Adsorption

Figure 9A:
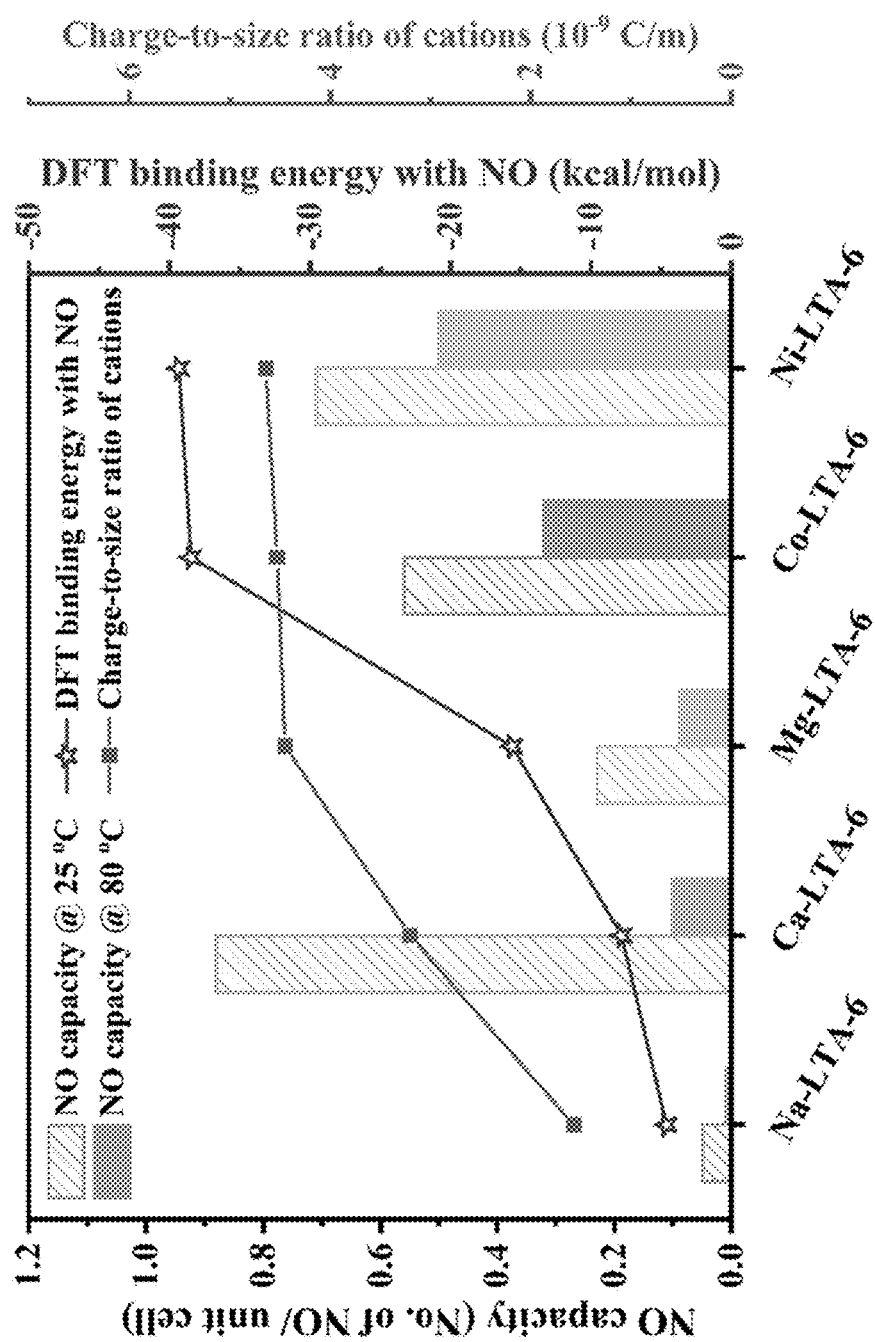
FIG. 9A shows the relationship between NO adsorption capacity, DFT binding energy, and charge-to-size ratio of metal cations. The NO adsorption was measured using $NO/N_2$ (200 ppm NO balanced by $N_2$) at room temperature and 100 kPa. Number of NO/unit cell was used as a normalized unit for capacity to avoid the deviation caused by the different weights of metal cations.

The DFT binding energy with NO was calculated to evaluate the adsorption strength toward NO from non-noble metal cation-exchanged LTA zeolites. As shown in FIG. 9A, $Na^+$, $Ca^{2+}$, and $Mg^{2+}$-exchanged LTA-6 exhibited an increment in DFT binding energies with NO, corresponding to the ascending charge-to-size ratio of the cations. This observation indicates that NO adsorption within these adsorbents is governed by electrostatic interactions between NO and non-noble metal cations. Notably, $Mg^{2+}$, $Co^{2+}$ and $Ni^{2+}$ feature similar charge-to-size ratios, which would typically result in similar electrostatic forces during NO adsorption. Nevertheless, Co-LTA-6 and Ni-LTA-6 exhibited notably higher binding energies with NO than Mg-LTA-6 (FIG. 9A), indicating that the adsorption of NO by $Co^{2+}$ and $Ni^{2+}$ sites is governed by different driving forces. Moreover, it is important to note that electrostatic interactions proved ineffectiveness for NO adsorption at temperatures exceeding 110° C., as demonstrated by the breakthrough of NO occurring around 110° C. from Ca-LTA-6 and Mg-LTA-6 (FIG. 8C). Therefore, the superior NO adsorption ability of Co-LTA-6 and Ni-LTA-6 at temperatures above 110° C. (FIG. 8C), which is crucial for practical PNA, is attributed to interactions other than electrostatic forces.

Meanwhile, the higher NO capacity of Ca-LTA-6 than that of $Mg^{2+}$, $Co^{2+}$ and $Ni^{2+}$ at room temperature is attributed to the "appropriate" charge-to-size ratio of $Ca^{2+}$, while $Mg^{2+}$, $Co^{2+}$, and $Ni^{2+}$ featuring excessive large charge-to-size ratio suffers a more significant "shielding effect". Specifically, $Mg^{2+}$, $Co^{2+}$, and $Ni^{2+}$ sites appears to be more vulnerable to pre-adsorbed contaminants that are hard to be desorbed (e.g., $H_2O$ and a small quantity of chemisorbed $CO_2$), due to the strong adsorption strength. The accessible NO capacity of $Mg^{2+}$, $Co^{2+}$, and $Ni^{2+}$-exchanged LTA-6 was therefore restricted.

Figure 9B:
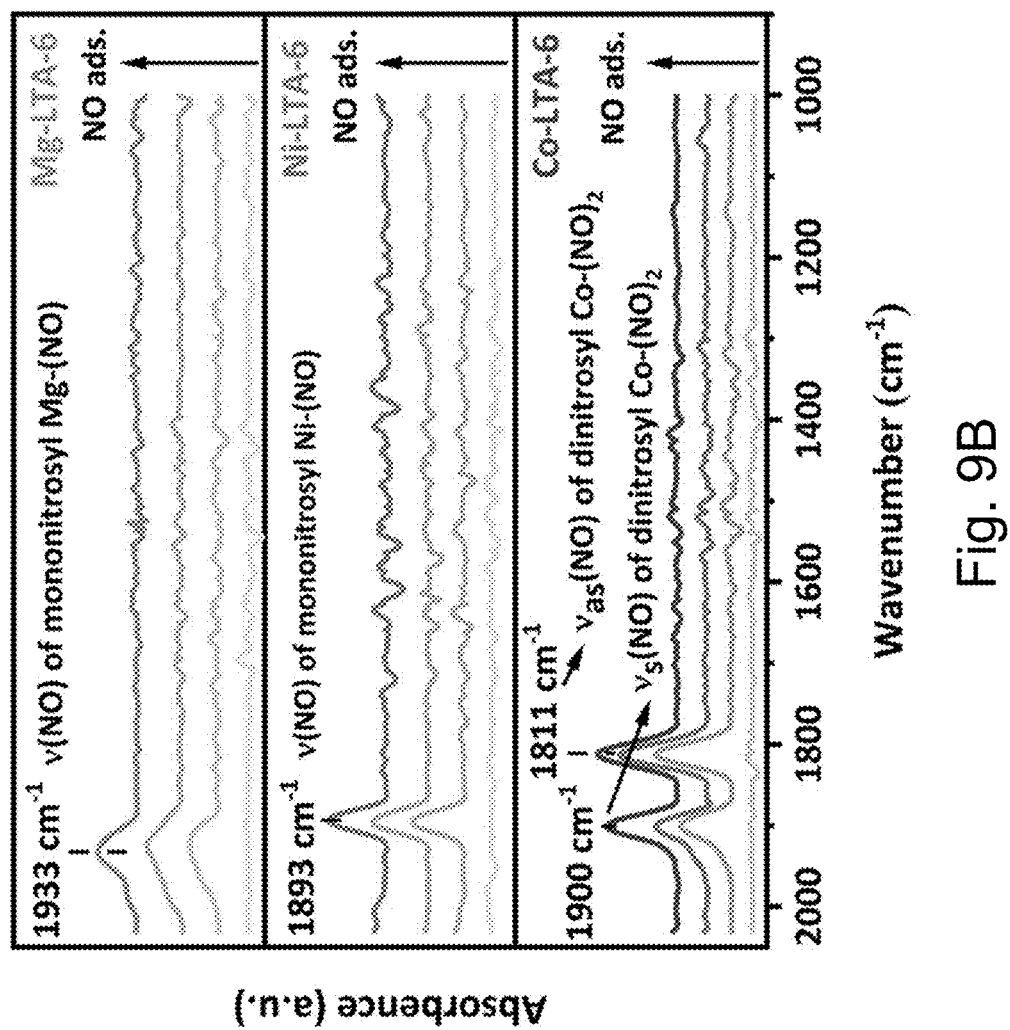
FIG. 9B shows the in-situ DRIFTS results of Mg-, Ni-, and Co-LTA-6 during NO adsorption.

To further explore the mechanism of NO adsorption among $Co^{2+}$ and $Ni^{2+}$ sites, in-situ DRIFTS test during NO adsorption was conducted among $Mg^{2+}$, $Co^{2+}$, and $Ni^{2+}$ exchanged LTA-6. The results plotted in FIG. 9B showcases the adsorbed NO as mononitrosyls among $Mg^{2+}$ and $Ni^{2+}$ sites. Notably, the back-bonding interaction between d-orbital of $Ni^{2+}$ and π* orbital of NO was demonstrated by the redshifted N—O stretch from 1933 $cm^{-1}$ (in Mg-LTA-6) to 1893 $cm^{-1}$ (in Ni-LTA-6). This finding reveals (π–) back-bonding interaction as the major driving force for the superior NO adsorption ability of Ni-LTA-6. By contrast, the dominant NO species adsorbed in Co-LTA-6 is found to be dinitrosyl, evidenced by the double bands at 1900 $cm^{-1}$ and 1811 $cm^{-1}$. The superior NO adsorption ability of Ni-LTA-6 than that of Co-LTA-6 may be attributed to the stronger binding energy of mononitrosyl than dinitrosyl.

Example 4

Operating Temperature Ranges of NO Adsorption/Desorption on Ni-LTA-6 and Co-LTA-6 During Programming Heating To evaluate the NO adsorption/desorption performance of Ni-LTA-6 and Co-LTA-6 under the operational conditions of PNA, a series of column breakthrough adsorption/desorption experiments were conducted using 0.2 g loading of Ni-LTA-6 and Co-LTA-6, $NO/N_2$ at temperatures elevating from 80° C. to 600° C., with a heating rate of 15° C./min.

Figure 10A:
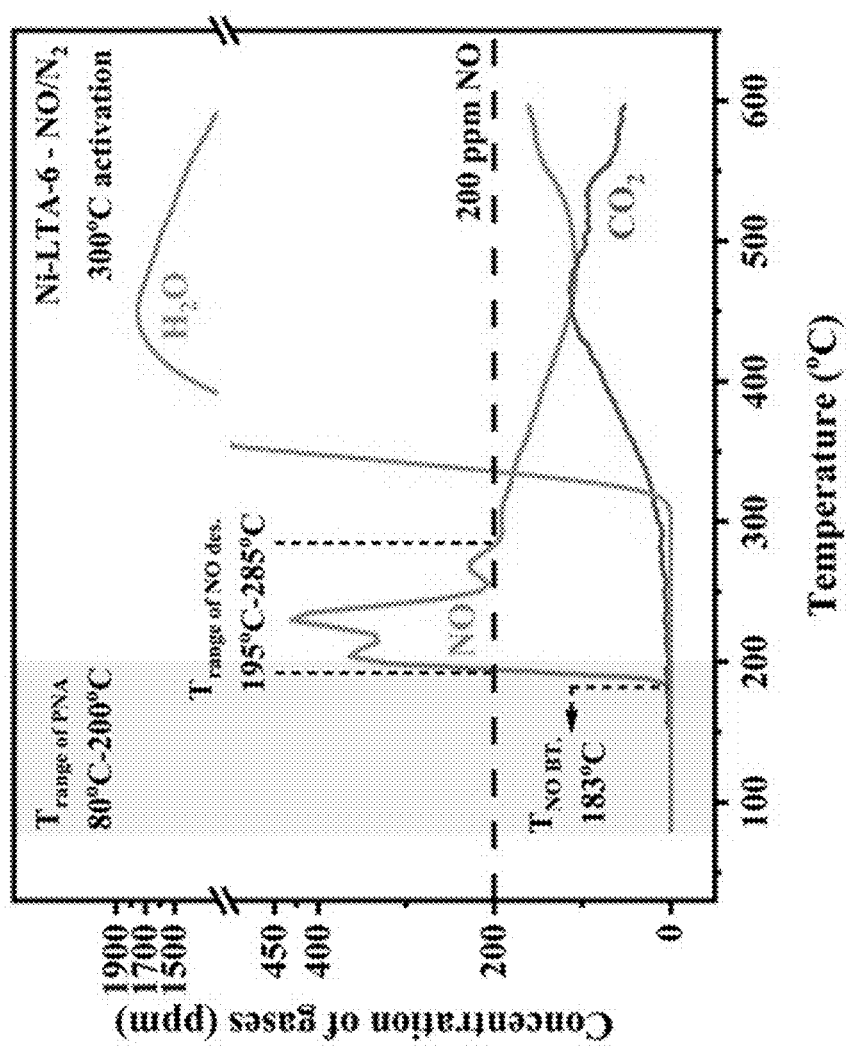
FIG. 10A shows the breakthrough curves of NO, $CO_2$ and $H_2O$ of Ni-LTA-6 (activated at 300° C.) in $NO/N_2$ (200 ppm NO balanced by $N_2$) during programming heating from 80° C. to 600° C. at a heating rate of 15° C./min.

As depicted in FIG. 10A, the 200 ppm of NO in $NO/N_2$ can be completely captured by 300° C.-activated Ni-LTA-6 within the temperature range of 80-183° C. The breakthrough of NO occurred beyond 183° C. and subsequent desorption took place within the temperature range of 195-285° C. Notably, after NO desorption, the exhaust NO concentration declined below 200 ppm at temperatures exceeding 300° C. Concurrently, desorption of $H_2O$ and $CO_2$ was observed within the same temperature range (FIG. 10A). It is believed that these desorbed $H_2O$ and $CO_2$ species are those strongly pre-adsorbed on the adsorbent from ambient air during storage, which appears not able to be completely desorbed upon activation at 300° C. Accordingly, a fraction of the $Ni^{2+}$ cations in 300° C.-activated LTA-6, which function as strong NO adsorption sites, become occupied by these strongly adsorbed contaminants. As a result, upon the desorption of these contaminants at temperatures above 300° C., additional NO molecules were captured by the newly released $Ni^{2+}$ sites, leading to a decline in the NO concentration below 200 ppm.

Figure 10B:
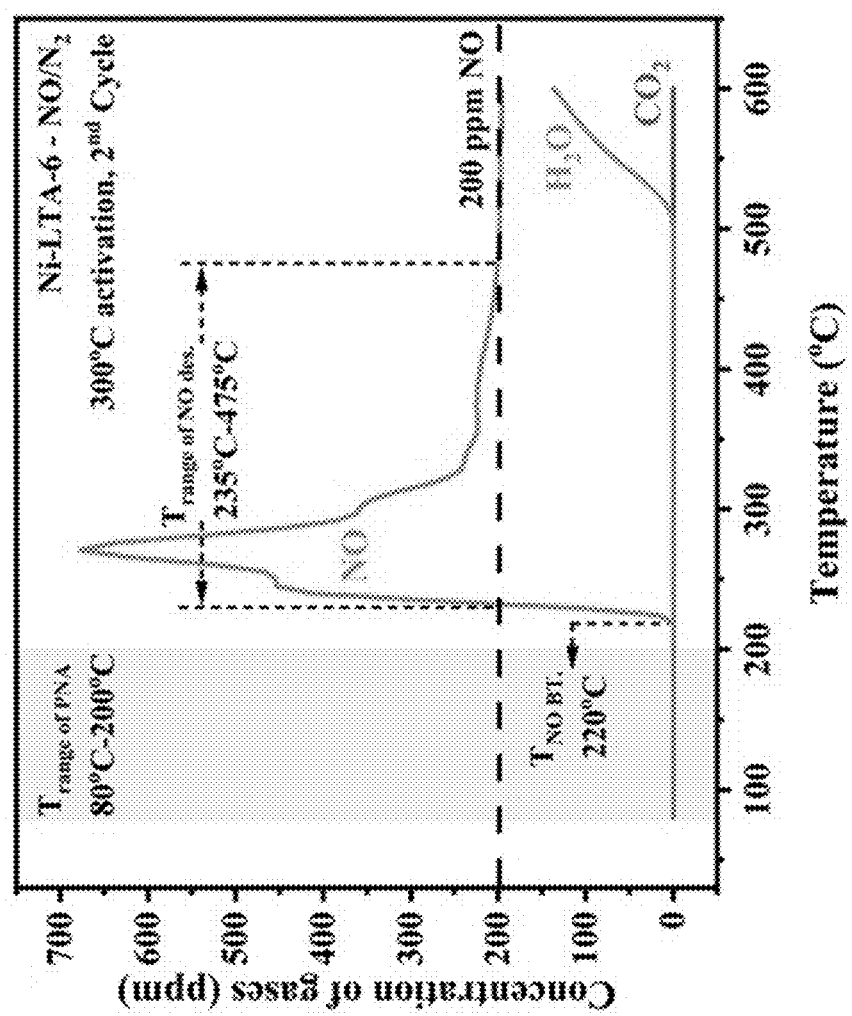
FIG. 10B shows the breakthrough curves of NO, $CO_2$ and $H_2O$ of Ni-LTA-6 (300° C. activated, and completed the $1^{st}$ cycle programming heating from 80° C. to 600° C.) in $NO/N_2$ (200 ppm NO balanced by $N_2$) during programming heating from 80° C. to 600° C. at a heating rate of 15° C./min for the $2^{nd}$ cycle.
Figure 10C:
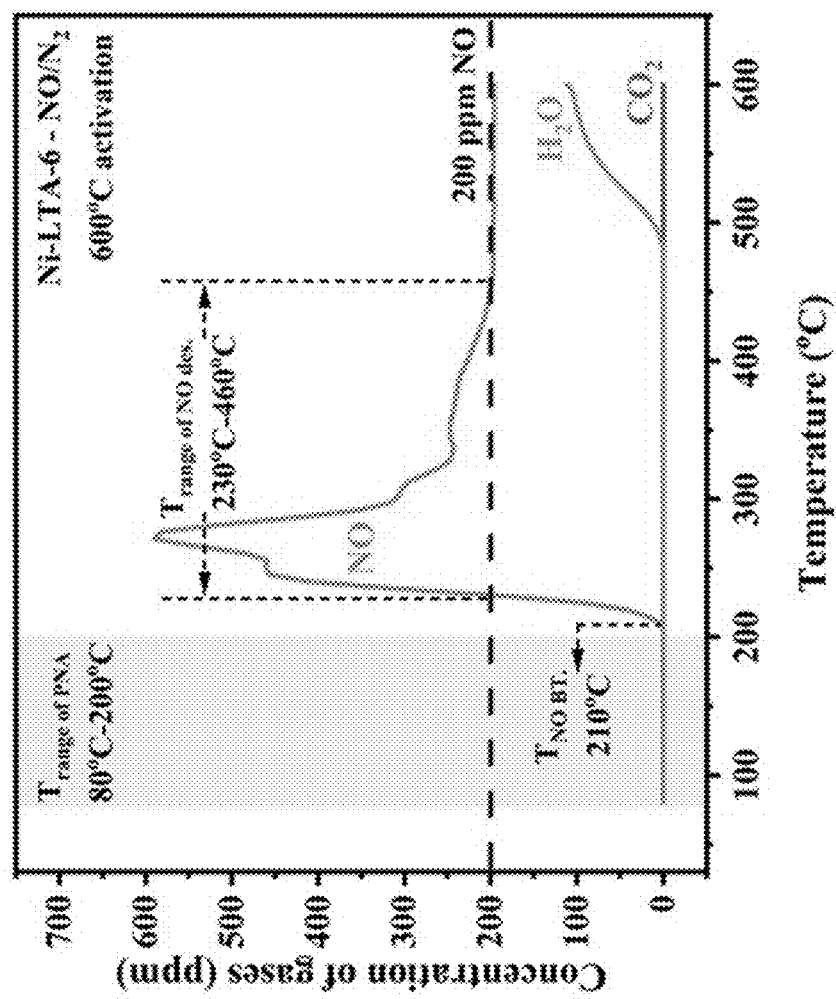
FIG. 10C shows the breakthrough curves of NO, $CO_2$ and $H_2O$ of Ni-LTA-6 (600° C. activated) in $NO/N_2$ (200 ppm NO balanced by $N_2$) during programming heating from 80° C. to 600° C. at a heating rate of 15° C./min.

These inferences appear to be supported by the NO adsorption/desorption behaviors of 300° C.-activated Ni-LTA-6 during the 2nd cycle (previously heated to 600° C. in the 1st cycle), as well as those of 600° C.-activated Ni-LTA-6 (FIGS. 10B and 10C), where the strongly adsorbed $H_2O$ and $CO_2$ were removed by 600° C. activation/regeneration. Specifically, in both cases, the concentration of NO remains consistently around the initial concentration of 200 ppm at temperatures above NO desorption, suggesting the absence of NO adsorption.

Figure 10D:
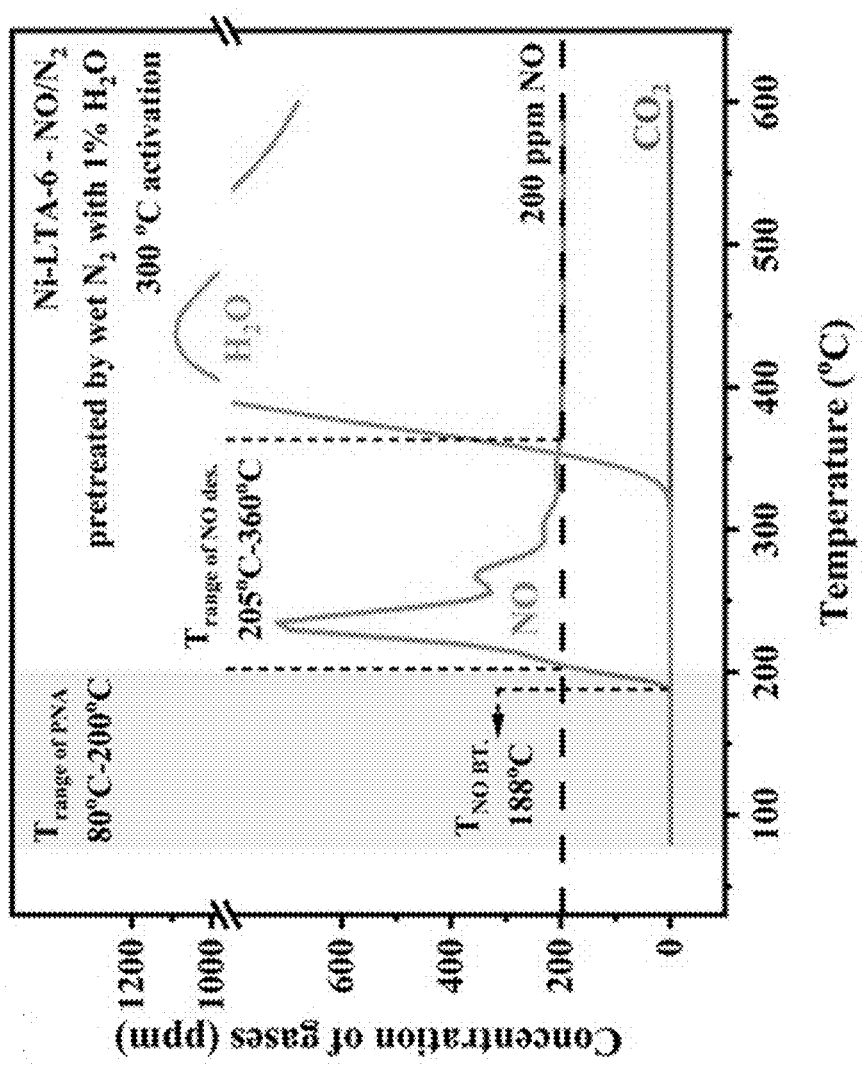
FIG. 10D shows the breakthrough curves of NO, $CO_2$ and $H_2O$ of Ni-LTA-6 (first activated at 600° C., pretreated by $N_2$ with 1% $H_2O$, and finally activated at 300° C.) in $NO/N_2$ (200 ppm NO balanced by $N_2$) during programming heating from 80° C. to 600° C. at a heating rate of 15° C./min.
Figure 10E:
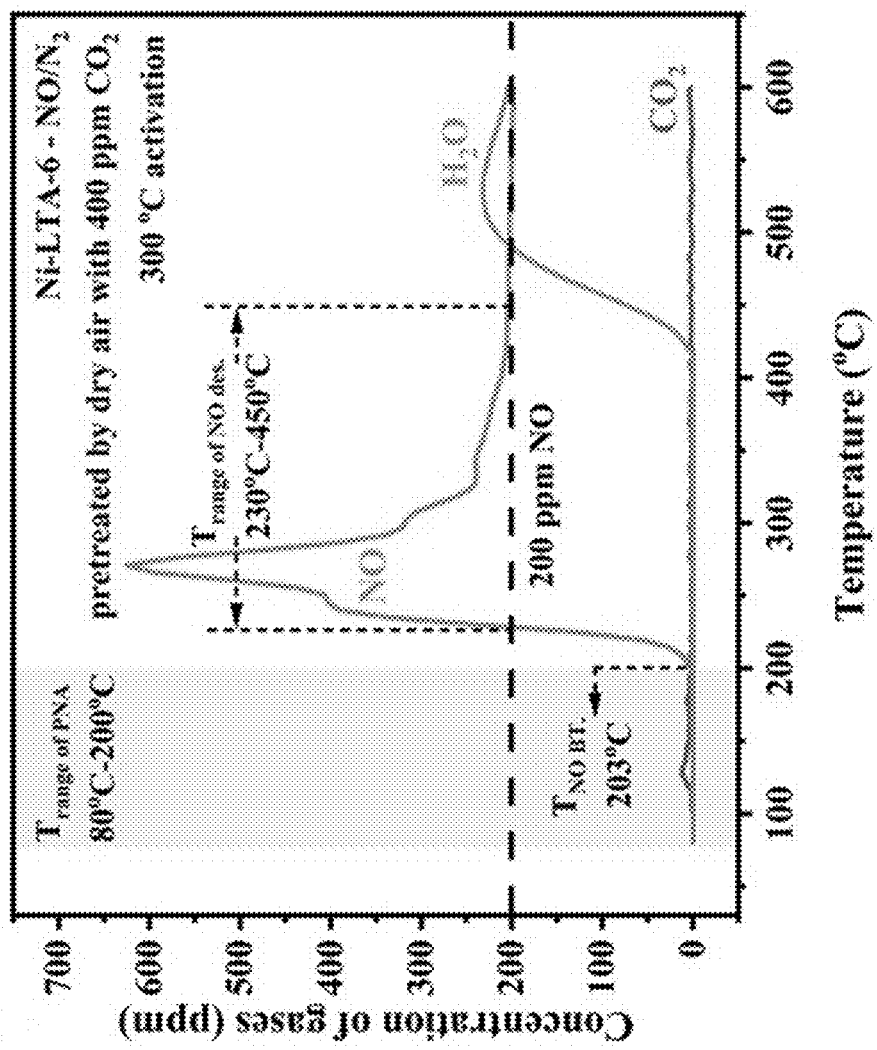
FIG. 10E shows the breakthrough curves of NO, $CO_2$ and $H_2O$ of Ni-LTA-6 (first activated at 600° C., pretreated by dry air containing 400 ppm $CO_2$, and finally activated at 300° C.) in $NO/N_2$ (200 ppm NO balanced by $N_2$) during programming heating from 80° C. to 600° C. at a heating rate of 15° C./min.

Moreover, the strongly adsorbed species that occupy strong $Ni^{2+}$ sites were demonstrated as chemisorbed carbonates formed by the co-adsorption of $CO_2$ and $H_2O$ in wet air, evidenced by the control experiments of 300° C.-activated Ni-LTA-6 that retained $H_2O$ or $CO_2$, respectively (achieved by activating Ni-LTA-6 at 600° C., pretreating with wet $N_2$ or dry air, respectively, and finally activating at 300° C.). In both cases, the instances of NO adsorption at temperatures higher than NO desorption was not observed (FIGS. 10D and 10E).

Figure 10F:
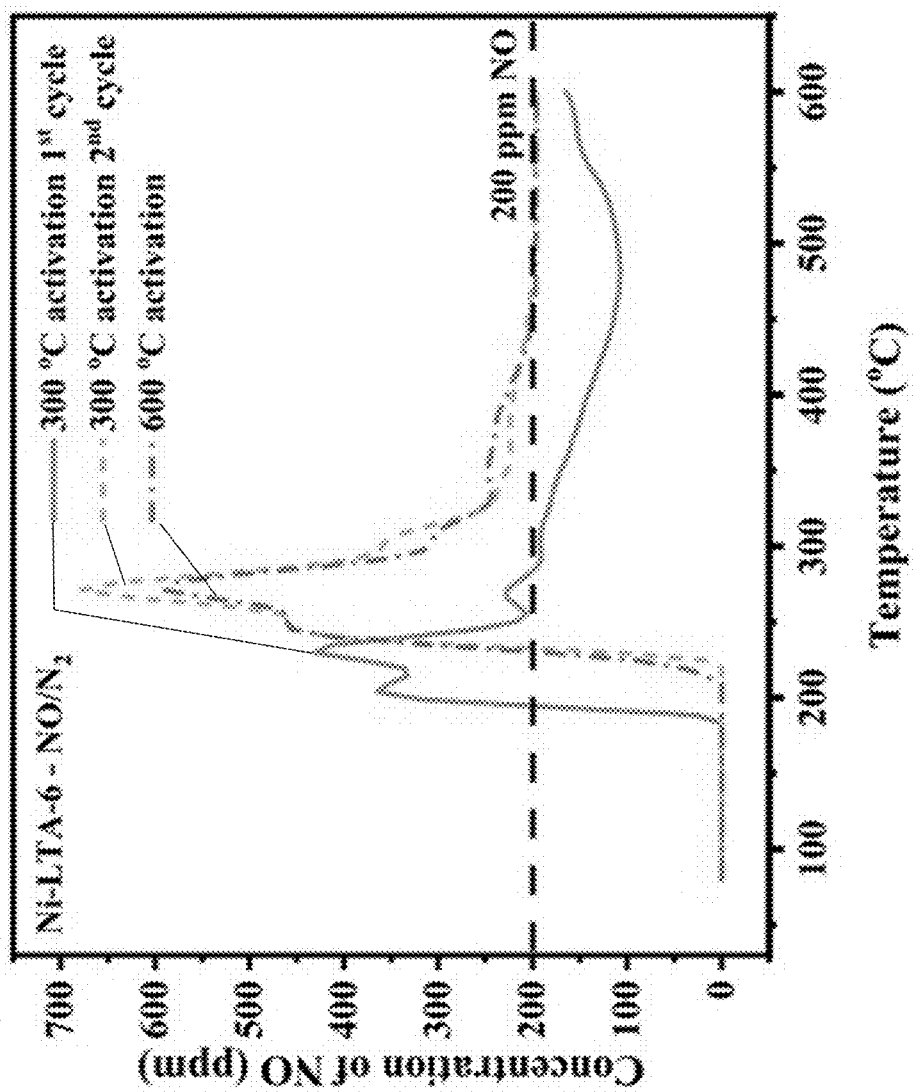
FIG. 10F shows the comparison of breakthrough curves of FIGS. 10A to 10C.
Figure 11A:
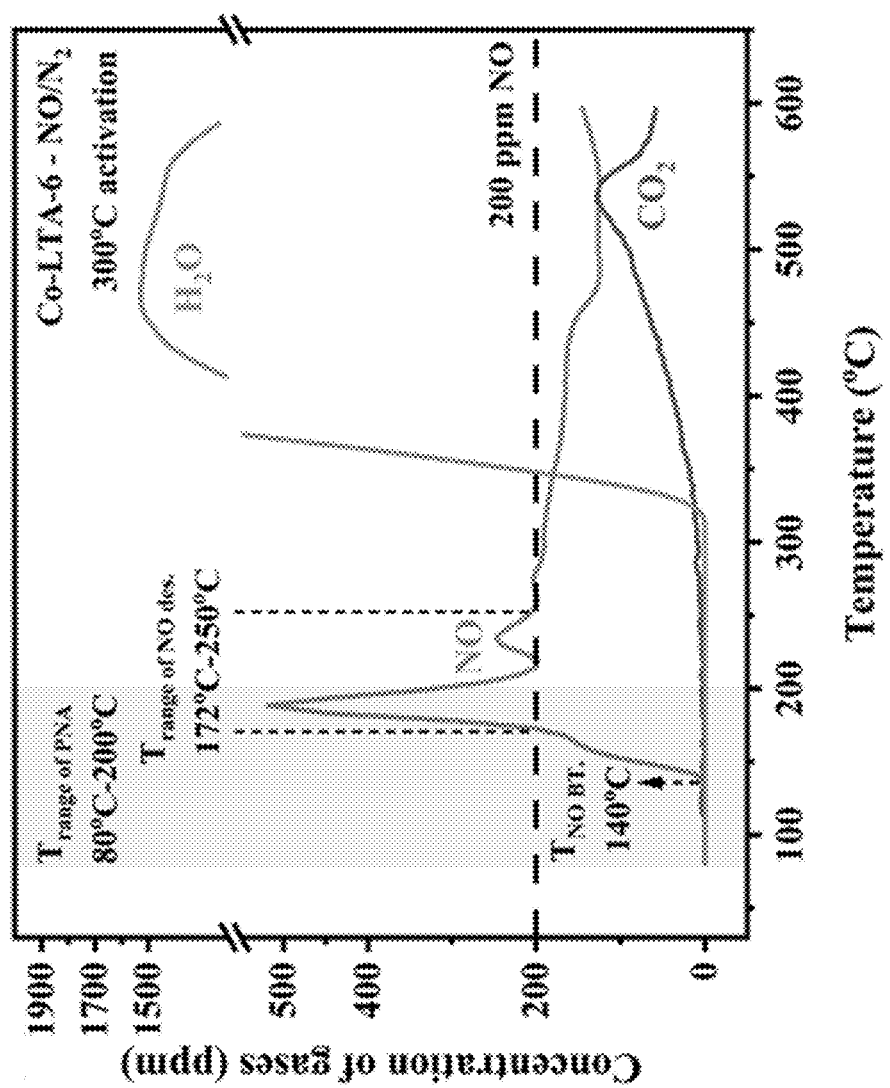
FIG. 11A shows the breakthrough curves of NO, $CO_2$ and $H_2O$ of Co-LTA-6 (after 300° C. activation) in $NO/N_2$ (200 ppm NO balanced by $N_2$) during programming heating from 80° C. to 600° C. at a heating rate of 15° C./min.
Figure 11B:
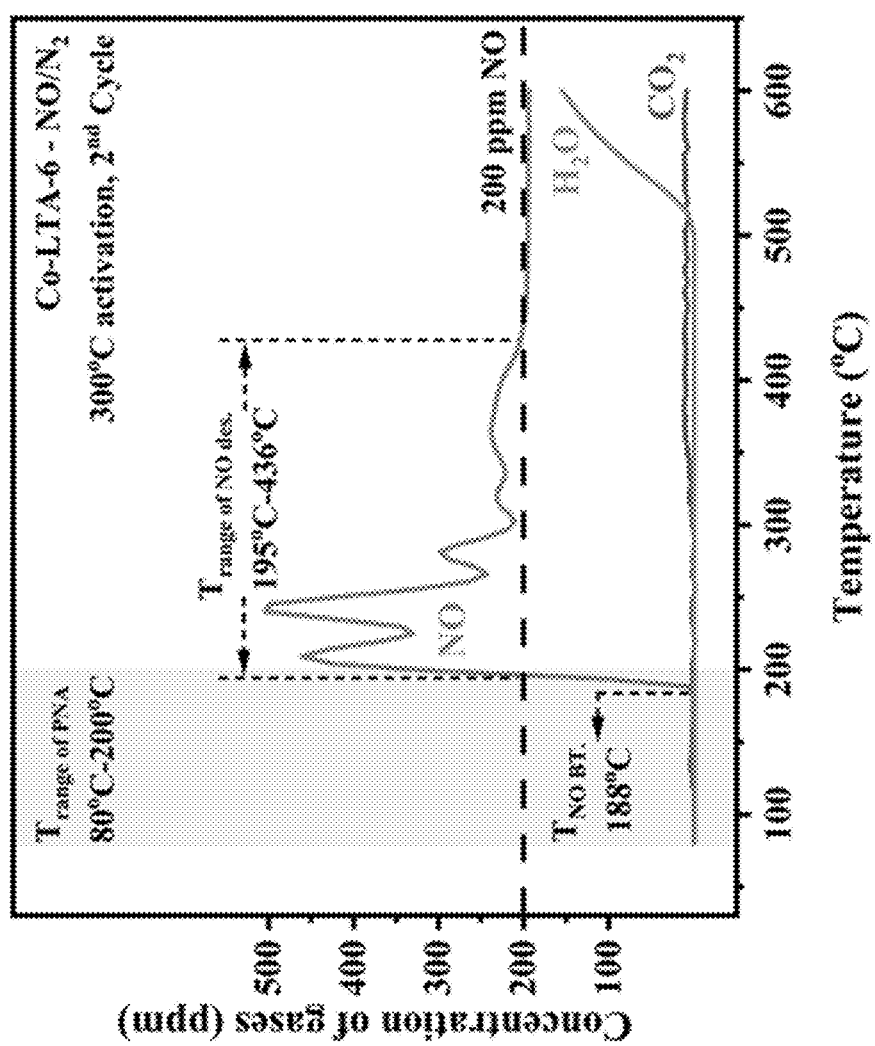
FIG. 11B shows the breakthrough curves of NO, $CO_2$ and $H_2O$ of Co-LTA-6 (300° C. activated, and completed the $1^{st}$ cycle programming heating from 80° C. to 600° C.) in $NO/N_2$ (200 ppm NO balanced by $N_2$) during programming heating from 80° C. to 600° C. at a heating rate of 15° C./min for the $2^{nd}$ cycle.
Figure 11C:
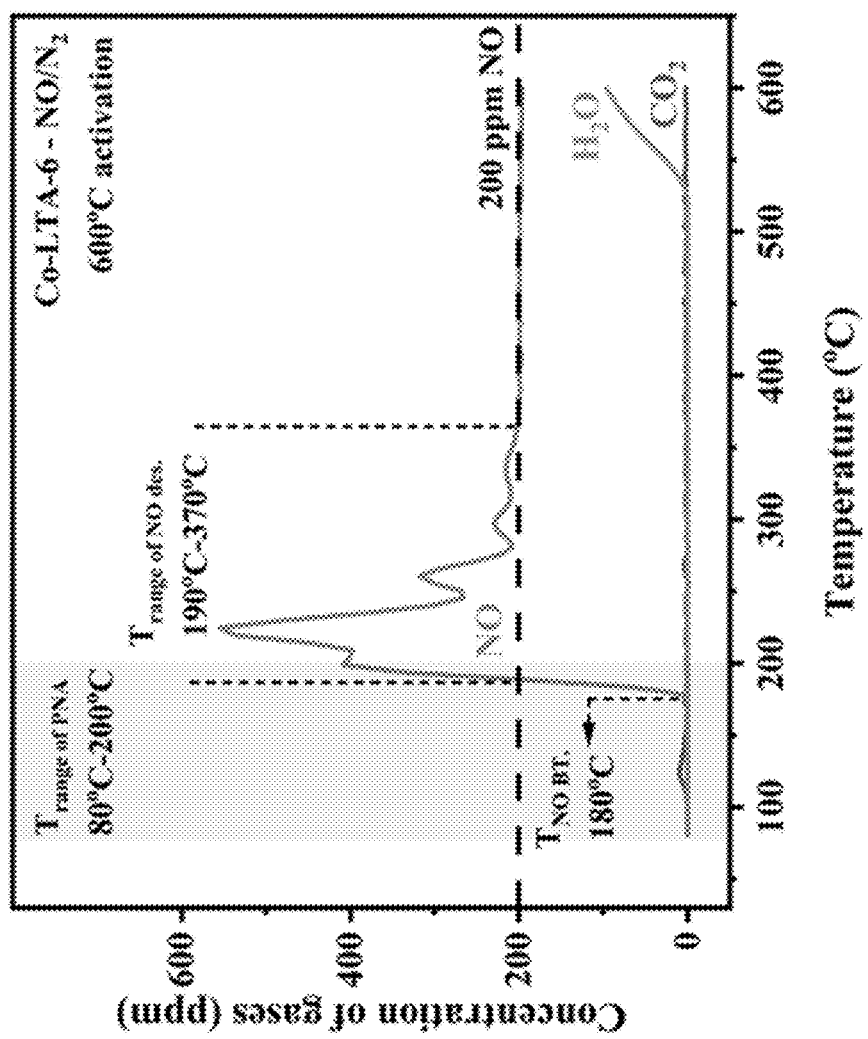
FIG. 11C shows the breakthrough curves of NO, $CO_2$ and $H_2O$ of Co-LTA-6 (after 600° C. activation) in $NO/N_2$ (200 ppm NO balanced by $N_2$) during programming heating from 80° C. to 600° C. at a heating rate of 15° C./min.
Figure 11D:
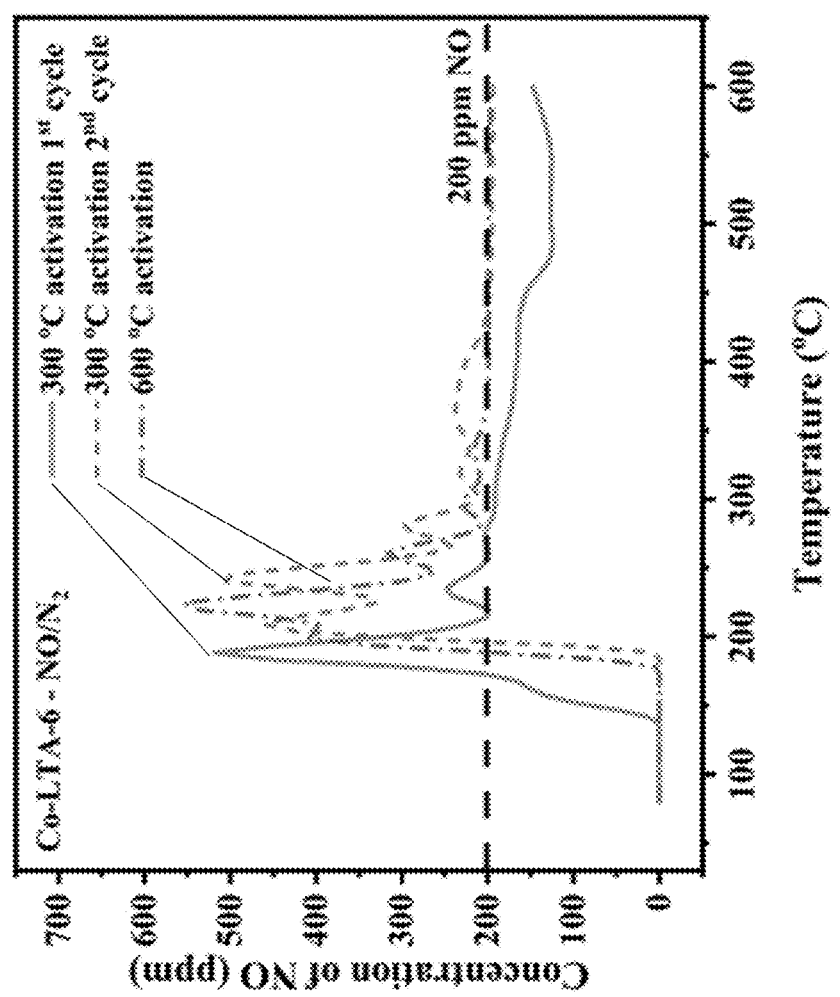
FIG. 11D shows the comparison of breakthrough curves of FIGS. 11A to 11C.
Figure 11E:
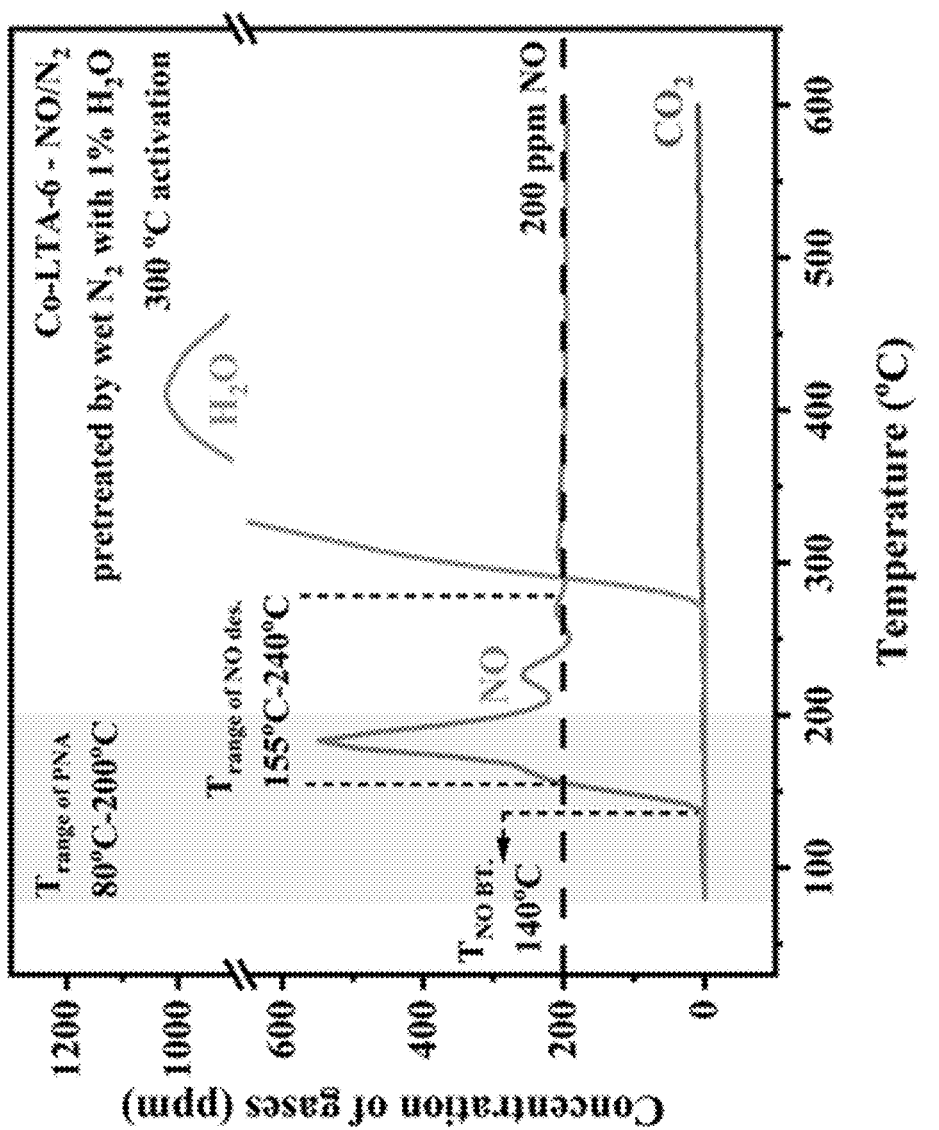
FIG. 11E shows the breakthrough curves of NO, $CO_2$ and $H_2O$ of Co-LTA-6 (first activated at 600° C., pretreated by $N_2$ with 1% $H_2O$, and finally activated at 300° C.) in NO/$N_2$ (200 ppm NO balanced by $N_2$) during programming heating from 80° C. to 600° C. at a heating rate of 15° C./min.
Figure 11F:
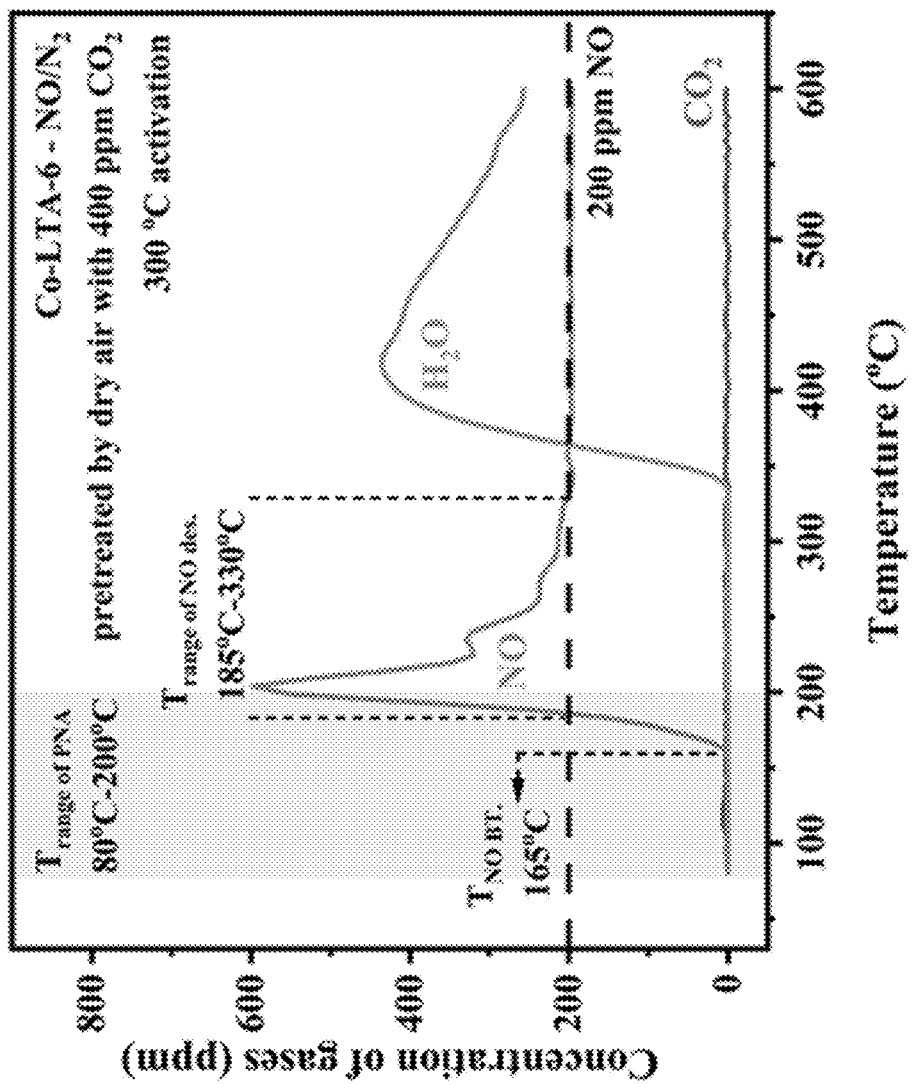
FIG. 11F shows the breakthrough curves of NO, $CO_2$ and $H_2O$ of Co-LTA-6 (first activated at 600° C., pretreated by $N_2$ with 1% $H_2O$, and finally activated at 300° C.) in NO/$N_2$ (200 ppm NO balanced by $N_2$) during programming heating from 80° C. to 600° C. at a heating rate of 15° C./min.

It is noteworthy that upon elevating the activation/regeneration temperature from 300° C. to 600° C., it resulted in elevated temperature windows for NO adsorption/desorption in Ni-LTA-6 (FIG. 10F). Specifically, the temperature at which NO breakthrough occurs rises from 183° C. (300° C.-activated, FIG. 10A) to 210-220° C. (600° C.-activated, FIGS. 10B and 10C). Additionally, the temperature for NO desorption was also increased from 195-285° C. (300° C.-activated, FIG. 10A) to 230-475° C. (600° C.-activated, FIGS. 10B and 10C). Co-LTA-6 exhibited a similar trend (FIGS. 11A to 11F). This temperature increase in NO adsorption/desorption upon 600° C.-activated Ni-LTA-6 compared with 300° C. is attributed to the presence of more active $Ni^{2+}$ sites for NO capture, achieved by removing strongly adsorbed contaminants. It is believed that the elevated temperature window for NO adsorption/desorption offers significant advantages for LTA adsorbents in this work for PNA, as it enables more effective NO capture during the cold-start period. Subsequently, the captured NO can be released at a higher temperature when the downstream $NO_x$-reduction processes reach a higher efficacy. In this work, it is noted that the 600° C.-activated Ni-LTA-6 could thoroughly capture 200 ppm of NO at temperatures below 200° C., and release most of the captured NO within 250-450° C., which can be recognized as potentially efficient adsorbent for PNA.

Example 5

Ni-LTA-6 for PNA Against Simulated Engine Exhaust Gas

It is appreciated that the exhaust emissions from automobiles encompass a multitude of constituents beyond NO, i.e., carbon monoxide (CO), carbon dioxide ($CO_2$), hydrocarbons ($C_xH_y$), oxygen ($O_2$), and $N_2$. To demonstrate the efficacy of Ni-LTA-6 in practical scenarios, a series of gas adsorption/desorption experiments were conducted by employing a simulated engine exhaust gas, denoted as NO/Mix, containing 200 ppm NO, 200 ppm CO, 50 ppm $C_3H_8$, 5% $CO_2$, and 10% $O_2$, balanced by $N_2$. To examine the role of $O_2$ in engine exhaust gas in affecting PNA, a parallel gas adsorption/desorption test was conducted utilizing a simulated engine exhaust gas without $O_2$, designated as NO/Mix without 02.

Figure 12A:
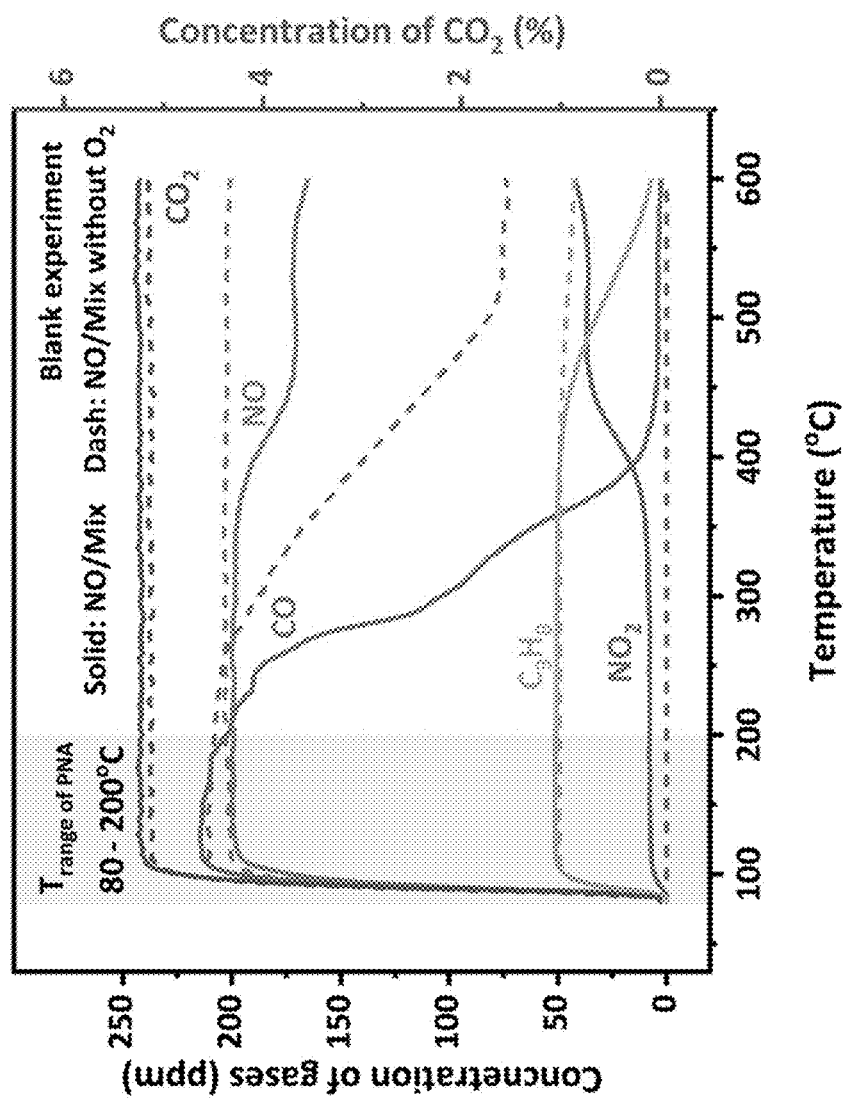
FIG. 12A shows the change of concentration of gas components in simulated engine exhaust gas containing 200 ppm NO, 200 ppm CO, 50 ppm $C_3H_8$, 5% $CO_2$, with 10% $O_2$ (named NO/Mix) or without 10% $O_2$ (named NO/Mix without $O_2$) balanced by $N_2$ during programming heating from 80° C. to 600° C. at a heating rate of 15° C./min.

To identify the potential inter-gas reactions within the simulated engine exhaust gas during programmed heating from 80° C. to 600° C., blank experiments without adding PNA adsorbents were executed utilizing both the NO/Mix and NO/Mix without $O_2$ (depicted in FIG. 12A). As the NO/Mix without $O_2$ underwent heating, the CO concentration exhibited a decline beyond 200° C., attributed to the oxidation of CO by the trace levels of $O_2$ within the NO/Mix without $O_2$ at elevated temperatures. Notably, the NO concentration largely remains unchanged till 400° C. because the trace quantity of $O_2$ in the NO/Mix without $O_2$ does not suffice to oxidize NO, even under high-temperature conditions. As for the blank experiment using NO/Mix, the presence of 10% $O_2$ within the feed gas led to more pronounced CO oxidation. Additionally, a minor fraction of NO was oxidized to $NO_2$ at temperatures exceeding 400° C. The decline in $C_3H_8$ concentration above 400° C. can be attributed to the combustion reaction between $C_3H_8$ and $O_2$. Note that within the operational temperature range of PNA (from 80° C. to 200° C.), the gas concentrations in both NO/Mix without $O_2$ and NO/Mix remain consistent, indicating the absence of inter-gas reactions. This observation reveals the validity of demonstrating the PNA performance of the LTA adsorbents of this work using NO/Mix and NO/Mix without $O_2$ in this study.

Figure 12B:
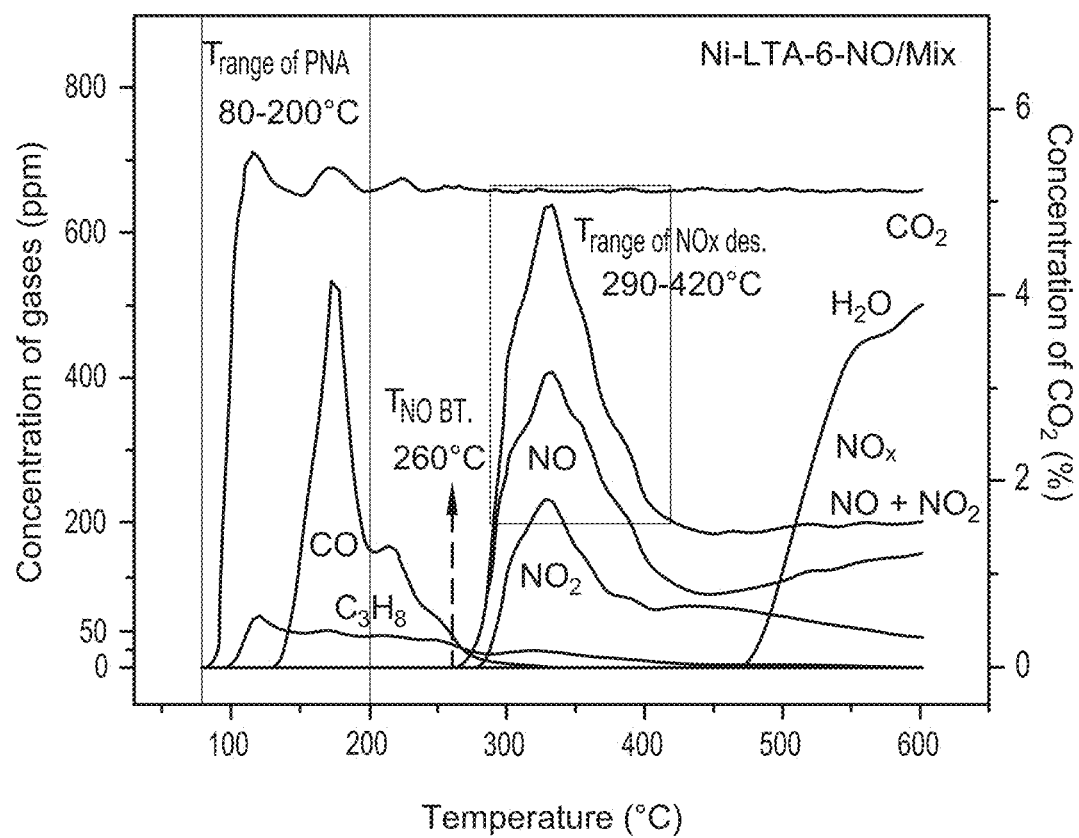
FIG. 12B shows the breakthrough curves of NO, CO, $C_3H_8$, $CO_2$ and $H_2O$ of Ni-LTA-6 (600° C. activated) in NO/Mix without $O_2$ during programming heating from 80° C. to 600° C. at a heating rate of 15° C./min.
Figure 12C:
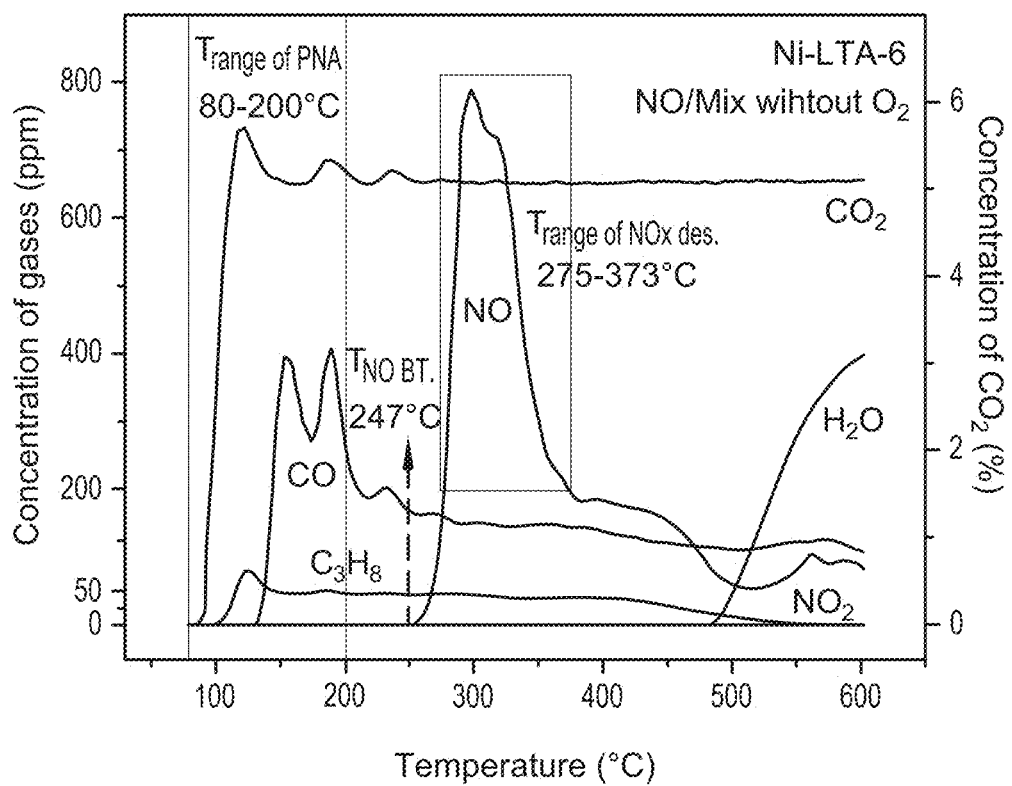
FIG. 12C shows the breakthrough curves of NO, CO, $C_3H_8$, $CO_2$ and $H_2O$ of Ni-LTA-6 (600° C. activated) in NO/Mix during programming heating from 80° C. to 600° C. at a heating rate of 15° C./min.

Column breakthrough adsorption/desorption tests conducted on 600° C. activated Ni-LTA-6 (0.2 g loading) unequivocally demonstrated that the presence of CO, $CO_2$, and $C_3H_8$ exerts no detrimental impact on the adsorption/desorption of NO under PNA conditions (FIGS. 12B and 12C). The transient adsorption of minute quantities of CO, $CO_2$, and $C_3H_8$ were desorbed at temperatures below 200° C., prior to the breakthrough of NO. This observation indicates the superior adsorption affinity of NO to that of CO, $CO_2$, and $C_3H_8$ on the Ni-LTA-6.

As depicted in FIG. 12B, 600° C.-activated Ni-LTA-6 can prevent NO breakthrough at temperatures below 247° C., followed by subsequent desorption that took place within the temperature range of 275-373° C. Parallel experiment conducted using NO/Mix exhibited similar results, wherein the breakthrough of NO took place beyond 260° C. and the subsequent desorption occurred between 290° C. and 420° C. It is important to acknowledge that a minor fraction of NO in the NO/Mix underwent oxidation by $O_2$, subsequently desorbed as $NO_2$. Besides, at temperatures over 450° C. in the NO/Mix without $O_2$ conditions, a reduction in NO concentration to below 200 ppm was observed, concomitant with a decline in $C_3H_8$ concentration. This phenomenon can be ascribed to the selective catalytic reduction (SCR) of NO facilitated by Ni-LTA-6, wherein $C_3H_8$ serves as the reducing agent. In contrast, this behavior was absent in the case of NO/Mix due to the depletion of $C_3H_8$ via combustion reactions (FIG. 12B).

Figure 12E:
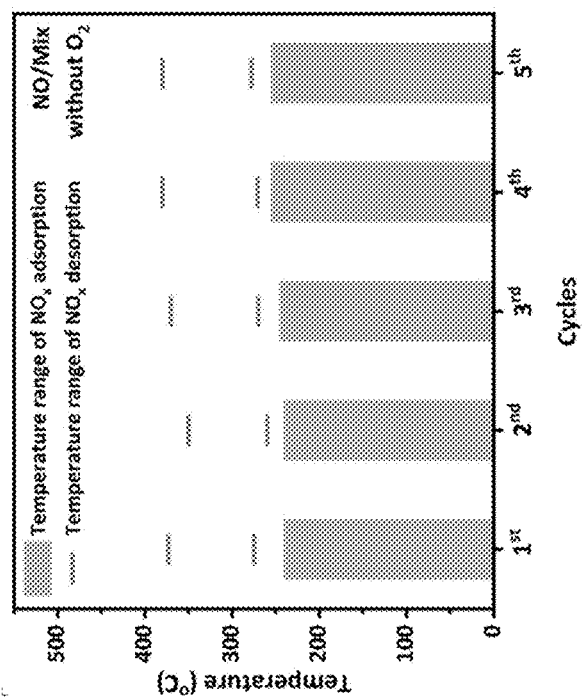
FIG. 12E shows the cyclic adsorption/desorption results of Ni-LTA-6 activated/regenerated at 600° C. with dry He purging in NO/Mix without $O_2$.
Figure 12D:
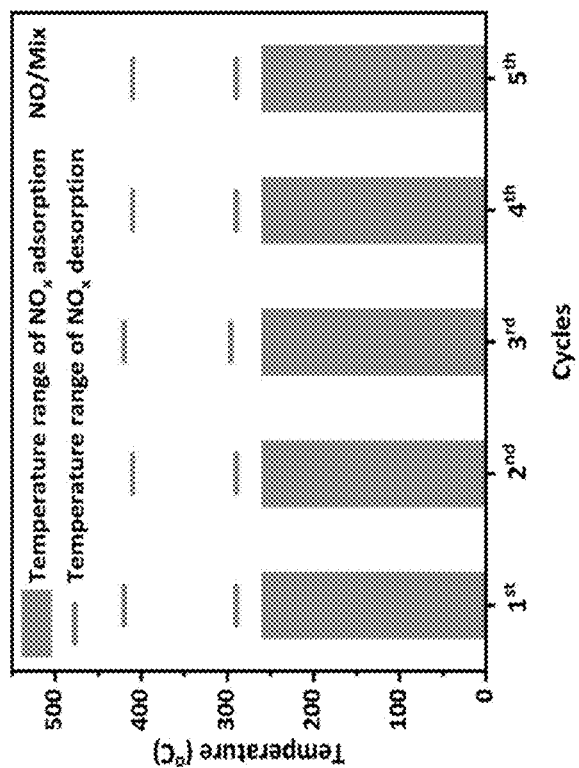
FIG. 12D shows the cyclic adsorption/desorption results of Ni-LTA-6 activated/regenerated at 600° C. with dry He purging in NO/Mix.

The adsorption/desorption cycles reveal the excellent reusability of Ni-LTA-6 in both NO/Mix and NO/Mix without $O_2$ under PNA conditions, where Ni-LTA-6 was regenerated at 600° C. via He purge (FIGS. 12D and 12E). Ni-LTA-6 with excellent NO adsorption/desorption and regeneration ability in simulated engine exhaust gas has been recognized as promising adsorbent for PNA.

Example 6

Effects of $H_2O$ and $SO_2$ on PNA Efficacy of Ni-LTA-6

Figure 13A:
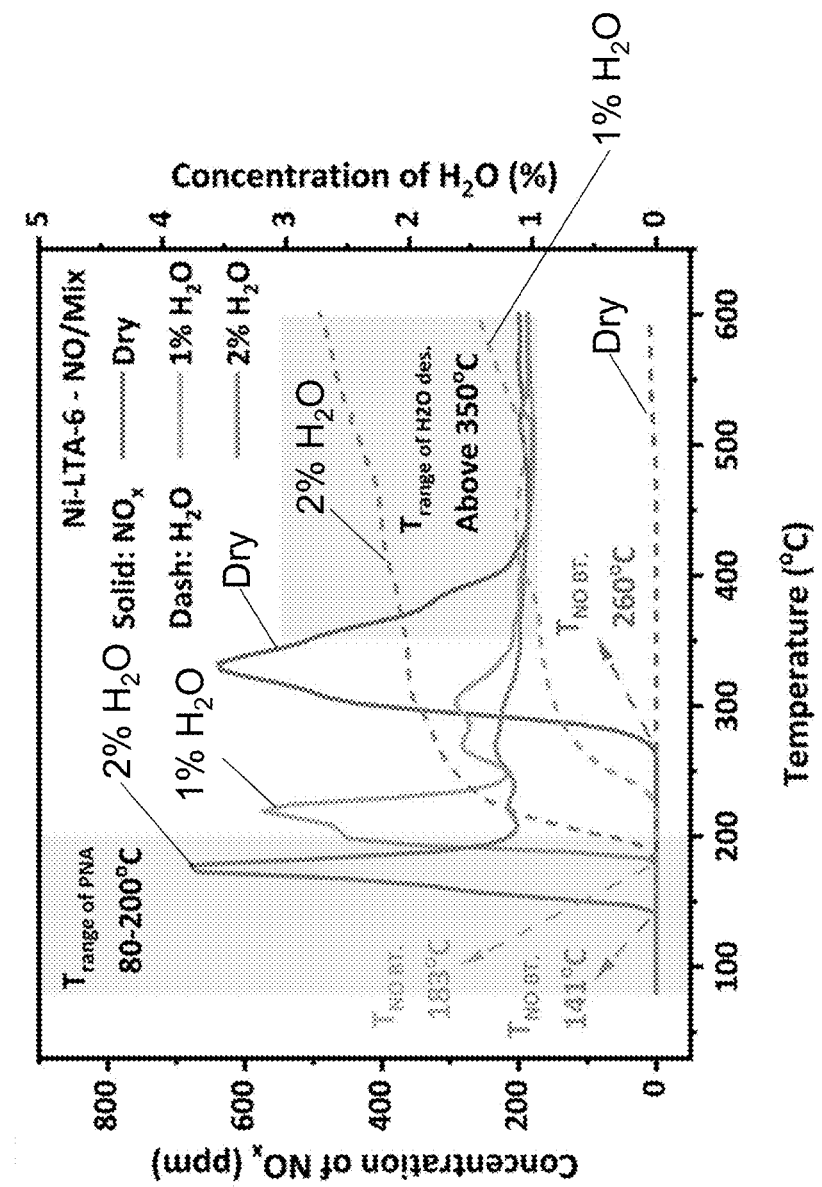
FIG. 13A shows the breakthrough curves of NO of 600° C.-activated Ni-LTA-6 in simulated engine exhaust gas containing 200 ppm NO, 200 ppm CO, 50 ppm $C_3H_8$, 5% $CO_2$, and 10% $O_2$ balanced by $N_2$ (named NO/Mix) with different levels of $H_2O$ content (0% (i.e. dry), 1%, and 2% $H_2O$) during programming heating from 80° C. to 600° C. at a heating rate of 15° C./min.

Water molecules ($H_2O$) featuring a substantial dipole moment, which always be strongly adsorbed by zeolites and thus deactivate zeolites as adsorbents. For zeolites adsorbents for PNA, the presence of $H_2O$ has been widely recognized to adversely impact on the adsorption efficacy. To investigate the effect of $H_2O$ on the NO adsorption/desorption under PNA conditions, column breakthrough adsorption/desorption tests using wet NO/Mix with different concentrations of $H_2O$ vapor were conducted on Ni-LTA-6 (0.2 g loading). As shown in FIG. 13A, the increase of $H_2O$ concentration led to a substantial drop in the temperatures at which NO breakthrough and desorption occur. Such a change in working temperatures is detrimental to the PNA process because of the lower efficiency of downstream $NO_x$ reduction process. This phenomenon can primarily be attributed to the competitive adsorption of $H_2O$ to the zeolite originating from its substantial dipole moment, which may therefore deactivate the adsorption sites of NO.

Figure 13B:
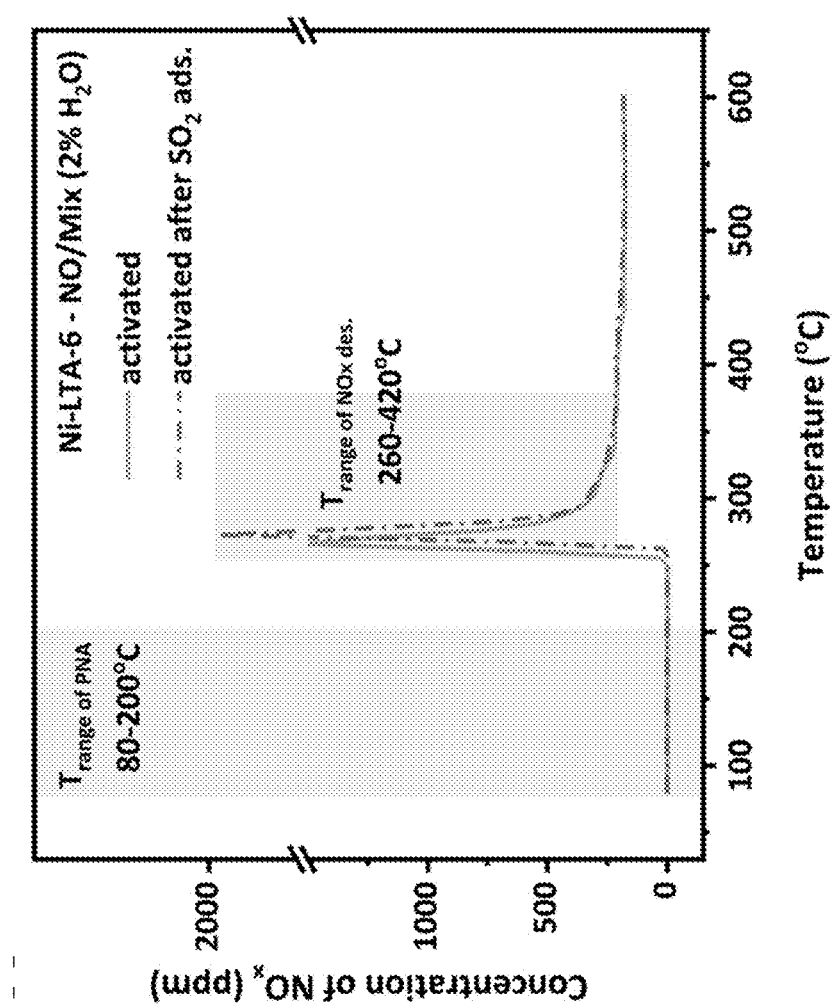
FIG. 13B shows the breakthrough curves of NO of 600° C.-activated Ni-LTA-6 (1.2 g loading) in simulated engine exhaust gas containing 200 ppm NO, 200 ppm CO, 50 ppm $C_3H_8$, 5% $CO_2$, and 10% $O_2$ balanced by $N_2$ (named NO/Mix), as well as 2% $H_2O$, with or without $SO_2$ pretreatment during programming heating from 80° C. to 600° C. at a heating rate of 15° C./min.

Another contaminant gas of concern in PNA is sulfur dioxide ($SO_2$), which is known to undergo tenacious adsorption that is difficult to desorb, resulting in adsorbent deactivation. To assess the impact of $SO_2$ on the PNA performance of the Ni-LTA-6 adsorbent (0.2 g loading and 1.2 g loading) in this work, the material was subjected to pretreatment using a $SO_2$ flow (200 mL/min, 100 ppm $SO_2$ balanced by Air) containing 2% $H_2O$ for 10 hours followed by activation at 600° C. As illustrated in FIG. 13B, the pre-treatment by $SO_2$ demonstrates no discernible influence on the adsorption/desorption of NO in NO/Mix with 2% $H_2O$. This finding strongly suggests that the functionality of the Ni-LTA-6 adsorbent in this work remains unaffected by the presence of $SO_2$ within the engine exhaust gas, indicating its resilience against $SO_2$-induced deactivation.

Example 7

Ni-LTA-6 for PNA Against Wet Engine Exhaust Gas

Based on the above, it is noted that Ni-LTA-6 exhibited remarkable performance in PNA processes under dry conditions, yet its efficiency diminishes under moist conditions. Given that it is unavoidable to have substantial water vapor content (up to 15%) in the engine exhaust gases, the development of a strategy for the implementation of Ni-LTA-6 in PNA under humid conditions is therefore investigated.

It is noted that PNA demands transient adsorbent utilization during the cold-start period, while $H_2O$ would be hardly adsorbed at temperatures exceeding 350° C. (FIGS. 9A and 13A). That said, this affirms that the $H_2O$-adsorbed Ni-LTA-6 can be regenerated during engine warm-up (250-450° C.) and steady-state operation (e.g. 450-600° C.). In other words, the quantity of adsorbed $H_2O$ by Ni-LTA-6 during the cold-start period was demonstrated to be constant.

Figure 14:
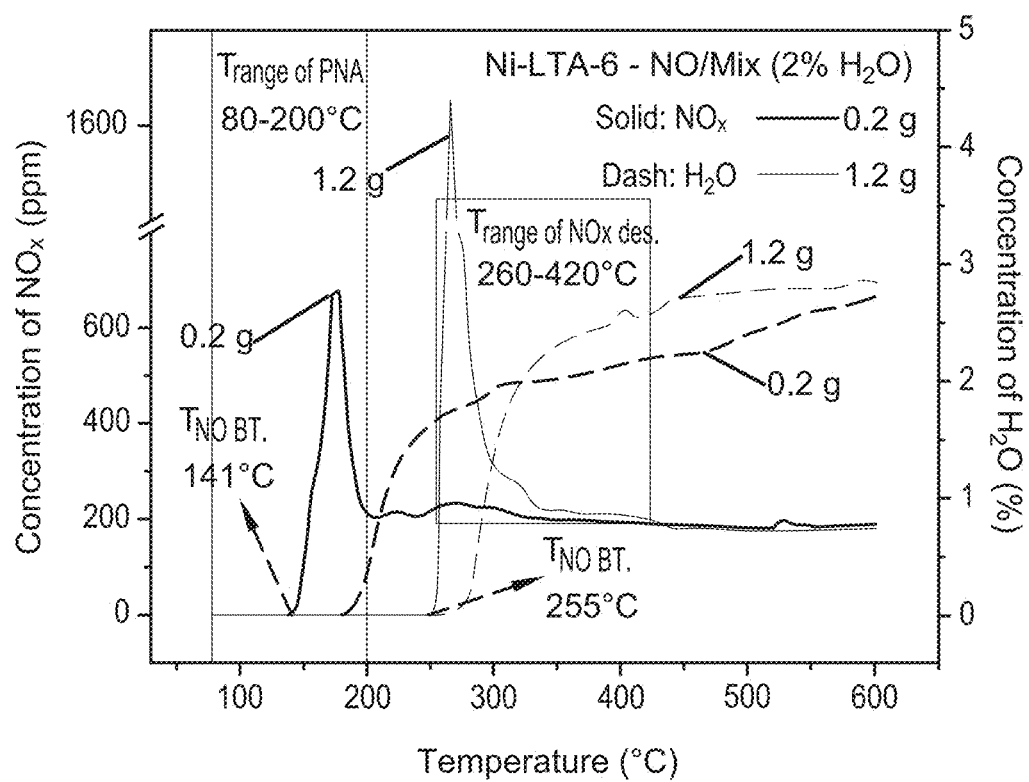
FIG. 14 shows the breakthrough curves of NO of Ni-LTA-6 (600° C. activated, 0.2 g or 1.2 g loading) in simulated engine exhaust gas containing 200 ppm NO, 200 ppm CO, 50 ppm $C_3H_8$, 5% $CO_2$, and 10% $O_2$ balanced by $N_2$ (named NO/Mix) and containing 2% $H_2O$ during programming heating from 80° C. to 600° C. at a heating rate of 15° C./min.

Therefore, the inventors have devised to deliberately load an excess quantity of Ni-LTA-6 for $H_2O$ adsorption (i.e. overload the adsorbent for $H_2O$ adsorption), thereby facilitating Ni-LTA-6 NO adsorption under practical humid engine conditions. As depicted in FIG. 14, it is noted that 1.2 g of Ni-LTA-6 surpasses the performance of 0.2 g Ni-LTA-6, as evidenced by significantly elevated temperatures of NO adsorption/desorption. Specifically, the temperature for NO breakthrough increases from 141° C. to 255° C., while the temperature range for NO desorption increases from 160-200° C. to 260-420° C.

Through the implementation of this strategy, Ni-LTA-6 demonstrates its remarkable capability to meet all operational requirements of PNA. It is believed that Ni-LTA-6 exhibited a superior NO adsorption ability compared to the reported PNA adsorbents, particularly the Pd-adsorbents on account of effectively prevent NO breakthrough below 200° C. within wet engine exhaust gas. This advantage is attributed to the higher achievable $Ni^{2+}$ loading (2-3 wt %) compared to Pd cations (typically below 2 wt %), as well as the faster adsorption kinetics of $Ni^{2+}$ derived by π-back bonding compared to the reactive NO chemisorption derived by Pd cations.

Furthermore, it is appreciated that the stability and regenerability of PNA adsorbents under practical scenarios has always been a challenge. Upon vehicle shutdown, exhaust gas flow ceases, requiring the natural cooling of the adsorbent. To evaluate the cyclic adsorption/desorption performance in a simulating practical scenario including engine cold-start, warm-up, steady-state operation, and shut down in the humid simulated engine exhaust gas, Ni-LTA-6 was cooled naturally without dry He purge between two cycles. Moreover, during the cooling period, the column outlet was exposed to ambient air at a relative humidity of 60-70% to simulate the scenario of PNA adsorbents within the tailpipe.

Figure 15:
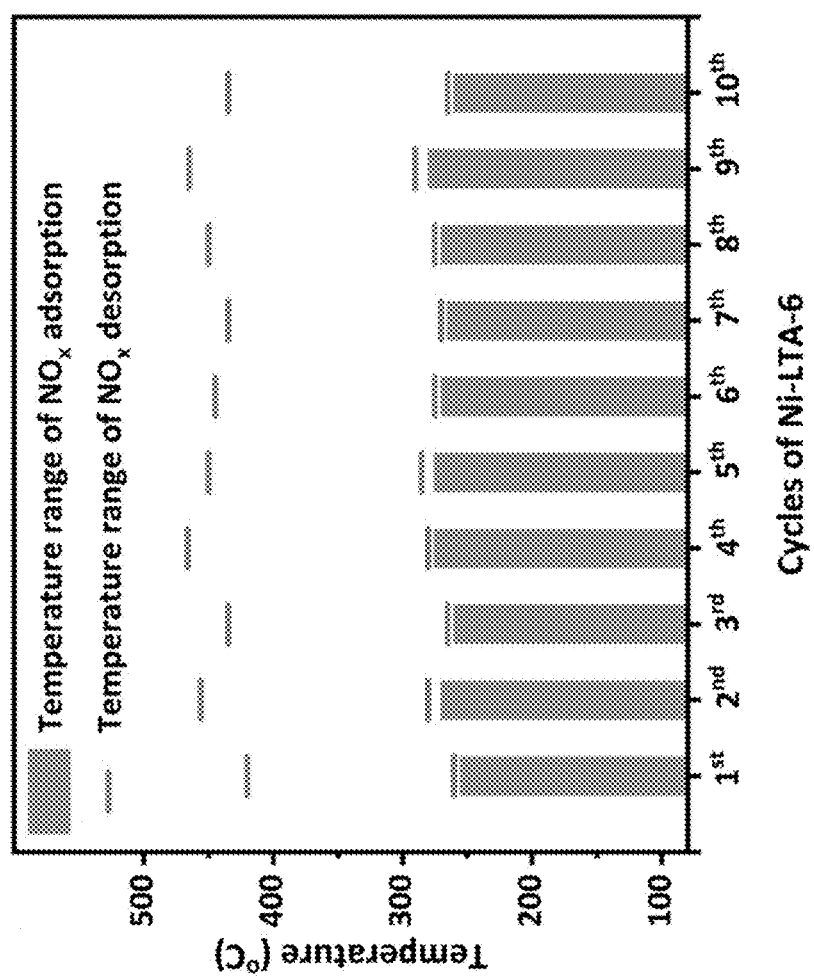
FIG. 15 shows the cyclic adsorption/desorption results of Ni-LTA-6 (600° C. activated after $SO_2$ pre-adsorption). Between each two cycles, Ni-LTA-6 was cooled naturally without dry He purge. During the cooling process, the outlet of the column was connected with the ambient air (60-70% RH)
Figure 16:
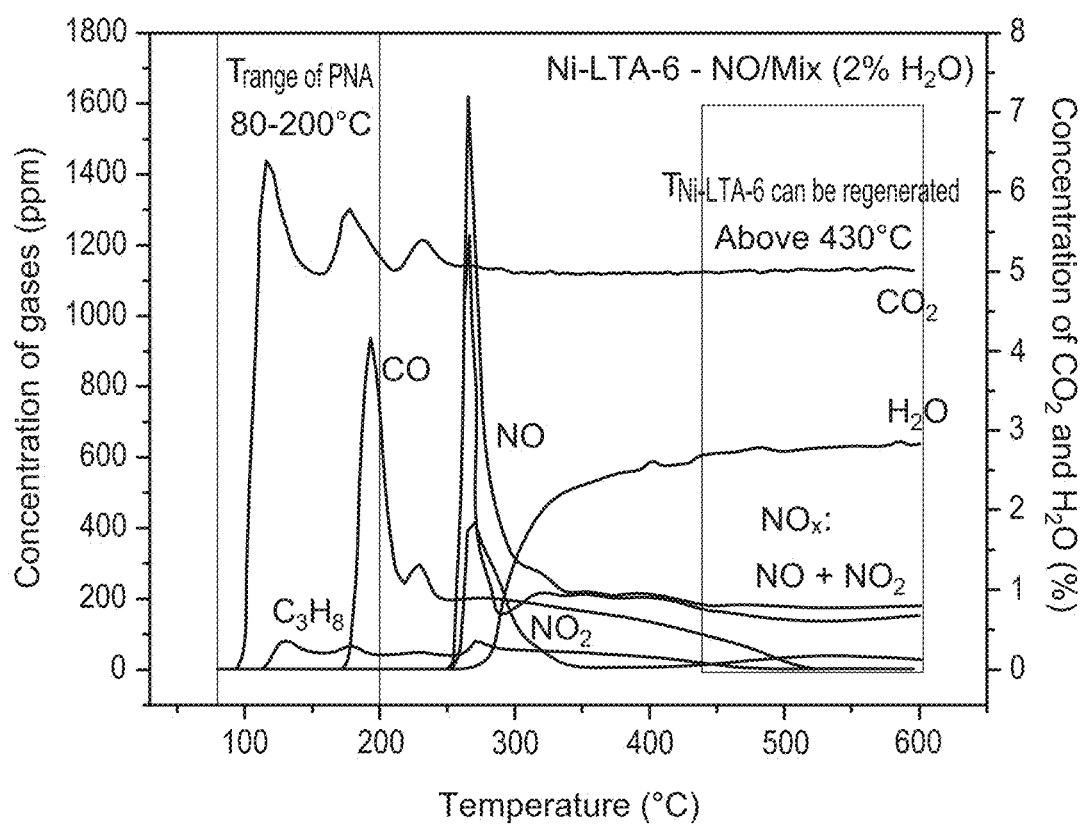
FIG. 16 shows the column breakthrough curve of $NO_x$ adsorption/desorption results among 1.2 g Ni-LTA-6 in humid simulated engine exhaust gas (referred as NO/Mix (2% of $H_2O$)) during programming heating from 80 to 600° C. at a heating rate of 15° C./min. NO/Mix containing 200 ppm NO, 200 ppm CO, 50 ppm $C_3H_8$, 5% $CO_2$, 10% $O_2$, and 2% of $H_2O$, balanced by $N_2$.
Figure 17A:
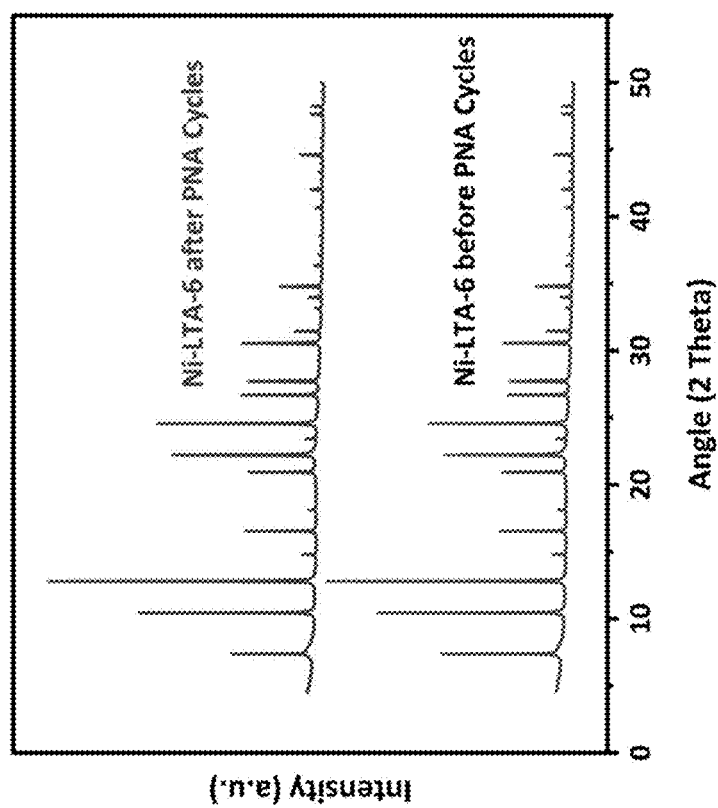
FIG. 17A shows the synchrotron XRD patterns of Ni-LTA-6 before and after ten PNA cycles.
Figure 17B:
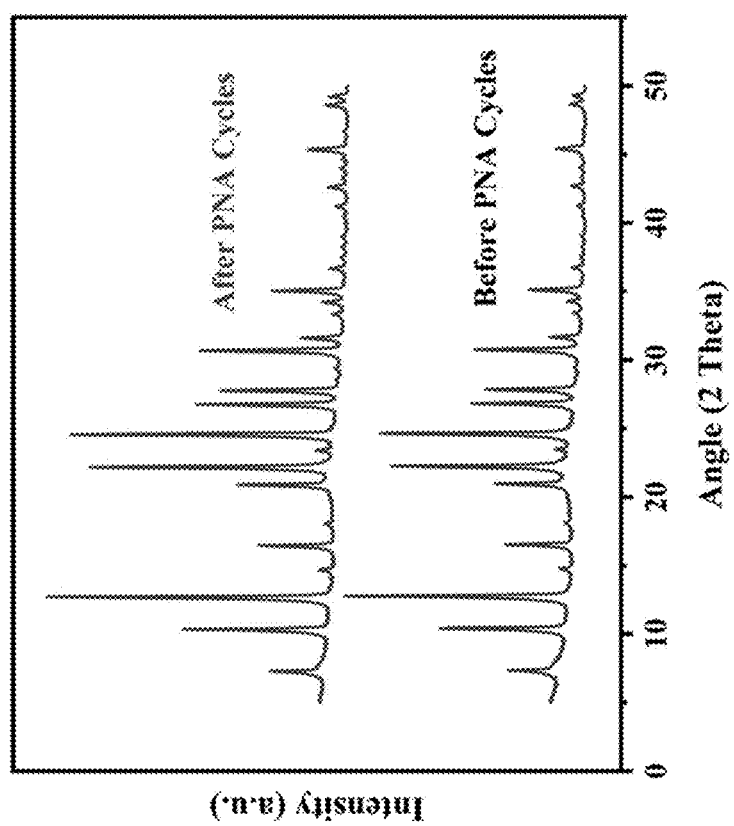
FIG. 17B shows the (laboratory) XRD patterns of Ni-LTA-6 before and after ten PNA cycles, which is complementary to FIG. 17A.
Figure 17C:
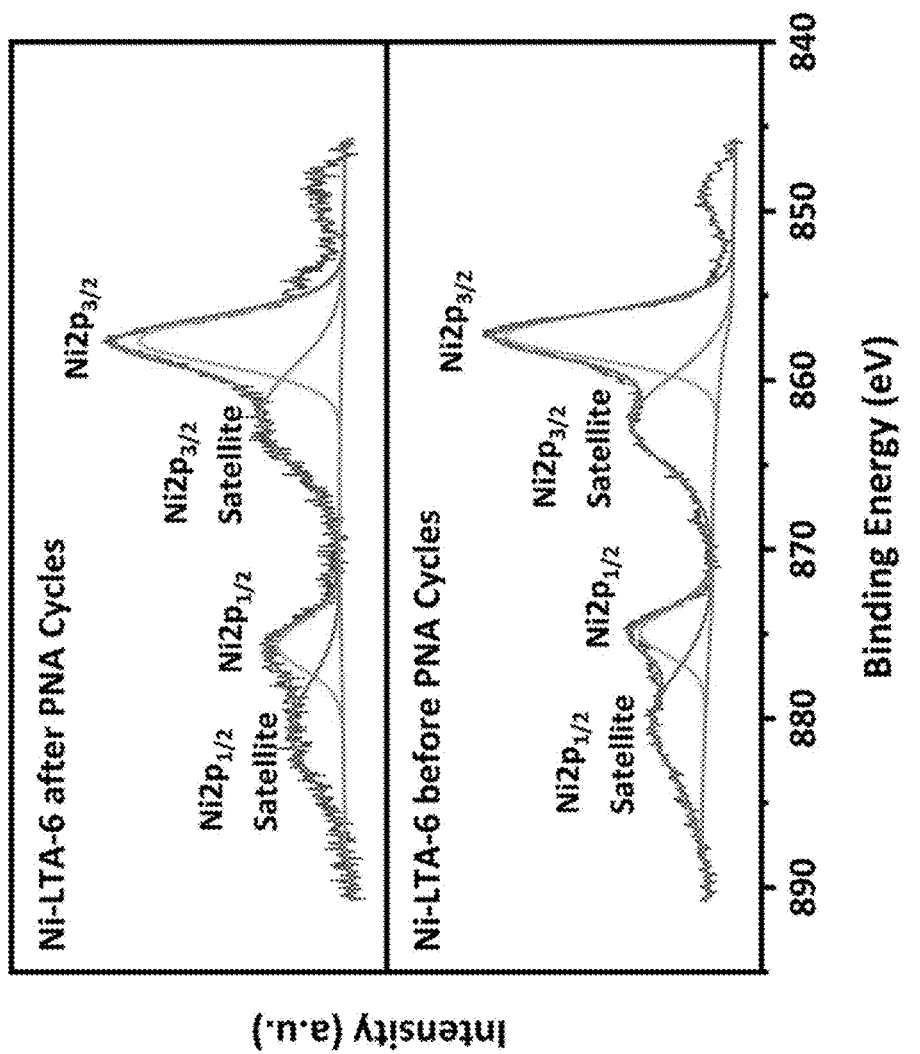
FIG. 17C shows the Ni $2p$ XPS of Ni-LTA-6 before and after ten PNA cycles corresponding to FIGS. 17A and 17B.
Figure 18A:
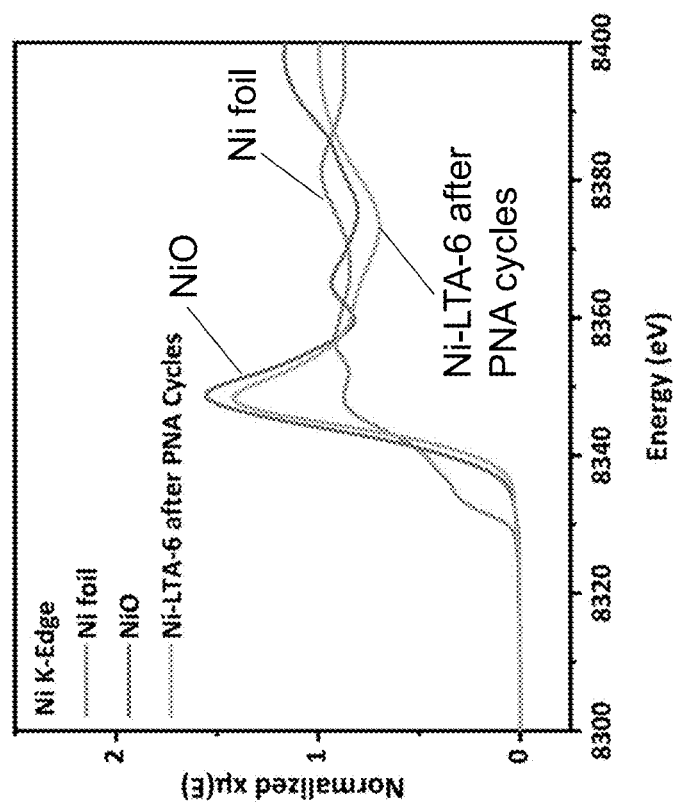
FIG. 18A shows the Ni K-edge XANES spectra of Ni-LTA-6 before and after ten PNA cycles, NiO, and Ni foil.
Figure 18B:
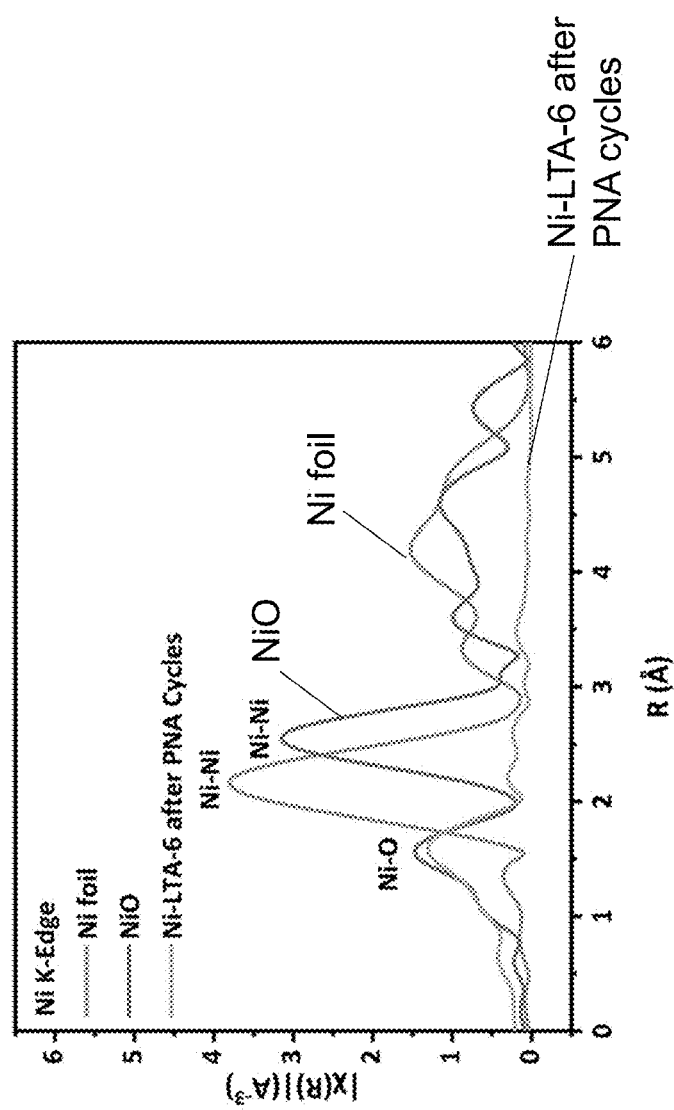
FIG. 18B shows the Fourier transform of $k^2$-weighted EXAFS spectra in the R-space of Ni-LTA-6 after ten PNA cycles, NiO, and Ni foil.

As shown in FIG. 15, the temperature windows of NO adsorption/desorption of Ni-LTA-6 remains unchanged for ten cycles, thereby affirming its robust reusability under practical conditions. Ni-LTA-6 was also demonstrated with remarkable stability and regenerability under the practical scenarios of PNA. As shown in FIG. 16, Ni-LTA-6 within the humid simulated engine exhaust gas can be regenerated exclusively by relying on temperatures above 430° C. Furthermore, the exceptional hydrothermal stability of Ni-LTA-6 was further proved by the unchanged structure and crystallinity after ten PNA cycles, evidenced by the identical synchrotron XRD pattern between Ni-LTA-6 before and after PNA cycles (FIGS. 17A to 17C). Similarly, the well-dispersed isolated $Ni^{2+}$ sites within cycled Ni-LTA-6 were proved by the Ni K-edge XANES and EXAFS results (FIGS. 18A and 18B).

Based on the above, accompanying to the superior NO adsorption ability and cost-effectiveness, Ni-LTA-6 was proved as the most promising candidate for practical PNA with great potential for industrialization.

The invention has been given by way of example only, and various other modifications of and/or alterations to the described embodiment may be made by persons skilled in the art without departing from the scope of the invention as specified in the appended claims.

The invention claimed is:

1. A passive $NO_x$ adsorbent comprising a small pore zeolite having an eight-ring framework structure ion-exchanged with a cation consisting of a non-noble metal ion.

2. The adsorbent as claimed in claim 1, wherein the non-noble metal ion comprises any one of $Na^+$, $K^+$, $Mg^{2+}$, $Ca^{2+}$, $Mn^{2+}$, $Co^{2+}$, $Ni^{2+}$, $Cu^{2+}$, $Zn^{2+}$, $Y^{3+}$, $La^{3+}$, $Ce^{3+}$, $Eu^{3+}$, $Tb^{3+}$, or $Yb^{3+}$.

3. The adsorbent as claimed in claim 1, wherein the non-noble metal ion is selected from the group consisting of $Na^+$, $Mg^{2+}$, $Ca^{2+}$, $Co^{2+}$, $Ni^{2+}$ and a combination thereof.

4. The adsorbent as claimed in claim 1, wherein the eight-ring framework structure of small pore zeolite is selected from any one of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SIV, THO, TSC, UEI, UFI, VNI, YUG, ZON.

5. The adsorbent as claimed in claim 1, wherein the small pore zeolite comprises a framework structure being any one of CHA and LTA.

6. The adsorbent as claimed in claim 5, wherein the framework structure of LTA includes a Si/Al ratio of 5.5 to 6.

7. The adsorbent as claimed in claim 5, wherein the small pore zeolite comprises a framework structure of LTA-6.

8. The adsorbent as claimed in claim 2, wherein the small pore zeolite has an ion-exchange degree of 20% to 104% with the non-noble metal ion.

9. The adsorbent as claimed in claim 8, wherein the small pore zeolite comprises a plurality of exchangeable sites including any one of $H^+$ and $NH_4^+$, and the plurality of exchangeable sites undergo ion-exchange with the non-noble metal ion.

10. The adsorbent as claimed in claim 1 having a particle size of about 0.5 mm.

11. The adsorbent as claimed in claim 1, wherein the non-noble metal ion is any one of $Co^{2+}$ and $Ni^{2+}$ and the small pore zeolite has a framework structure of LTA-6.

12. The adsorbent as claimed in claim 11, wherein the small pore zeolite is doped with about 5 wt % to about 6 wt % of $Ni^{2+}$.

13. The adsorbent as claimed in claim 11, wherein the small pore zeolite is doped with about 2 at % to about 3 at % of $Ni^{2+}$.

14. The adsorbent as claimed in claim 11, wherein the small pore zeolite is doped with about 5 wt % to about 6 wt % of $Co^{2+}$.

15. The adsorbent as claimed in claim 11, wherein the small pore zeolite is doped with about 2 at % to about 3 at % of $Co^{2+}$.

16. The adsorbent as claimed in claim 11 having an NO adsorption capacity of about 0.22 mmol/g to about 0.35 mmol/g at about 80° C.

17. The adsorbent as claimed in claim 11 is capable of capturing an effective amount of NO at or below a first temperature and releasing a substantially the same amount of captured NO at a second temperature that is higher than the first temperature.

18. The adsorbent as claimed in claim 17, wherein the first temperature is about 183° C. to about 255° C.

19. The adsorbent as claimed in claim 17, wherein the second temperature is about 195° C. to about 460° C.

20. The adsorbent as claimed in claim 17, wherein the effective amount of NO is about 200 ppm.

21. An exhaust system for internal combustion engines comprising an adsorber including the passive $NO_x$ adsorbent as claimed in claim 1 and an exhaust treatment component that is configured downstream with respect to and in fluidic communication with the adsorber.

22. The exhaust system as claimed in claim 21, wherein the adsorber is loaded with about 0.2 g to about 1.2 g of the adsorbent.

23. The exhaust system as claimed in claim 22, wherein the adsorber loaded with the adsorbent has a bed porosity of about 70% to about 80%.

24. The exhaust system as claimed in claim 21, wherein the adsorbent is thermally pre-treated at about 300° C. or above.

25. The exhaust system as claimed in claim 21, wherein the exhaust treatment component comprises any one of a selective catalytic reduction (SCR) catalyst, a particulate filter, a SCR filter, a $NO_x$ adsorber catalyst, a three-way catalyst, an oxidation catalyst.

26. A method for preparing the passive $NO_x$ adsorbent as claimed in claim 1, comprising the steps of:
providing a small pore zeolite containing $NH_4^+$ or $Na^+$; and
adding the small pore zeolite into a first solution comprising a non-noble metal nitrate or non-noble metal acetate for conducting an ion-exchange reaction such that the $NH_4^+$ ion or the Nation is replaced with the non-noble metal.

27. The method as claimed in claim 26, wherein the small pore zeolite comprises $NH_4^+$ form of LTA-6 or $Na^+$ form of LTA-6.

28. The method as claimed in claim 27, wherein the $NH_4^+$ form of LTA-6 has a solid/liquid ratio with the first solution of about 1 g/50 mL.

29. The method as claimed in claim 27, wherein the $Na^+$ form of LTA-6 has a solid/liquid ratio with the first solution of about 1 g/100 mL.

30. The method as claimed in claim 26, wherein the non-noble metal comprises any one of Na, K, Mg, Ca, Mn, Co, Ni, Cu, Zn, Y, La, Ce, Eu, Tb, or Yb.

* * * * *